US009818031B2

United States Patent
Wexler et al.

(10) Patent No.: US 9,818,031 B2
(45) Date of Patent: Nov. 14, 2017

(54) CROWD-SOURCED VISION-BASED INFORMATION COLLECTION

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 0 days.

(21) Appl. No.: 15/399,293

(22) Filed: Jan. 5, 2017

(65) Prior Publication Data

US 2017/0193301 A1 Jul. 6, 2017

Related U.S. Application Data

(60) Provisional application No. 62/275,531, filed on Jan. 6, 2016.

(51) Int. Cl.
*G06K 9/00* (2006.01)

(52) U.S. Cl.
CPC ..... *G06K 9/00671* (2013.01); *G06K 9/00355* (2013.01); *G06K 9/00718* (2013.01)

(58) Field of Classification Search
CPC ........... G06K 9/00671; G06K 9/00355; G06K 9/00718; G06F 17/30265; G06F 17/30274; G06F 17/30277; G06T 19/006; G06T 11/60; G06T 15/04; G06T 2210/61; G06T 2210/62; G06T 2215/16; G06T 2219/004; G06T 2219/2008; G06T 5/50; H04W 4/02; H04W 4/04
See application file for complete search history.

(56) References Cited

U.S. PATENT DOCUMENTS

| | | | |
|---|---|---|---|
| 2008/0231721 A1* | 9/2008 | Chou | H04N 5/23219 348/222.1 |
| 2010/0073398 A1* | 3/2010 | Fisher | G06F 17/30899 345/619 |
| 2010/0179874 A1* | 7/2010 | Higgins | G06K 9/00664 705/14.53 |
| 2012/0296972 A1* | 11/2012 | Backer | H04L 65/60 709/204 |
| 2013/0222369 A1* | 8/2013 | Huston | G06T 17/00 345/419 |

(Continued)

*Primary Examiner* — Tom Y Lu
(74) *Attorney, Agent, or Firm* — Finnegan, Henderson, Farabow, Garrett & Dunner, LLP

(57) ABSTRACT

A wearable apparatus is provided for capturing and processing images from an environment of a user. In one implementation, a server-based system includes a data interface for receiving a data stream including image-based information. The image based information may include images captured by a camera present on a particular wearable apparatus from among the plurality of wearable apparatuses worn by different users. The server-based system also includes at least one processing device programmed to receive the data stream from each of the plurality of wearable apparatuses using the data interface, and analyze the data streams to determine at least one trait common to two or more of the different users of the plurality of wearable apparatuses. The at least one processing device may also be programmed to store in a database information relating to the determined at least one trait.

19 Claims, 58 Drawing Sheets

(56) References Cited

U.S. PATENT DOCUMENTS

| | | | |
|---|---|---|---|
| 2013/0343597 A1* | 12/2013 | Kocks | G06K 9/00718 |
| | | | 382/100 |
| 2015/0248783 A1* | 9/2015 | Fayle | G06T 19/006 |
| | | | 345/633 |
| 2015/0254723 A1* | 9/2015 | Chand | G06Q 30/0269 |
| | | | 705/14.66 |

* cited by examiner

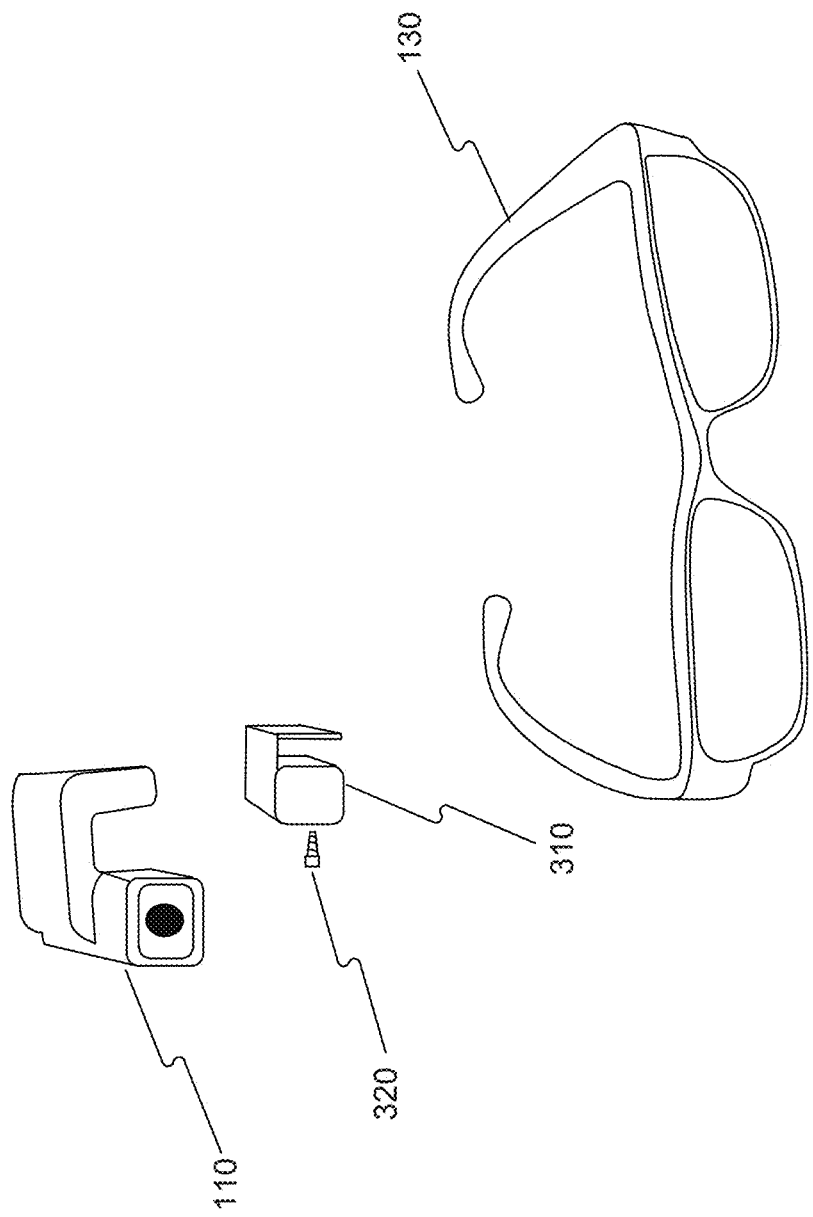

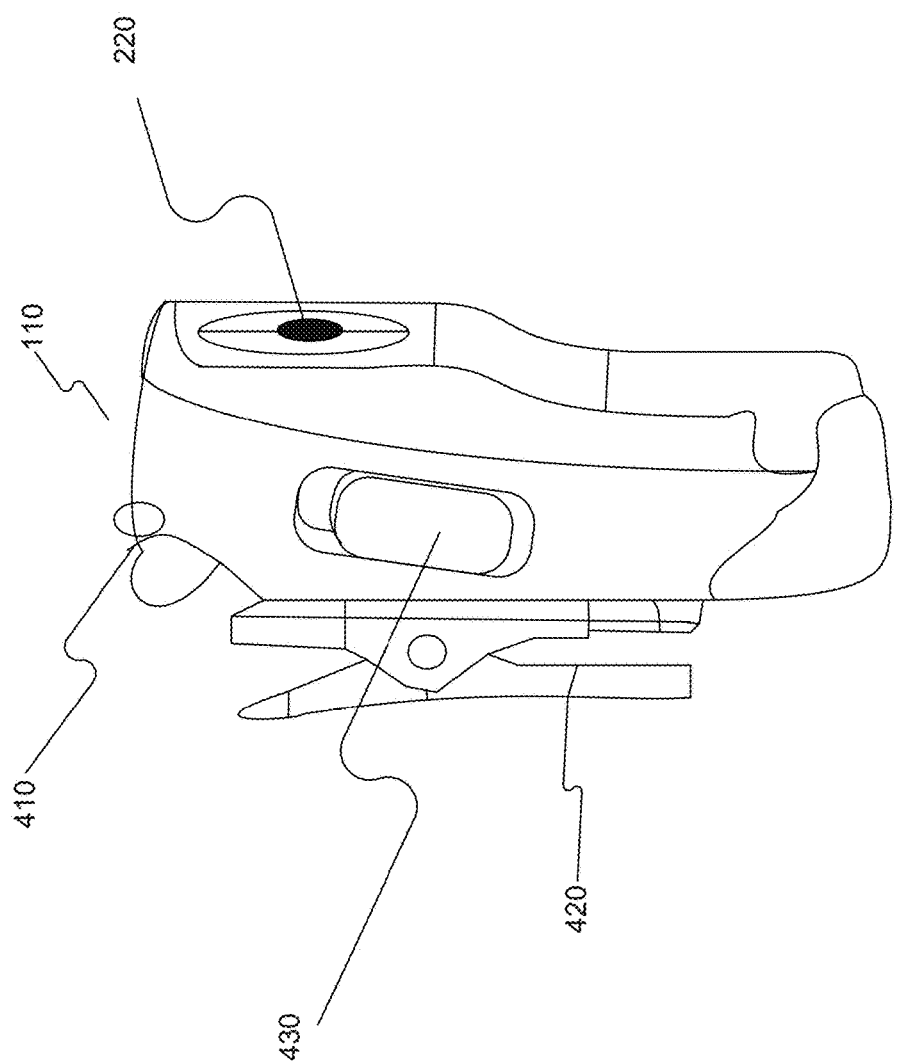

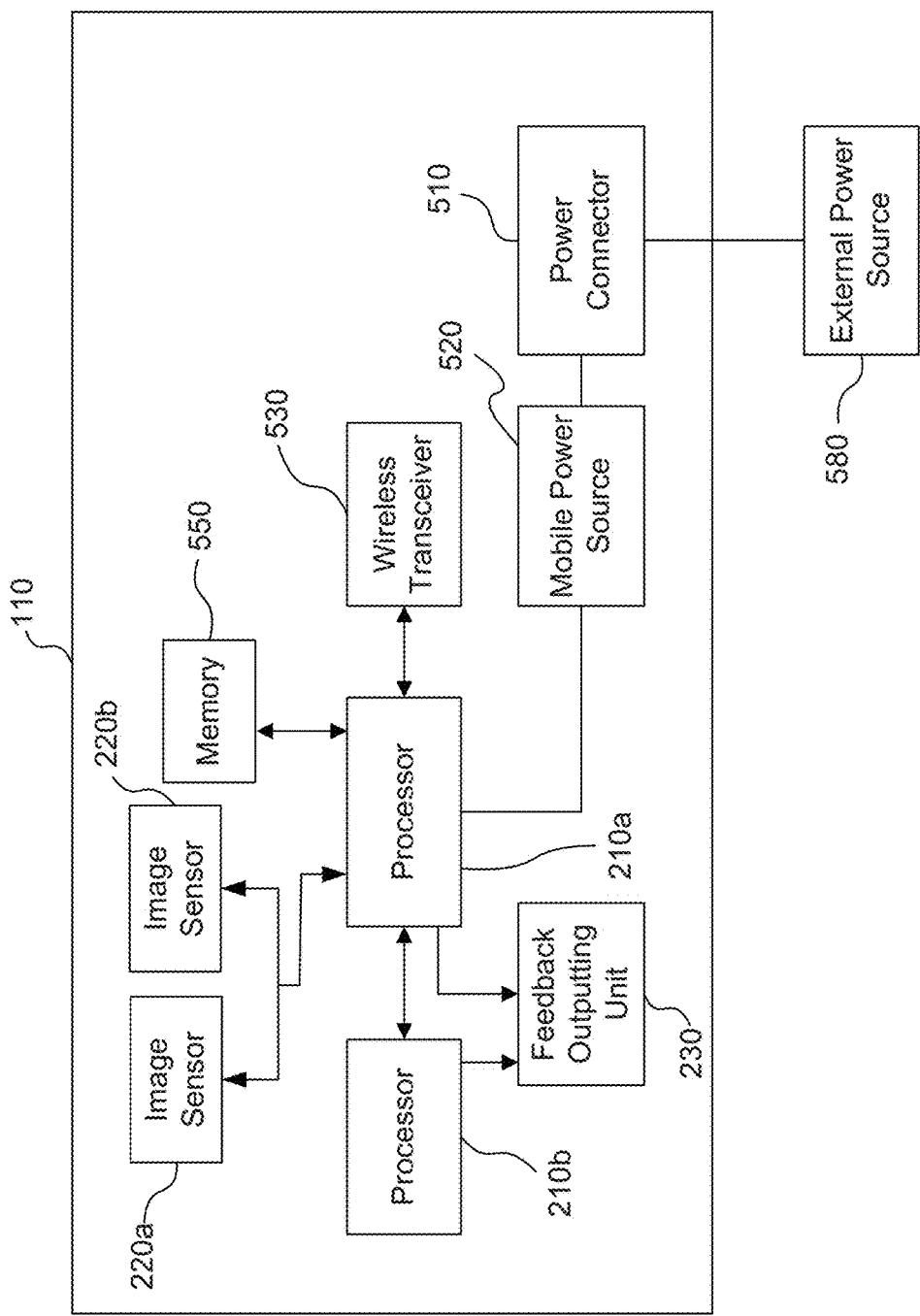

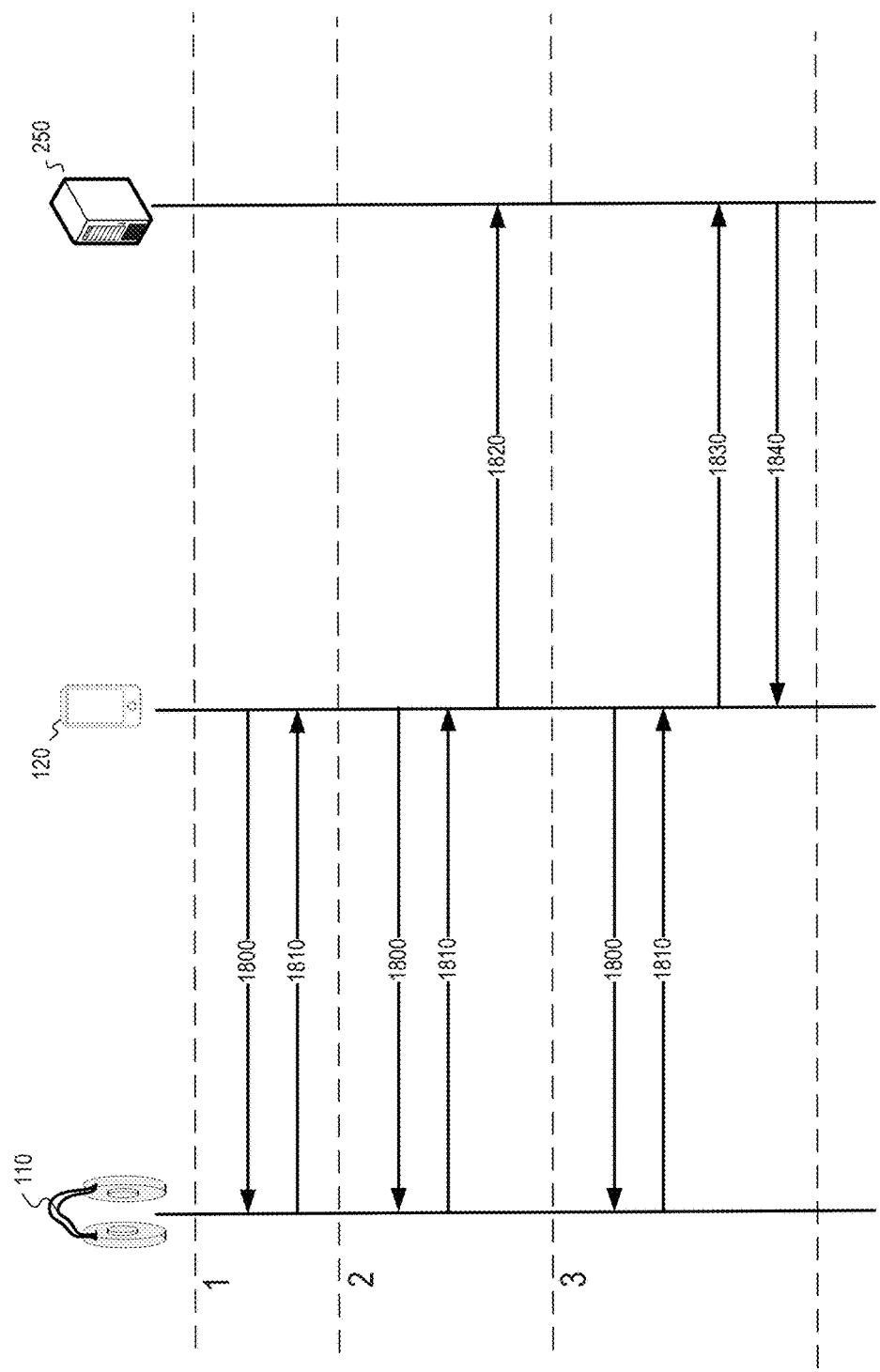

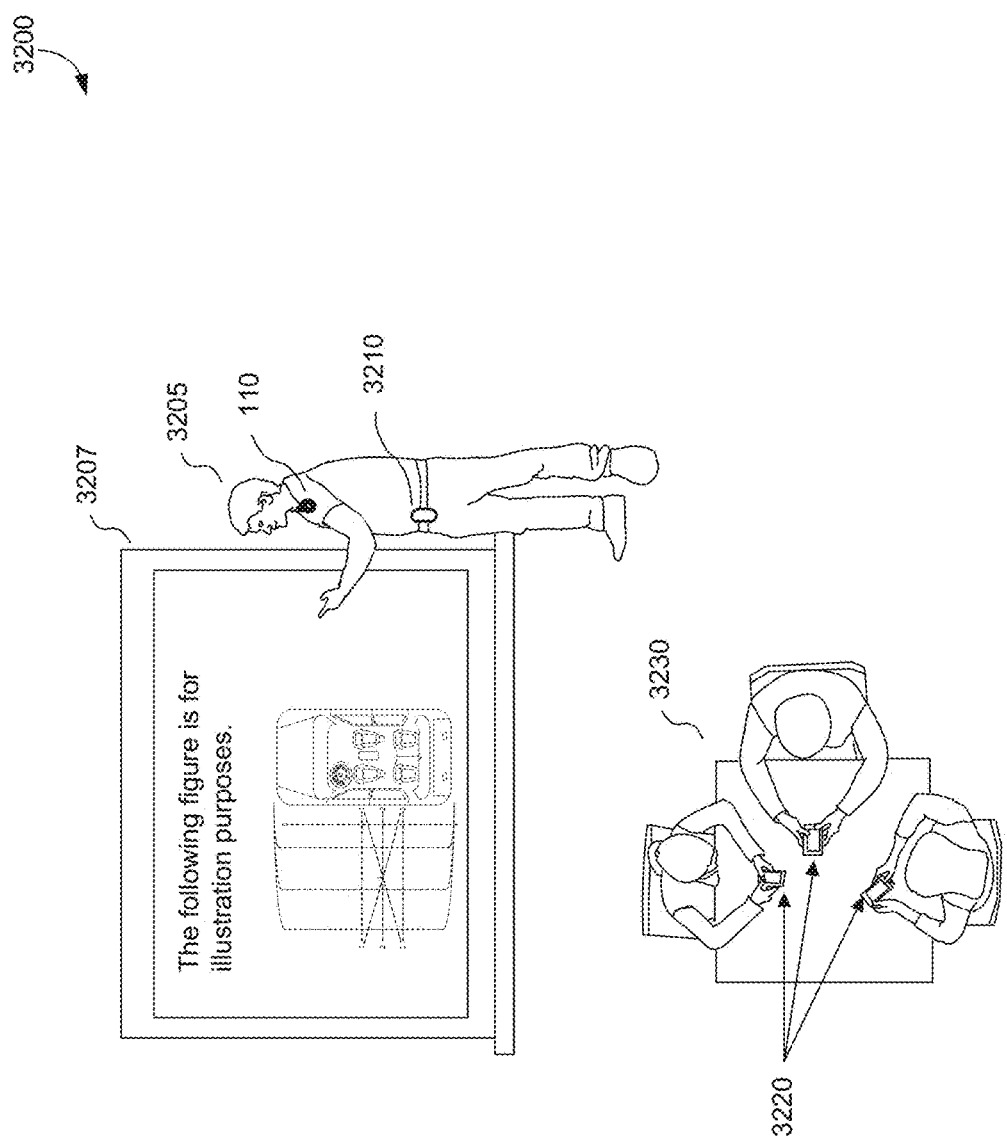

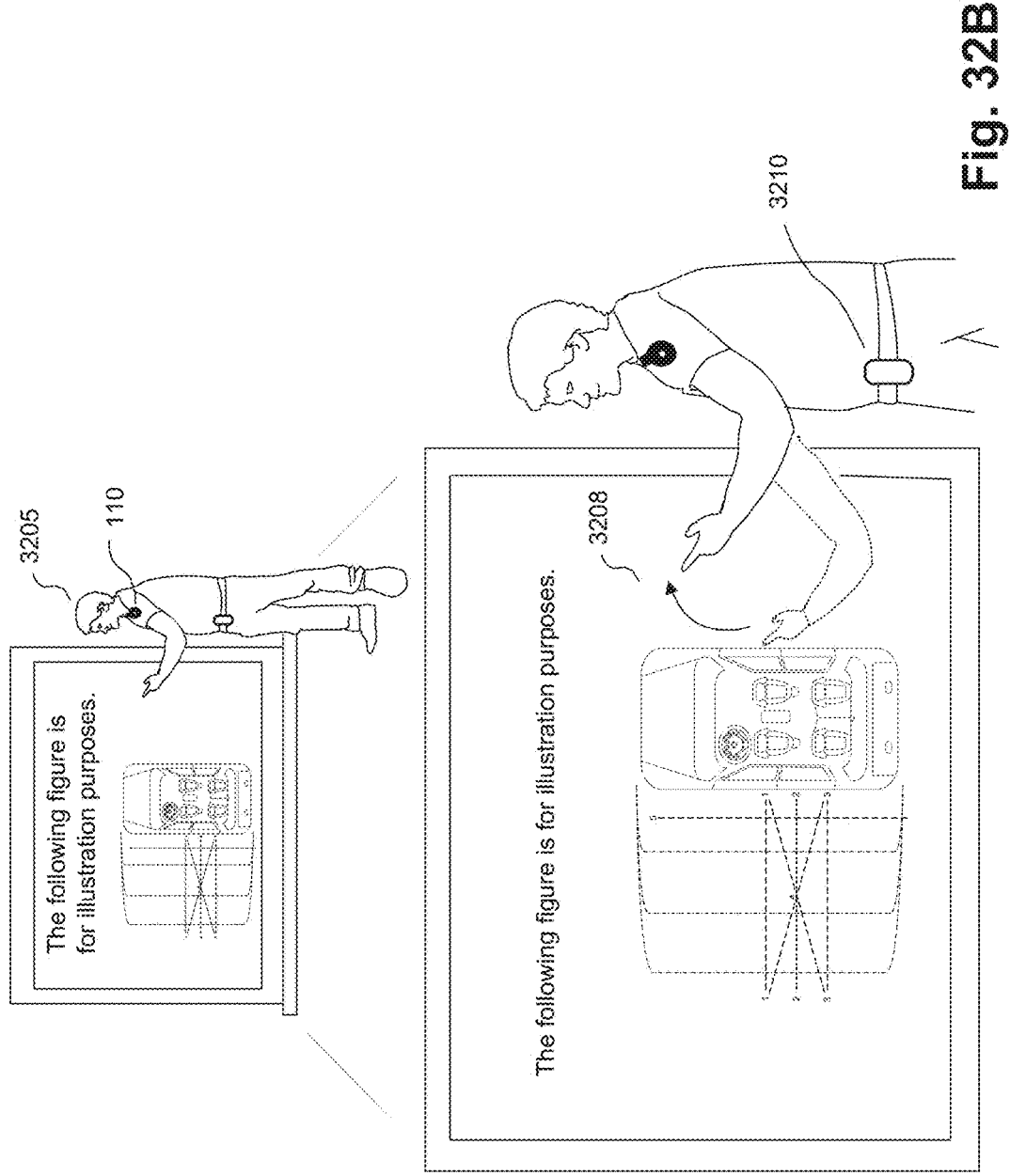

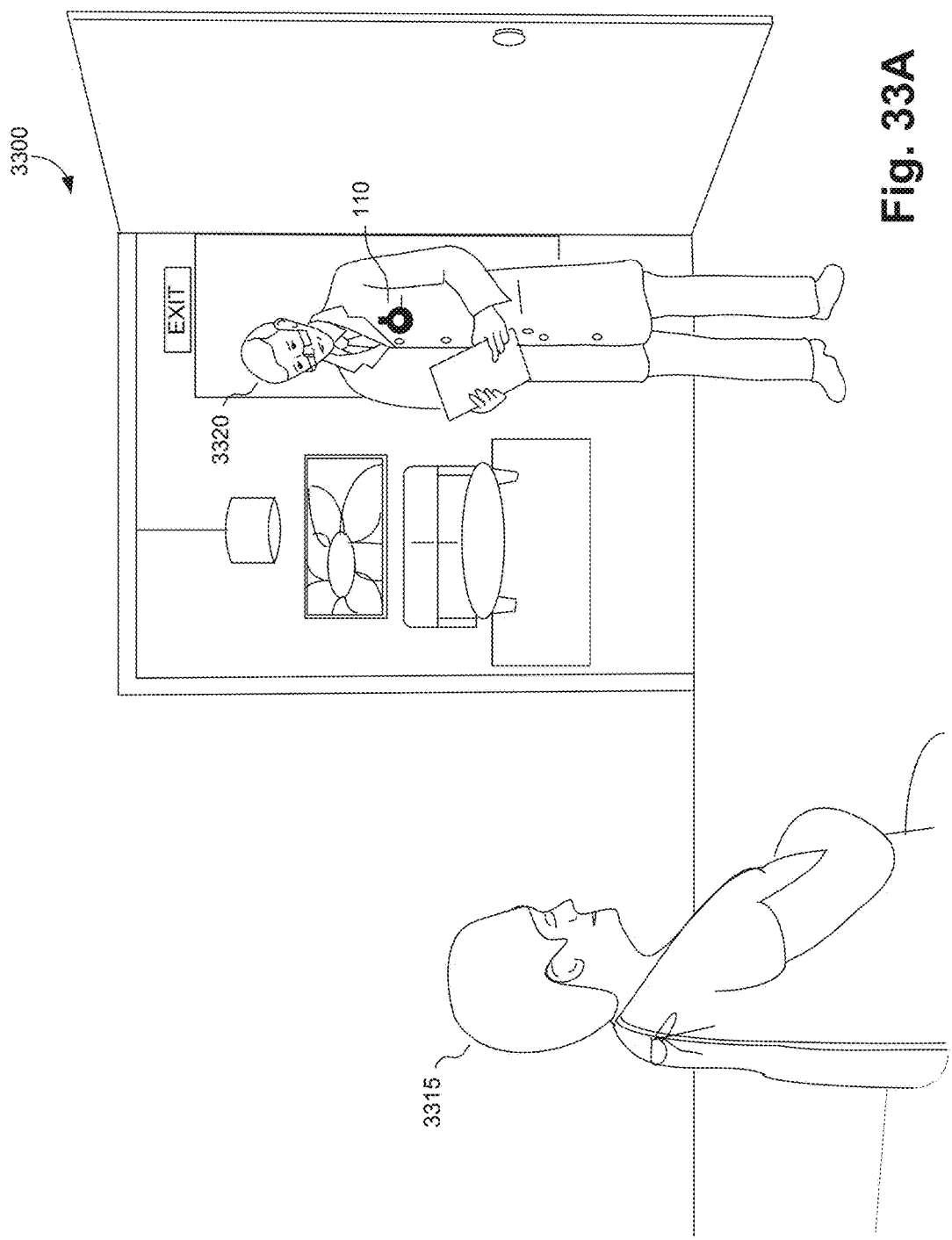

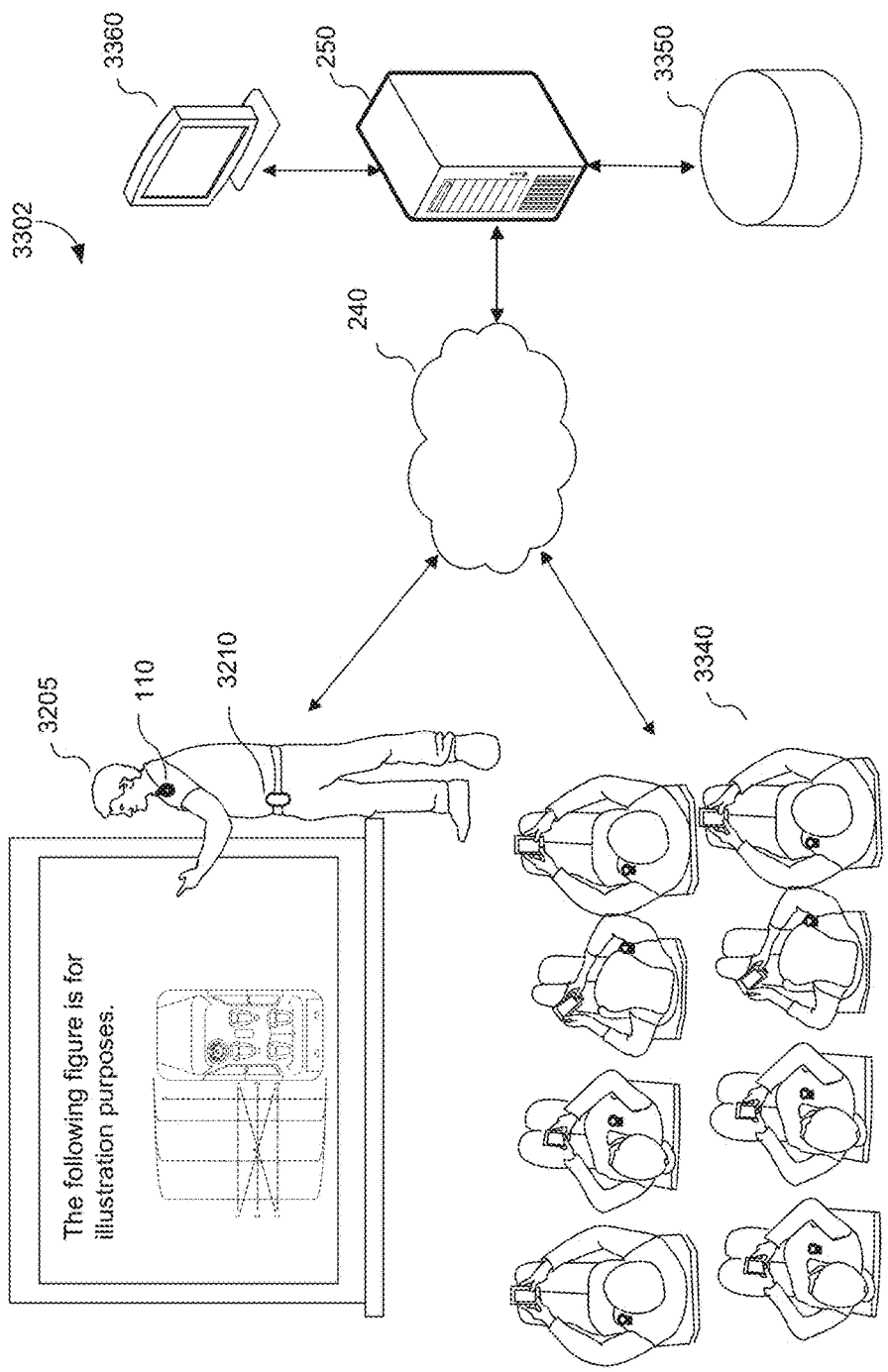

CROWD-SOURCED VISION-BASED INFORMATION COLLECTION

CROSS REFERENCE TO RELATED APPLICATION

This application claims the benefit of priority of U.S. Provisional Patent Application No. 62/275,531, filed Jan. 6, 2016, which is incorporated herein by reference in its entirety.

BACKGROUND

Technical Field

This disclosure generally relates to devices and methods for capturing and processing images from an environment of a user, and using information derived from captured images. More particularly, this disclosure relates to devices and methods for using a wearable device including a camera for capturing information related to the user's environment, and to systems for processing data received from the wearable device.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images to provide useful information to users of the apparatuses, and for systems and methods to process and leverage information gathered by the apparatuses.

SUMMARY

Embodiments consistent with the present disclosure provide devices and methods for automatically capturing and processing images from an environment of a user, and systems and methods for processing information related to images captured from the environment of the user.

Consistent with a disclosed embodiment, a wearable imaging device is provided. The wearable imaging device may include an image capture device, a transmitter, and at least one processing device. The at least one processing device may be programmed to: obtain at least one image captured by the image capture device; analyze the at least one image to detect a contextual situation associated with the at least one image; based on the detected contextual situation, associate with the at least one image a category tag, wherein the category tag is associated with a selected function; determine image-related information associated with the detected contextual situation; and cause the transmitter to transmit the determined image-related information to a device paired with the wearable imaging device to cause the paired device to execute the selected function based on the determined image-related information.

Consistent with another disclosed embodiment, another wearable imaging device is provided. This wearable imaging device may also include an image capture device, a transmitter, and at least one processing device. The at least one processing device may be programmed to: receive a request from a device paired with the wearable imaging device to transmit information associated with a category tag, wherein the category tag is associated with a selected function; obtain at least one image captured by an image capture device included in the wearable imaging device; analyze the at least one image to detect a contextual situation associated with the at least one image; determine, based on the category tag, image-related information associated with the detected contextual situation; and cause the transmitter to transmit the determined image-related information to the paired device to cause the paired device to execute the selected function based on the determined image-related information.

Consistent with another disclosed embodiment, a method is provided. The method may include: receiving a request from a device paired with a wearable imaging device to transmit information associated with a category tag, wherein the category tag is associated with a selected function; obtaining at least one image captured by an image capture device included in the wearable imaging device; analyzing the at least one image to detect a contextual situation associated with the at least one image; determining image-related information associated with the detected contextual situation; and transmitting the determined image-related information to the paired device to cause the paired device to execute the selected function based on the determined image-related information.

Consistent with another disclosed embodiment, a wearable apparatus for visually pairing with an external device is disclosed. The wearable apparatus includes at least one transmitter, a memory, at least one image sensor configured to capture a stream of images from an environment of a user of the wearable apparatus, and at least one processing device. The at least one processing device is programmed to receive the stream of images from the at least one image sensor, analyze the stream of images to detect the external device in the environment of the user, and cause the at least one transmitter to transmit an interrogation signal, the interrogation signal being configured to cause a change in at least one aspect of the external device. The at least one processing device is further programmed to analyze the stream of images to detect the change in the at least one aspect of the external device and, after detection of the change in the at least one aspect of the external device, store in the memory information relating to the external device.

Consistent with another disclosed embodiment, a method for visually pairing with an external device is disclosed. The method includes receiving a stream of images captured from an environment of a user of a wearable apparatus, analyzing the stream of images to detect the external device in the environment of the user, and causing at least one transmitter associated with the wearable apparatus to transmit an interrogation signal, the interrogation signal being configured to cause a change in at least one aspect of the external device. The method further includes analyzing the stream of images to detect the change in the at least one aspect of the external device, and, after detection of the change in the at least one aspect of the external device, storing information relating to the external device.

Consistent with another disclosed embodiment, a system for controlling one or more controllable devices includes a transceiver and at least one processing device. The processing device is programmed to obtain one or more images captured by an image sensor included in a wearable apparatus, analyze the one or more images to identify a controllable device in an environment of a user of the wearable apparatus, analyze the one or more images to detect a visual trigger associated with the controllable device and, based on the detection of the visual trigger, transmit, via the transceiver, a command. The command is configured to change at least one aspect of the controllable device.

Consistent with another disclosed embodiment, a method for controlling one or more controllable devices includes obtaining one or more images captured by an image sensor included in a wearable apparatus, analyzing the one or more images to identify a controllable device in an environment of a user of the wearable apparatus, analyzing the one or more images to detect a visual trigger associated with the controllable device, and, based on the detection of the visual trigger, transmitting a command. The command is configured to change at least one aspect of the controllable device.

Certain embodiments of the present disclosure relate to a server-based system for interacting with a plurality of wearable apparatuses. Each wearable apparatus may be associated with a different user. The system may include a data interface and at least one processing device. The at least one processing device may be programmed to receive, via the data interface and for each of the plurality of wearable apparatuses, a data stream including image-based information associated with images captured by a camera present on a particular wearable apparatus from among the plurality of wearable apparatuses. The system may also analyze the image-based information of the data streams received from each of the plurality of wearable apparatuses to determine at least one trait common to two or more of the different users of the plurality of wearable apparatuses. The system may also store in a database information relating to the determined at least one trait.

Certain embodiments of the present disclosure also relate to a method for interacting with a plurality of wearable apparatuses. Each wearable apparatus may be associated with a different user. The method may include receiving, for each of the plurality of wearable apparatuses, a data stream including image-based information associated with images captured by a camera present on a particular wearable apparatus from among the plurality of wearable apparatuses. The method may also include analyzing the image-based information of the data streams received from each of the plurality of wearable apparatuses to determine at least one trait common to two or more of the different users of the plurality of wearable apparatuses. The method may further include storing in a database information relating to the determined at least one trait.

Consistent with a disclosed embodiment, a wearable apparatus is provided for identifying a contextual situation related to a wearer. The wearable apparatus may include a wearable image sensor configured to capture a plurality of images from an environment of the wearer. The wearable apparatus may further include a transmitter and at least one processing device. The at least one processing device may be programmed to: analyze the plurality of images to identify the contextual situation related to the wearer; determine information associated with the contextual situation; and cause the transmitter to transmit the determined information to a device paired with the wearable apparatus to cause the paired device to provide at least one alert to the wearer based on the determined information associated with the contextual situation.

Consistent with another disclosed embodiment, a method is provided for identifying a contextual situation related to a wearer of a wearable apparatus. The method includes: receiving a plurality of images captured from an environment of the wearer; analyzing the plurality of images to identify the contextual situation related to the wearer; determining information associated with the contextual situation; and causing a device paired with the wearable apparatus to provide at least one alert to the wearer based on the determined information associated with the contextual situation.

Consistent with yet another disclosed embodiment, a software product stored on a non-transitory computer readable medium and comprising data and computer implementable instructions for carrying a method for identifying a contextual situation related to a wearer of a wearable apparatus, is provided. The method includes: receiving a plurality of images captured from an environment of the wearer; analyzing the plurality of images to identify the contextual situation related to the wearer; determining information associated with the contextual situation; and presenting on a display at least one alert to the wearer based on the determined information associated with the contextual situation.

Certain embodiments of the present disclosure relate to a system for facilitating collaboration between individuals. The system may include a transceiver and at least one processing device. The at least one processing device may be programmed to obtain one or more images captured by an image sensor included in a wearable apparatus. The at least one processing device may also be programmed to analyze the one or more images to detect a visual trigger in an environment of a wearer of the wearable apparatus. The visual trigger may be associated with a collaborative action to be taken. The at least one processing device may also be programmed to transmit, via the transceiver, an indicator relating to the visual trigger associated with the collaborative action to be taken.

Certain embodiments of the present disclosure also relate to a server-based system for facilitating collaboration among users of a plurality of wearable apparatuses. The system may comprise a data interface and at least one processing device. The at least one processing device may be programmed to receive, via the data interface, a data stream including image-based information associated with images captured by a camera present on a particular wearable apparatus from among the plurality of wearable apparatuses. The at least one processing device may also be programmed to analyze the image-based information to determine a visual trigger associated with a collaborative action to be taken. In some embodiments, the collaborative action may include distributing information to two or more devices. And the at least one processing device may also be programmed to distribute the information to the two or more devices based on the visual trigger.

Certain embodiments of the present disclosure also relate to a method for facilitating collaboration between individuals. The method may comprise obtaining one or more images captured by an image sensor included in a wearable apparatus. The method may also include analyzing the one or more images to detect a visual trigger in an environment of a wearer of the wearable apparatus. In some embodiments, the visual trigger may be associated with a collaborative action to be taken. The method may also include transmitting an indicator relating to the visual trigger associated with the collaborative action to be taken.

Certain embodiments of the present disclosure also relate to a method for facilitating collaboration among users of a plurality of wearable apparatuses. The method may include receiving a data stream including image-based information associated with images captured by a camera present on a particular wearable apparatus from among the plurality of wearable apparatuses. The method may also include analyzing the image-based information to determine a visual trigger associated with a collaborative action to be taken. In some embodiments, the collaborative action may include distributing information to two or more devices. The method may further include, based on the visual trigger, distributing the information to the two or more devices.

In accordance with a disclosed embodiment, a wearable imaging apparatus having variable privacy settings is provided. The apparatus may comprise a wearable image sensor configured to capture a plurality of images from an environment of a wearer of the wearable imaging apparatus, a memory for storing privacy mode triggers and associated privacy mode settings, and at least one processing device. The at least one processing device may be programmed to analyze the plurality of images and recognize within one or more of the plurality of images a presence of at least one of the privacy mode triggers. Further, the processor device may be programmed to automatically cause one or more adjustments to the wearable imaging apparatus based on the privacy mode settings associated with the at least one recognized privacy mode trigger.

In accordance with another disclosed embodiment, a method for adjusting variable privacy settings of a wearable imaging apparatus is provided. The method includes receiving a plurality of images captured from an environment of a wearer of the wearable imaging apparatus. The method further includes analyzing the plurality of images and recognizing within one or more of the plurality of images a presence of at least one privacy mode trigger. Also, the method includes automatically causing one or more adjustments to the wearable imaging apparatus based on a privacy mode setting associated with the at least one recognized privacy mode trigger.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 3B is an exploded view of the example of the wearable apparatus shown in FIG. 3A.

FIG. 4B is a schematic illustration of the example of the wearable apparatus shown in FIG. 1B from a second viewpoint.

FIG. 5B is a block diagram illustrating an example of the components of a wearable apparatus according to a second embodiment.

FIG. 18A is a message flow diagram that depicts the communication between a wearable apparatus and a paired device for three different types of selected functions consistent with disclosed embodiments.

FIG. 32A illustrates an example collaborative environment consistent with the disclosed embodiments.

FIG. 32B illustrates an exemplary hand gesture as a visual trigger associated with a collaborative action consistent with the disclosed embodiments.

FIG. 33A illustrates an exemplary visual trigger associated with a collaborative action consistent with the disclosed embodiments.

FIG. 33C illustrates an example environment consistent with the disclosed embodiments.

DETAILED DESCRIPTION

Figure 1A:
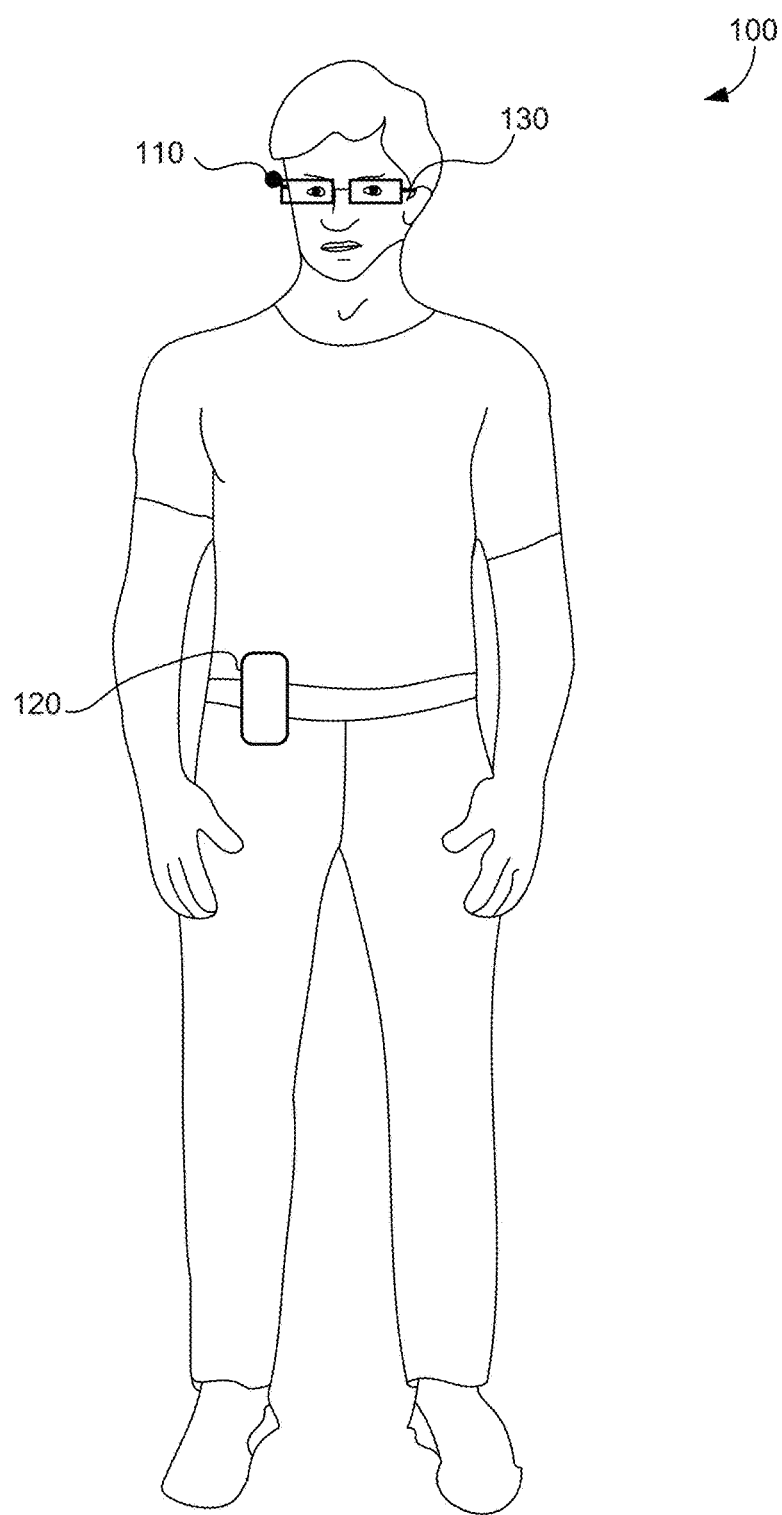
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
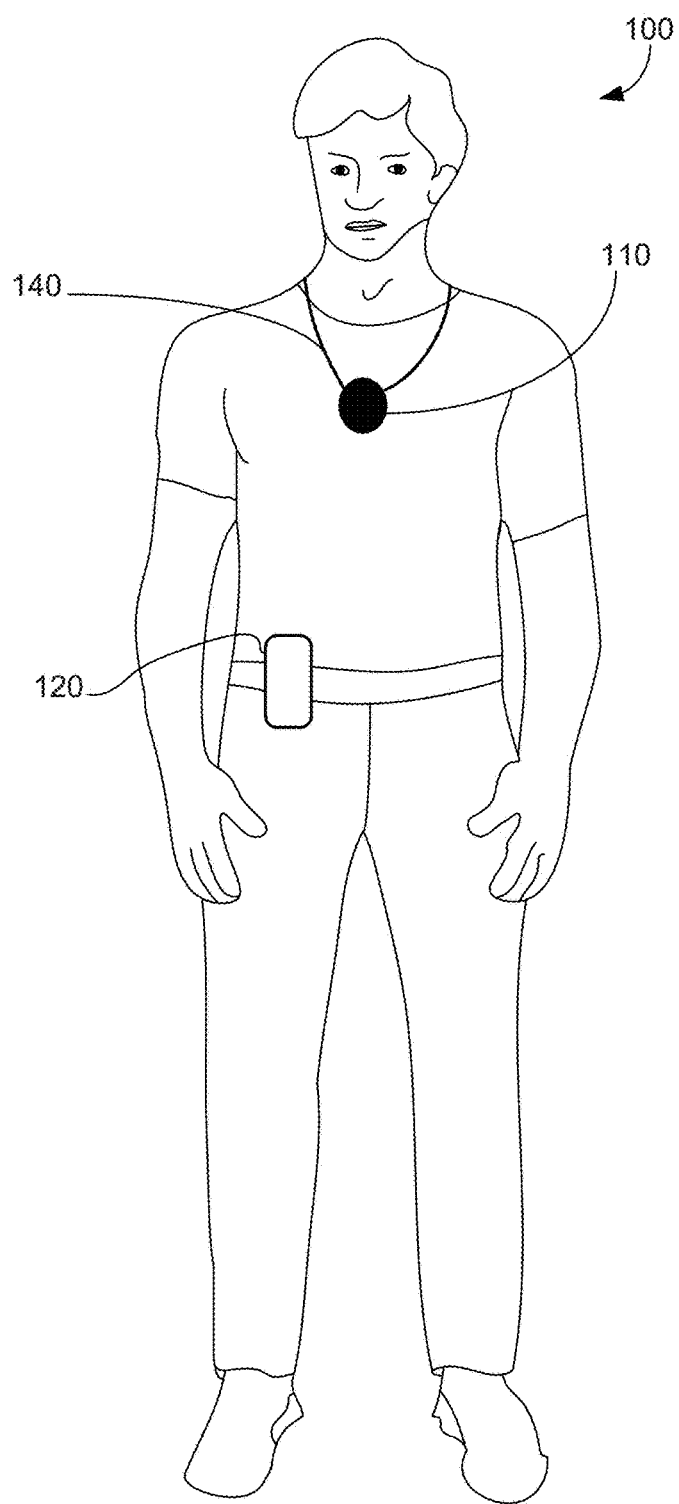
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
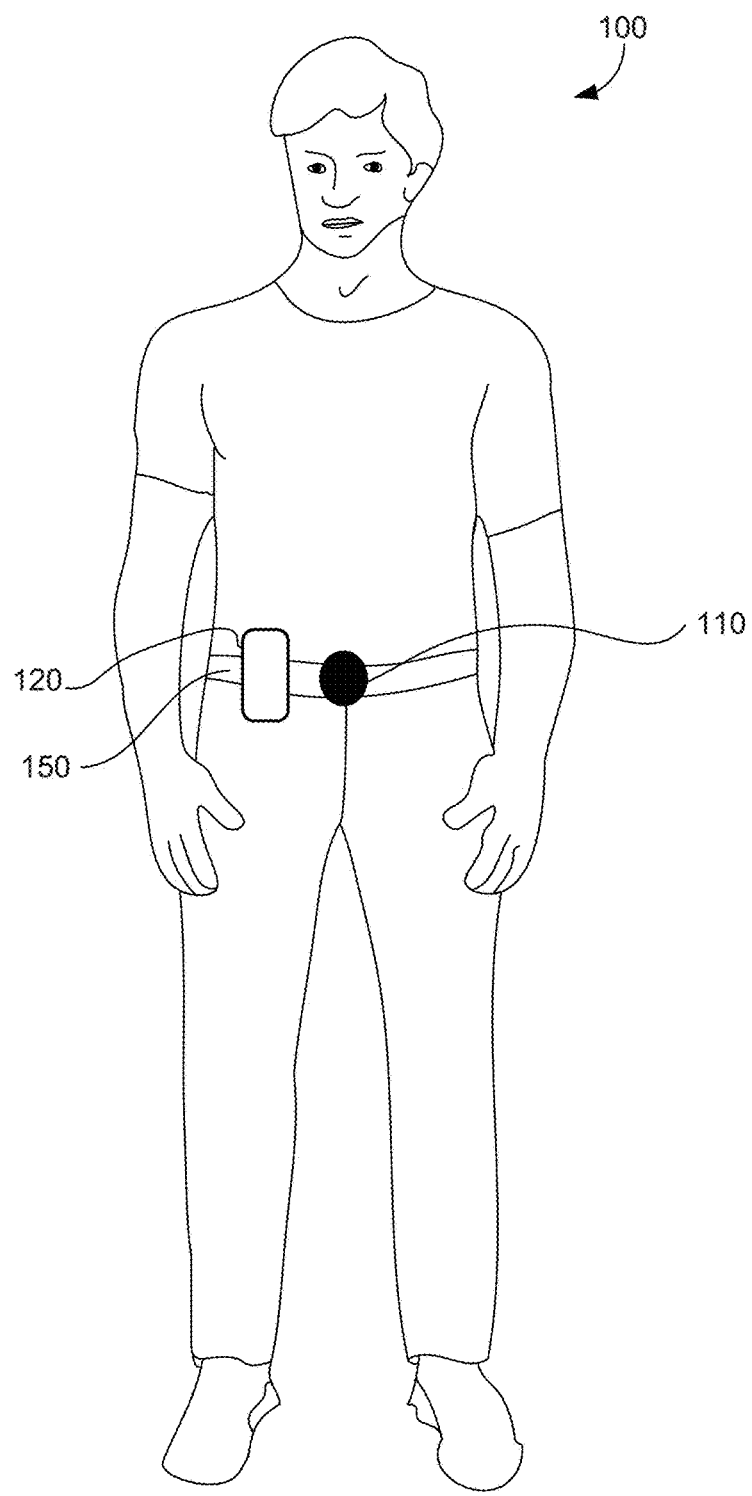
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
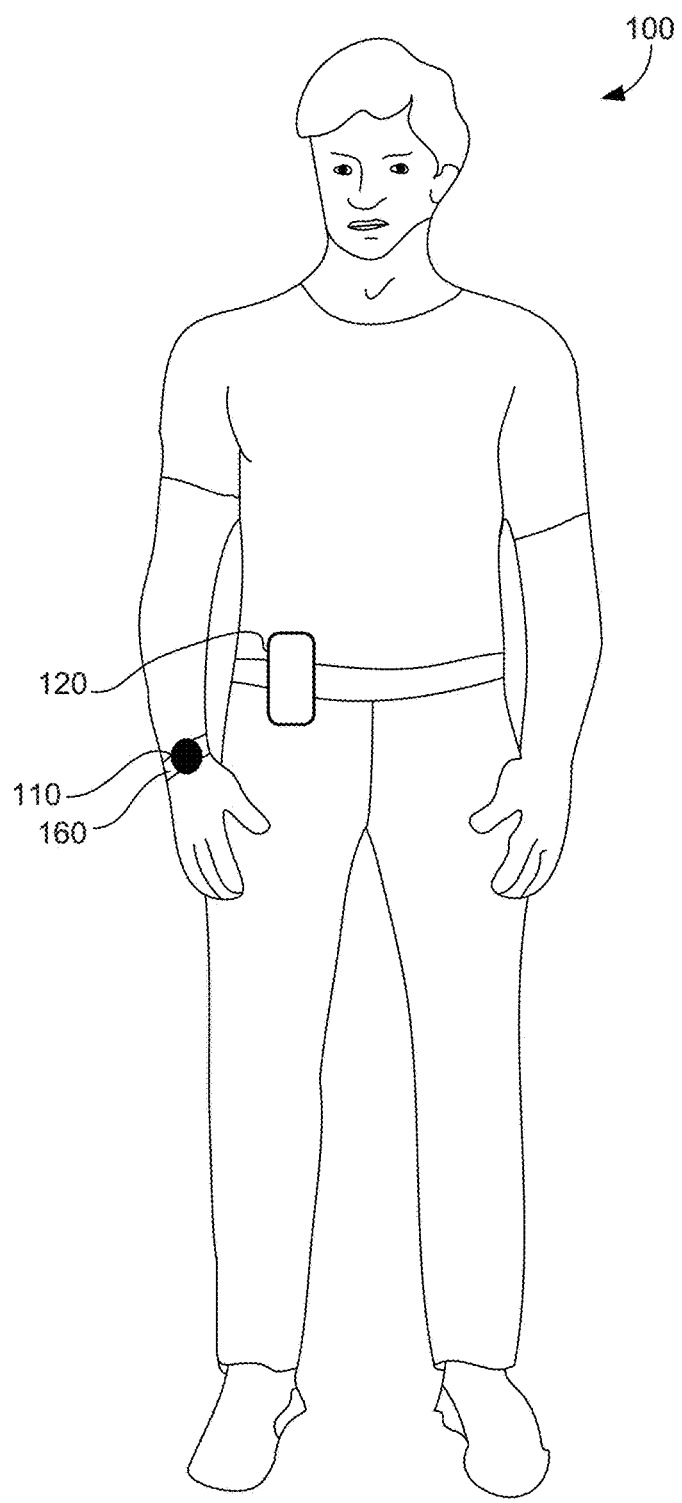
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
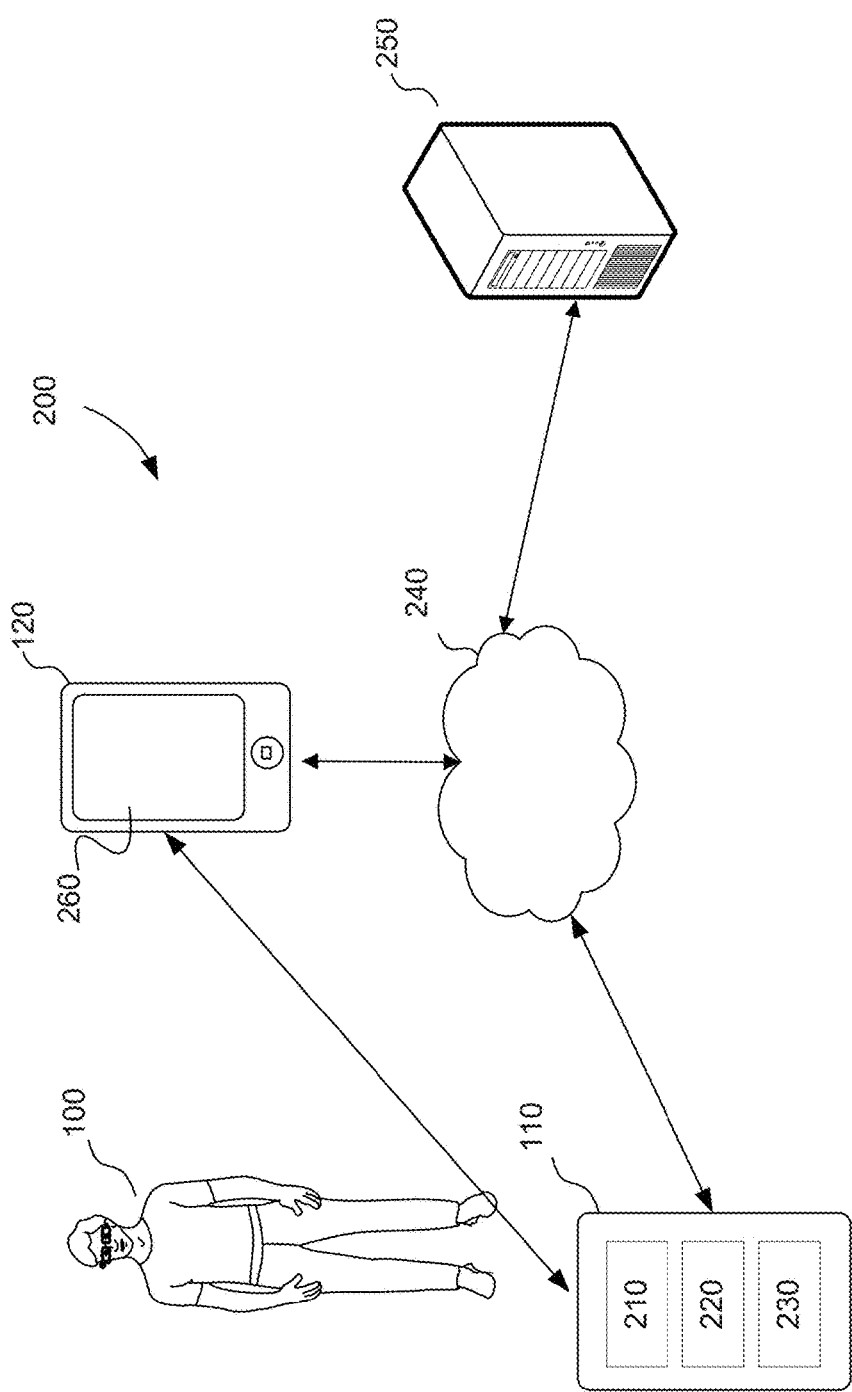
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
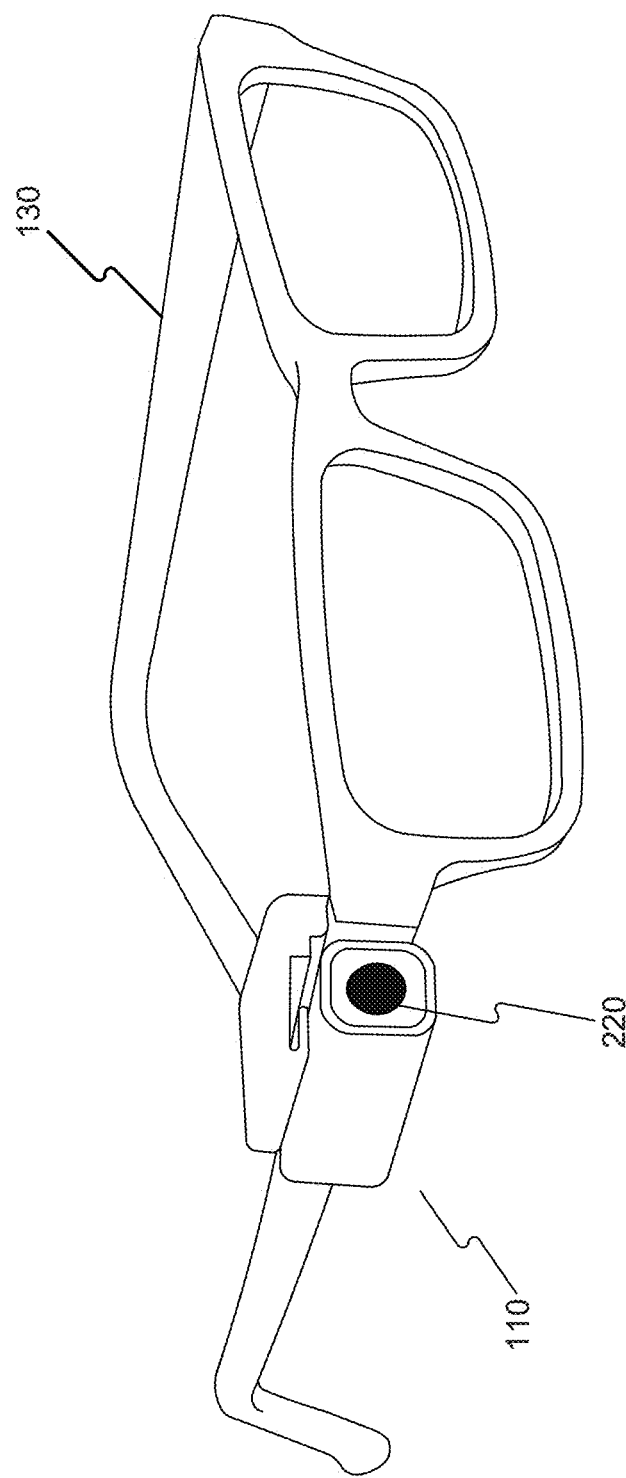
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
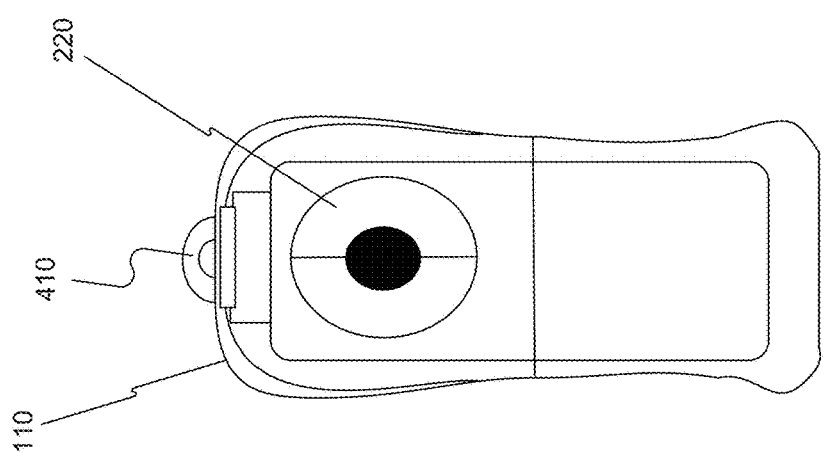
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
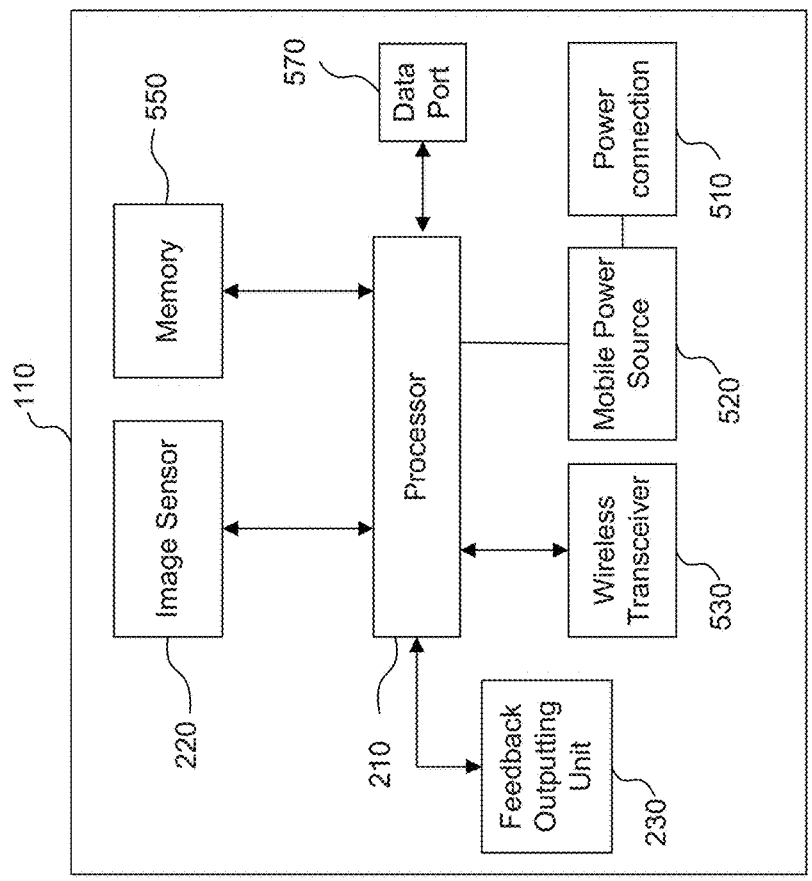
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc.

Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
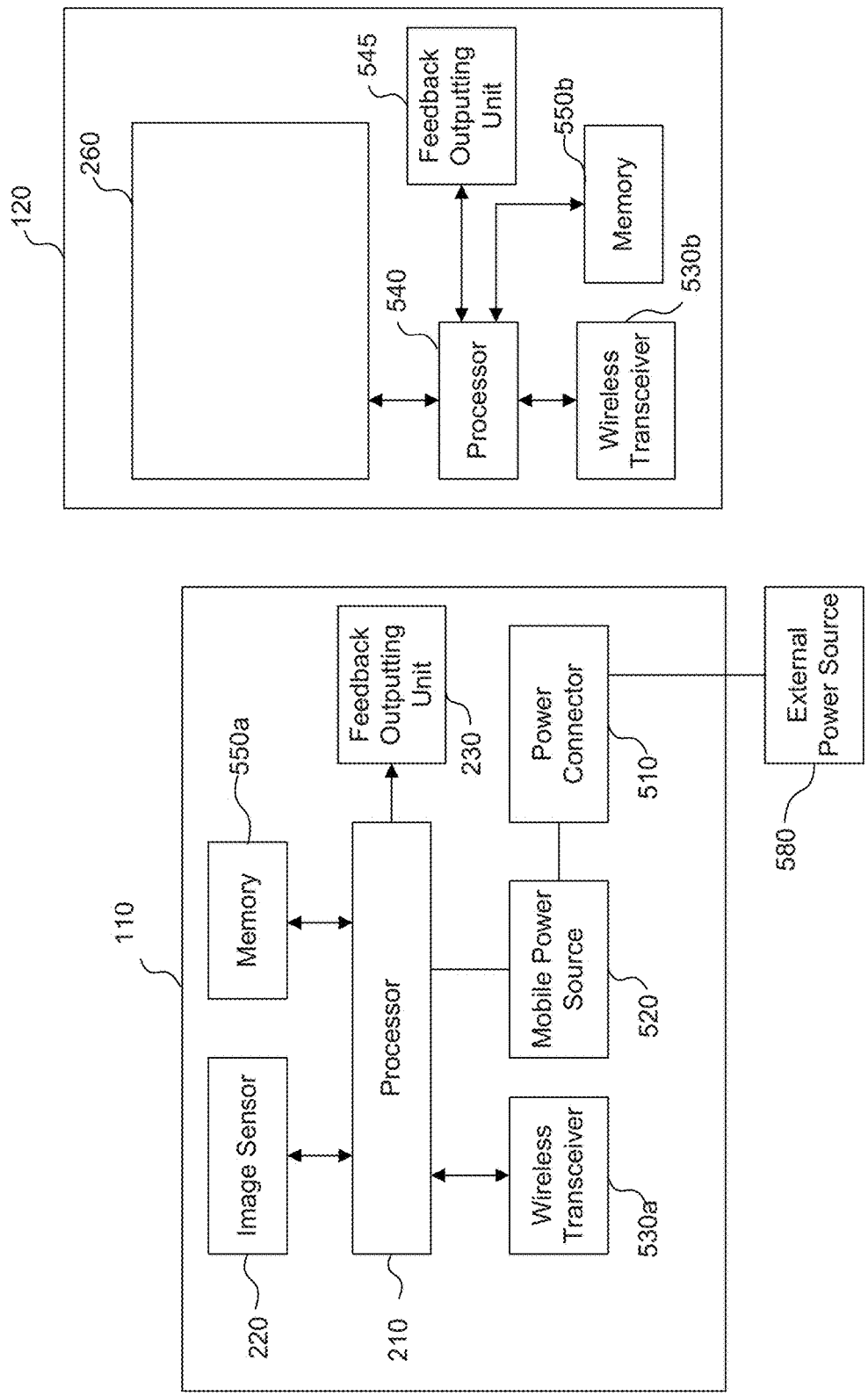
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
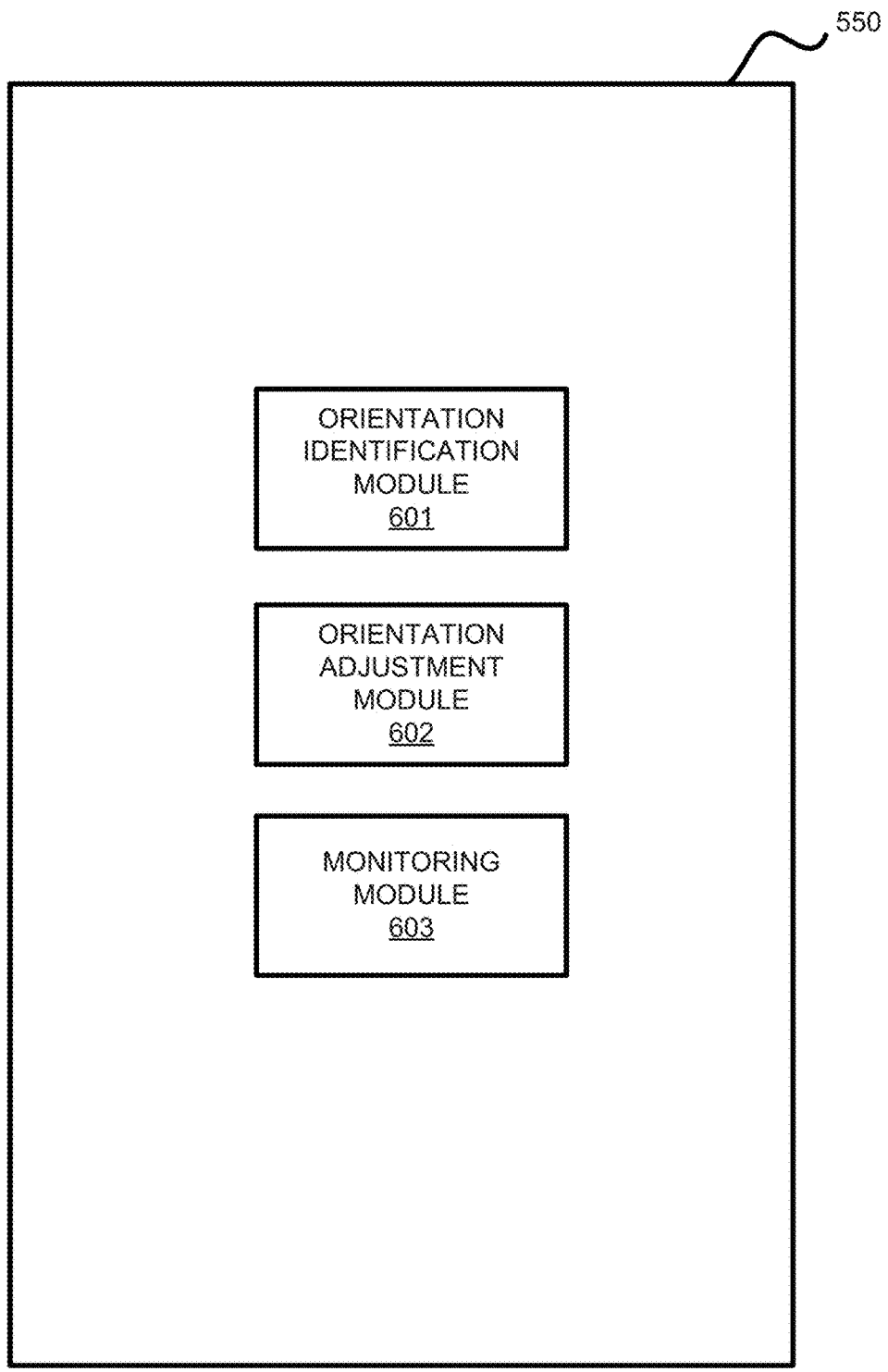
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
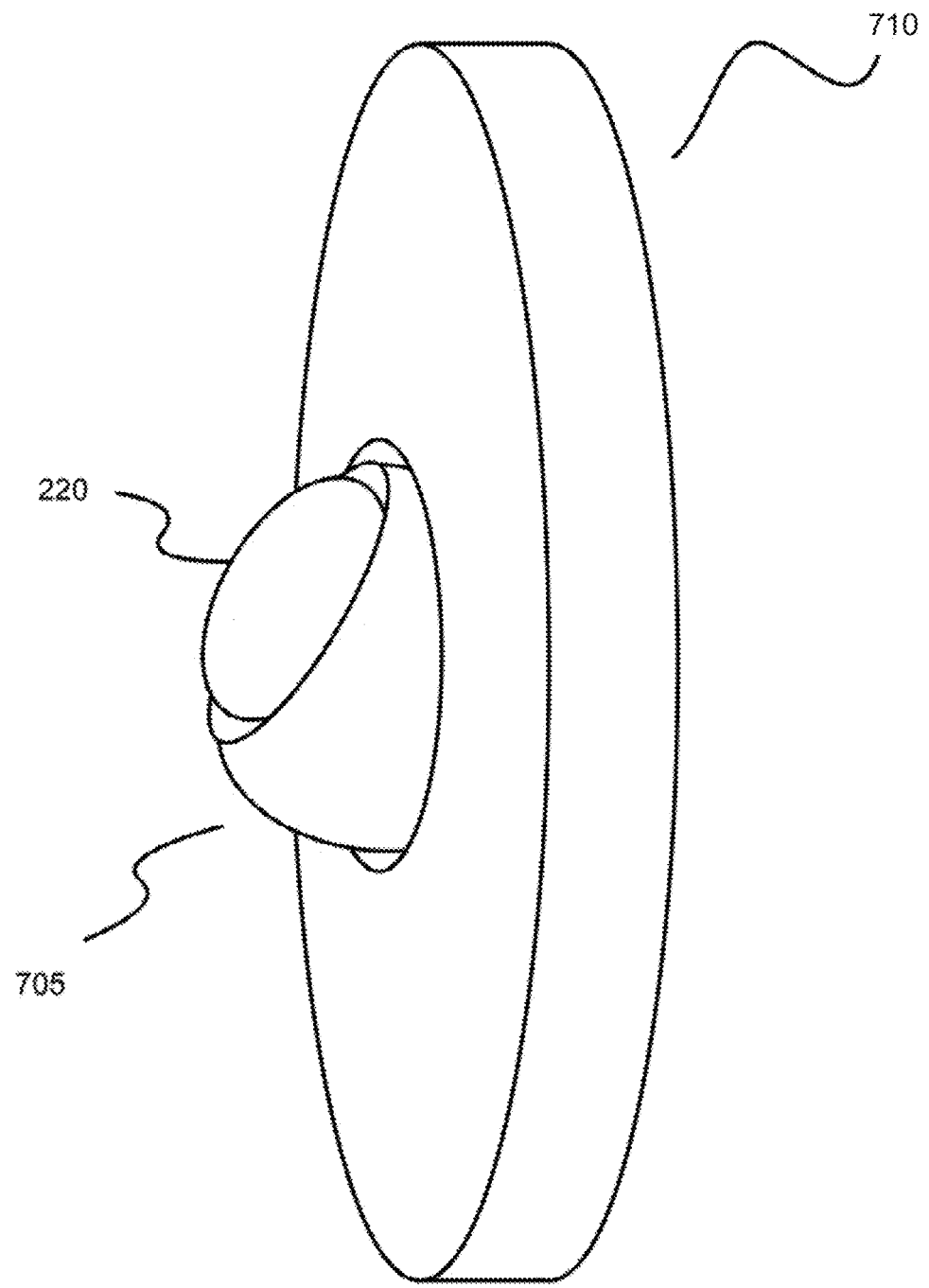
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
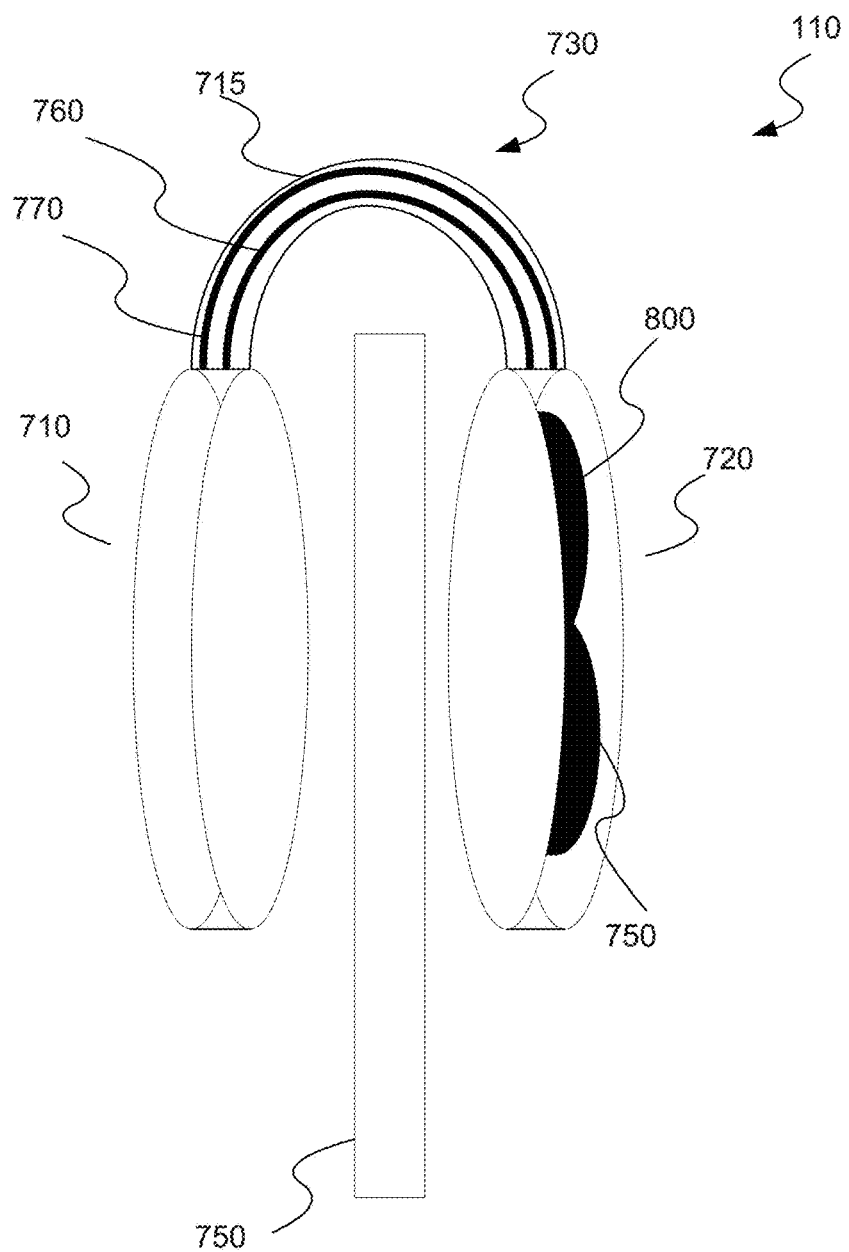
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
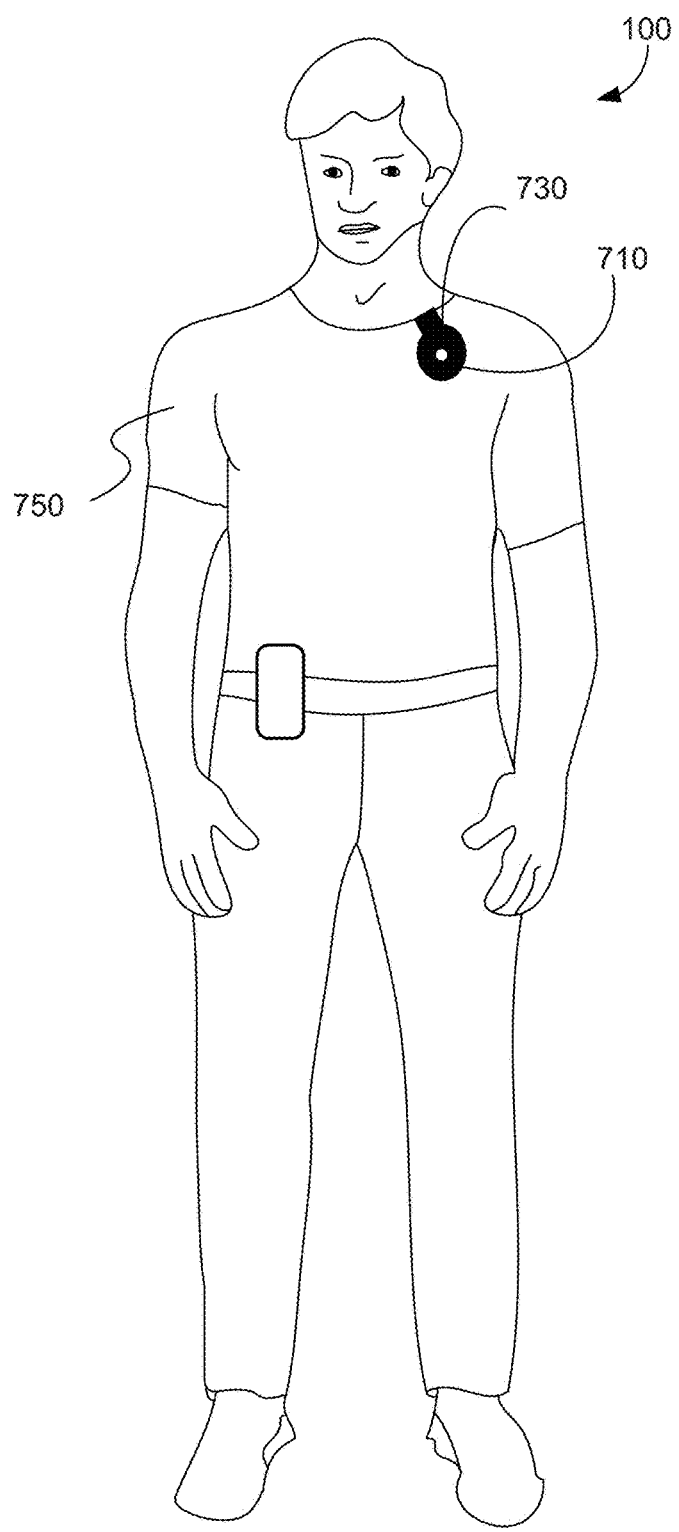
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
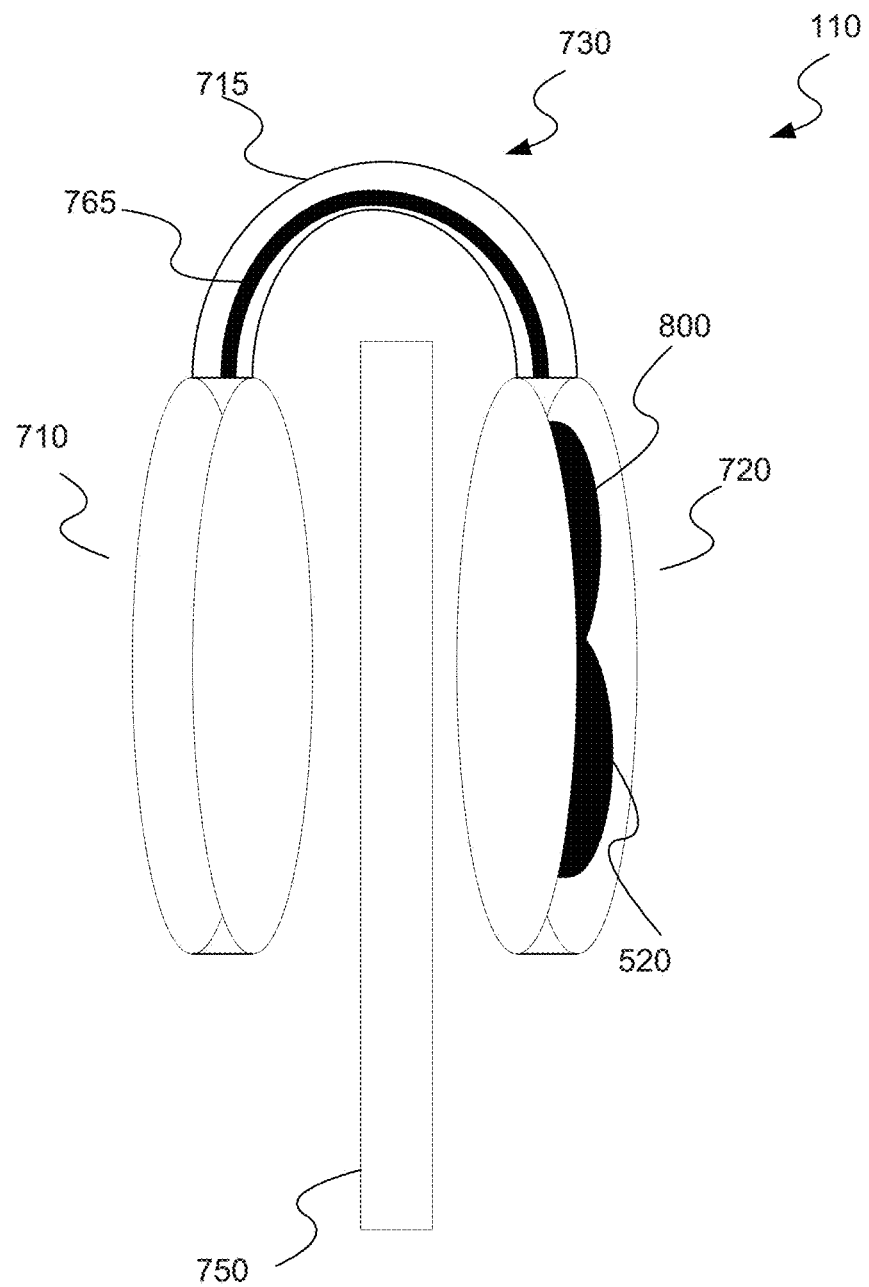
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
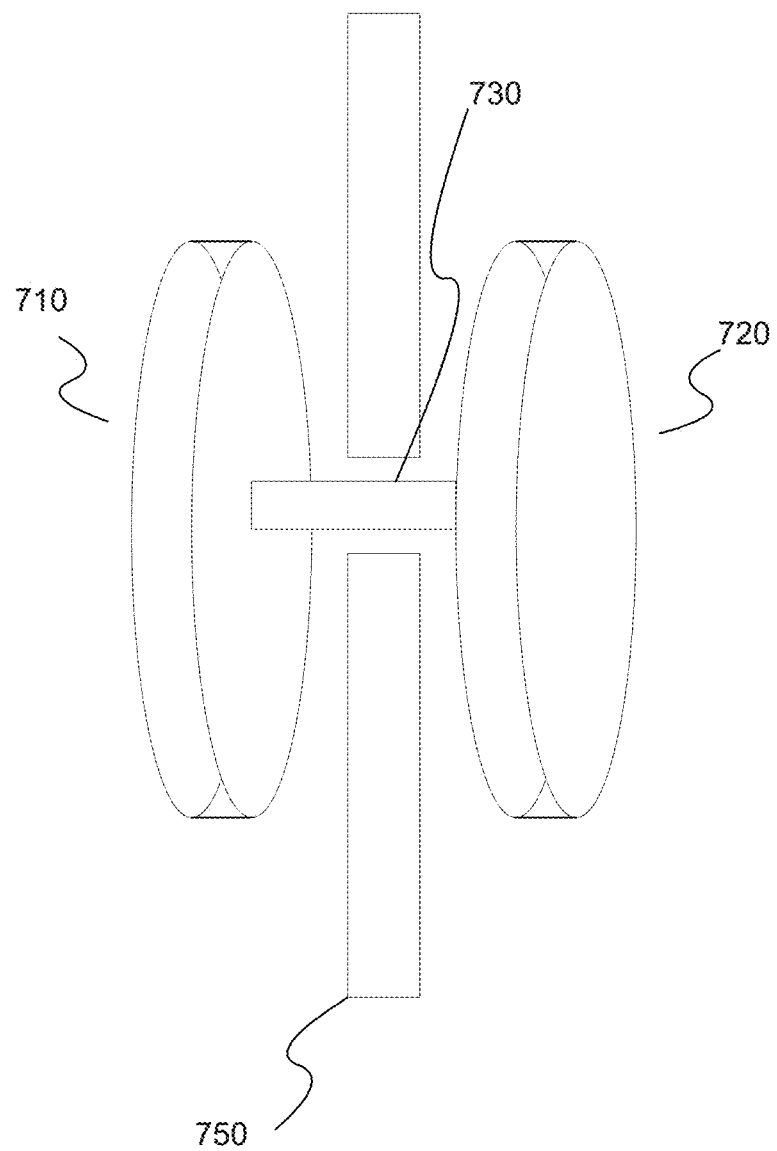
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
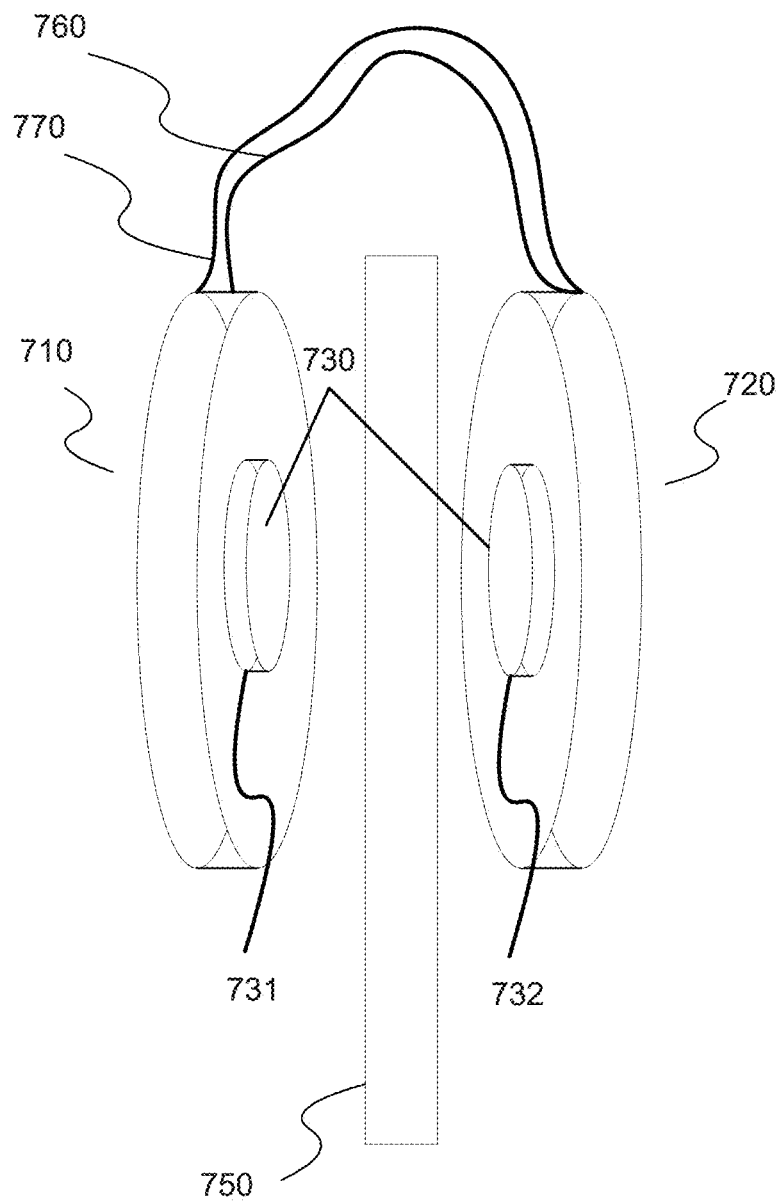
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
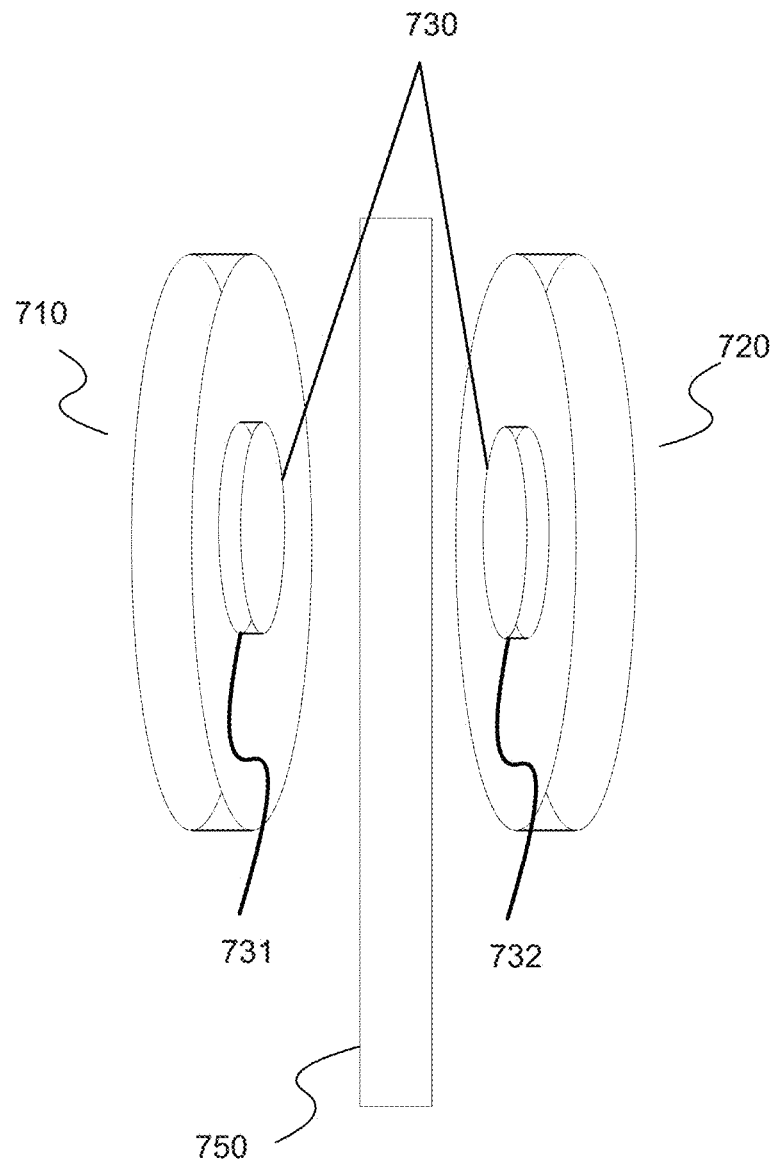
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
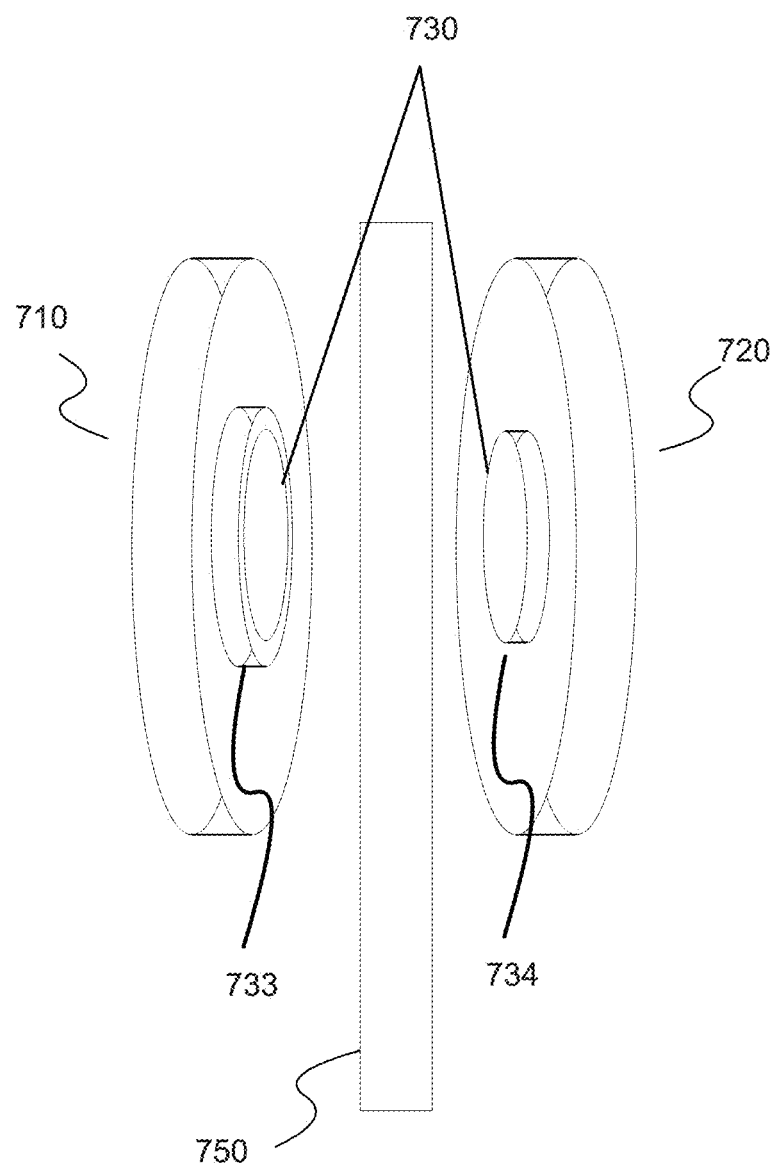
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
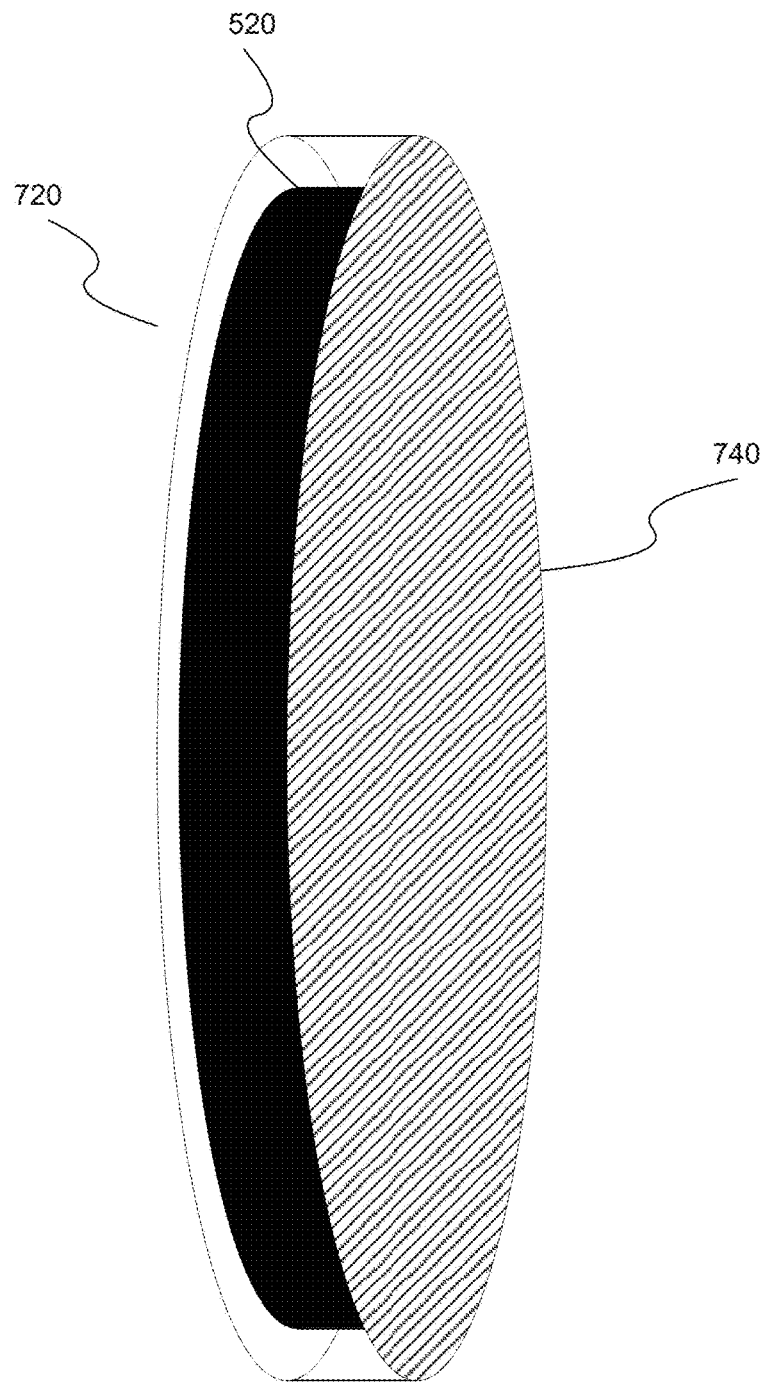
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
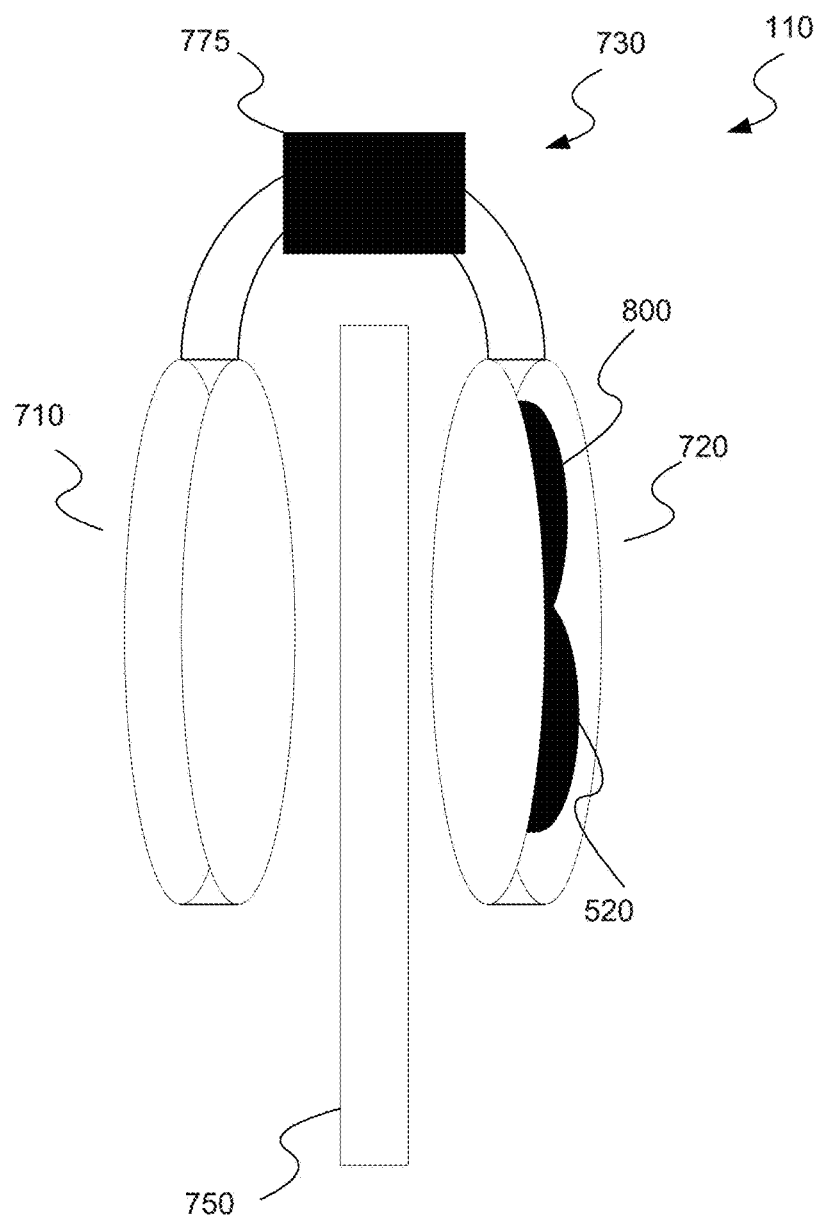
FIG. 16 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

In some embodiments, wearable apparatus 110 may cause a paired device, such as computing device 120, to execute a search query based on one or more keywords determined from an identified contextual situation. Contextual situations may refer to a combination of circumstances that may influence a user's actions, as described below.

In some embodiments, wearable apparatus 110 may be used to control a controllable device, as described below. For example, the controllable device may include a screen in an environment of wearable apparatus 110, and be configured to display search results of a search query that is based on at least one keyword determined by wearable apparatus 110. Wearable apparatus 110 may cause the controllable device to browse through the search results, for example, in response to one or more hand gestures detected by wearable apparatus 110.

In some embodiments, wearable apparatus 110 may enter a privacy mode in certain situations, as described below. In some examples, the privacy mode may control what keywords and/or search queries are transmitted and/or executed and/or presented. For example, some private search queries may be withheld when other persons are in the vicinity of the user of wearable apparatus 110, when children are in the vicinity of the user of wearable apparatus 110, and so forth. In some examples, based on wearable apparatus 110 entering a privacy mode, some search queries may be performed in an incognito or a private browsing mode. In some examples, based on wearable apparatus 110 entering a privacy mode, keywords may or may not be posted on a social media profile.

Triggering Selected Functions Using Image Analysis

In some embodiments, wearable apparatus 110 may cause a paired device, such as computing device 120, to execute a selected function based on information determined from an identified contextual situation. Contextual situations may refer to a combination of circumstances that may influence a user's actions. Examples of factors that may differentiate contextual situations include: the identity of other people in the vicinity of user 100 (e.g., certain individual, family members, coworkers, strangers, and more), the type of activity user 100 is engaged (e.g., watching a movie, meeting with an individual, visiting a location, interacting with an object, entering a car, participating in a sport activity, eating a meal, and more), the time in which the situation took place (e.g., the time of the day, the time of the year, and more), the location in which the situation occurs (e.g., home, working place, shopping mall, and more).

User 100 may encounter a significant number of diverse types of contextual situations during the course of a given day. Identifying and transmitting information about all the contextual situations that user 100 encounters throughout his/her day may drain the battery power of wearable apparatus 110. To address this drawback, wearable apparatus 110 may determine and transmit information only when encountering contextual situations that user 100 is interested in. However, determining which contextual situations are of interest to user 100 may be complex. For example, one user may want to know about the food he/she ate, another user may want to know about people he/she met, and yet another user may want to track activities that he/she participated in. Therefore, wearable apparatus 110 may enable user 100 and/or paired devices to dynamically indicate the contextual situations he/she is interested in, and computing device 120 may execute a selected function after user 100 encounters the selected contextual situation. In another example, at one time and/or after detecting a particular context, a paired device (e.g., computing device 120) may execute one or more applications that use information related to one set of contextual situations, while executing applications that use information related to a second set of contextual situations at another time and/or after detecting a particular context. In another example, a first paired device may execute one or more applications that use information related to one set of contextual situations, while a second paired device may execute one or more applications that use information related to a second set of contextual situations, and wearable apparatus 110 may transmit different information to different paired devices according to the contextual situations.

One way for wearable apparatus 110 to determine which contextual situations are of interest to user 100 is using category tags. Category tags may include digital data that characterizes contextual situations. The characterization of a contextual situation may be general (e.g., a type of activity, a general location, a typo of product, etc.) or may be more specific (e.g., a name of a person, an address, a name of a product, etc.).

One or more category tags may be assigned to an image based on the content identified in the image and/or based on metadata information (e.g., location, time) associated with the image. One skilled in the art will appreciate that any image associated with at least one contextual situation may include a plurality of category tags.

In one embodiment, wearable apparatus 110 may receive a request from computing device 120 to transmit information associated with a particular category tag. The request may include a specific combination of circumstances and/or factors that defines the looked-for contextual situation associated with that category tag. For example, user 100 may want to keep records of his encounters with certain individuals outside working hours. In some embodiments, the request may be provided by an application executing on a device remote from wearable apparatus 110 (e.g., a smartphone, tablet, or smart watch paired with wearable device 110, or a server in communication with wearable device 110). For example, user 100 may make use of an application or have registered with an application to keep track of his encounters with other people. As part of configuring user preferences with such an application, user 100 may have specified an interest, in particular, of tracking encounters with co-workers outside of working hours. The configuring may involve, for example, selecting and/or enabling functionality to consider images that have been classified (e.g., via category tags) related to co-workers (e.g., certain identified individuals) and a particular time period (e.g., outside of typical working hours).

In operation, wearable apparatus 110 may associate a category tag with at least one image obtained from image sensor 220. With regards to the example above, an image captured after 6 p.m. that includes at least one of the identified individuals may be associated with a category tag such, as for example, "Hanging out with my coworkers." The category tag may also be associated with a selected function that a paired device may execute. The selected function associated with a category tag may be to store information (e.g., when, where, how long, who was there) about the detected contextual situation. With regards to the example above, wearable apparatus 110 may process images with the category tag "Hanging out with my coworkers" to determine information about the encounter and to transmit the information to computing device 120 to cause computing device 120 to store the information in memory 550b and/or in a remote server. Computing device 102 and/or the remote server may then process the received information and provide feedback to user 100 (e.g., a summary of co-workers that user 100 encounter after 6 p.m. Additional exemplary embodiments of contextual situations, category tags, and the types of selected functions that may be triggered are discussed in further detail with respect to FIGS. 17A-17D.

Figure 17A:
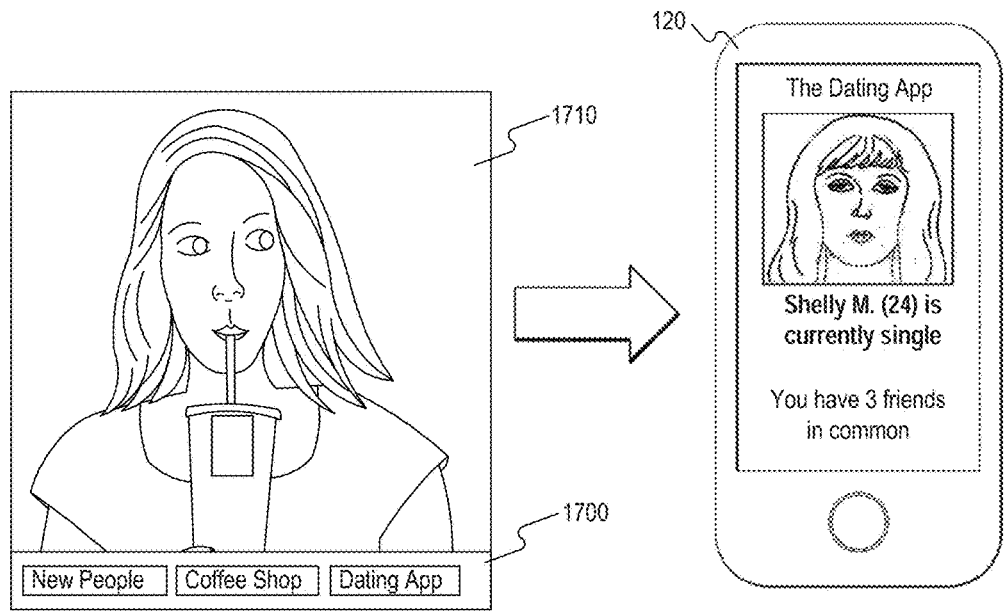
FIG. 17A is a schematic illustration of a first example of a contextual situation that triggers a device paired with a wearable apparatus to execute a selected function according to a disclosed embodiment.

FIG. 17A is a schematic illustration of a contextual situation that may trigger computing device 120 to execute one or more selected functions consistent with the present disclosure. The contextual situation illustrated in this figure is a person present in an area in front of user 100. Wearable apparatus 110 may identify this contextual situation by analyzing one or more images, such as image 1710. After identifying this contextual situation, wearable apparatus 110 may cause computing device 120 to execute the one or more selected functions.

In one embodiment, the processing device may receive a request from computing device 120 to transmit image-related information associated with the category tag. The requested image-related information may include an image of the person, and the selected function may include providing information about the person included in the image to user 100. For example, assuming user 100 is registered to an online dating service and previously selected that he/she is interested in blond women. The dating application may communicate with wearable apparatus 110 and request facial images of any unknown blond women encountered by user 100.

As shown, the category tags 1700 that may be assigned to image 1710 may include a "new people" tag, a "coffee shop" tag, and a "dating app" tag. In this case, the "new people" tag was assigned to image 1710 because wearable apparatus 110 does not recognize the woman in front of user 100; the "coffee shop" tag was assigned to image 1710 based on, for example, information from a Global Positioning System (GPS); and the "dating app" tag was assigned to image 1710 because the woman in front of user 100 is blond. Thereafter, wearable apparatus 110 may transmit an image including the woman's face to computing device 120. The dating application installed on the user's smartphone may search for the image and find that the image is of a woman who is registered to a dating service. Computing device 120 may then send the woman's profile page 1715 to user 100.

Although the above example relates to identifying a person for purposes of retrieving a dating profile, the "new people" tag may be used by other applications. For example, applications requesting images tagged with a "new people" tag may include those requesting images of unidentified persons to check whether a person included in an image may be a missing person or a person who is wanted by law enforcement. Accordingly, computing device 120 may provide an alert related to a missing-persons status of the person, or an alert related to a wanted-by-law-enforcement status of the person. Further, in some embodiments, wearable apparatus 110 may be used by law enforcement officers to receive real-time indications about wanted suspects in present in their surroundings on a paired device (e.g., an alert as to a wanted status or that an encountered individual has a criminal record).

Figure 17B:
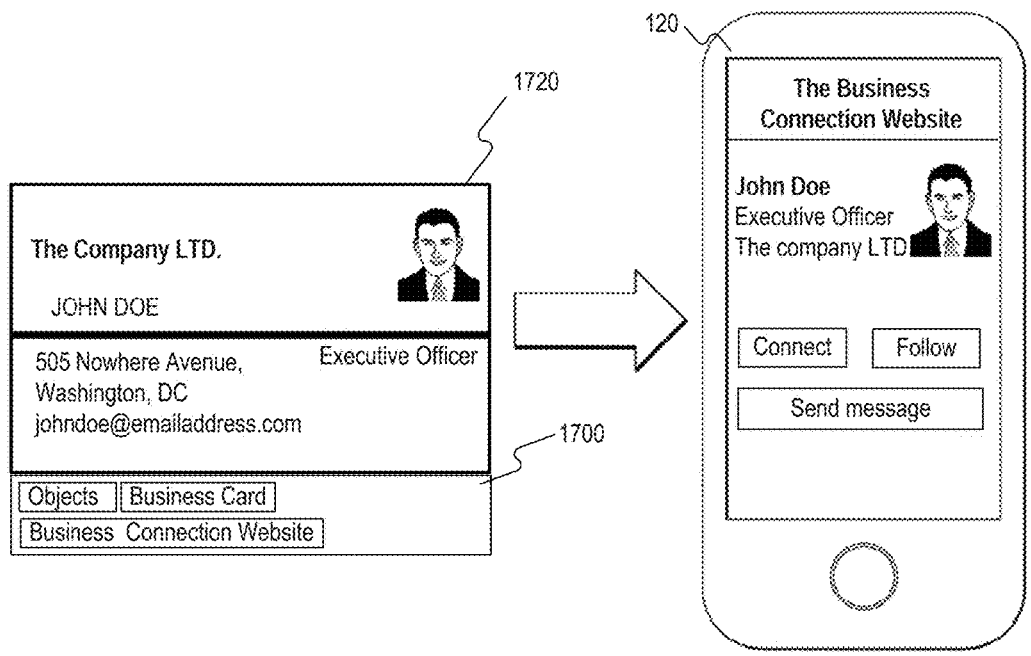
FIG. 17B is a schematic illustration of a second example of a contextual situation that triggers the paired device to execute a selected function according to a disclosed embodiment.

FIG. 17B is a schematic illustration of another contextual situation that may trigger computing device 120 to execute one or more selected functions consistent with the present disclosure. The contextual situation illustrated in this figure is an object present in an area in front of user 100. Wearable apparatus 110 may identify this contextual situation by analyzing one or more images, such as image 1720. After identifying this contextual situation, wearable apparatus 110 may cause computing device 120 to execute the one or more selected functions.

In one embodiment, computing device 120 may request image-related information that includes at least one detail about the object. For example, the object may be a business card and the at least one detail may include contact information. In the contextual situation illustrated in FIG. 17B, user 100 is registered to a business-oriented social networking service and had installed an application of this service on his/her smartphone. The installed application may communicate with wearable apparatus 110 and request contact information of any business card that user 100 holds that is not his/her own. As shown, the category tags 1700 that may be assigned to image 1720 may include an "objects" tag, a "business card" tag, and a "business connection website" tag. In this case, as "the business connection website" tag was assigned to image 1720 because the business card that user 100 holds is other than his/her own, wearable apparatus 110 may transmit the contact information of John Doe listed on the business card to computing device 120 to execute a selected function. In one embodiment, the selected function may include storing at least one detail from the business card. The at least one detail may be obtained by, for example, executing an optical character recognition (OCR) function. Computing device 120 may then store the contact information of John Doe in memory 550b. In another embodiment, the selected function may include opening a website and automatically including at least one detail from the business card in, for example, a profile (e.g., a social networking site profile) of user 100. For example, after receiving the contact information of John Doe, computing device 120 may enable user 100 to connect with John Doe via a business connection website.

In other embodiments, computing device 120 may request other details such as a product type or a product name. For example, user 100 may walk in a store and look at a product, and wearable apparatus 110 may be programmed to transmit the product type or the product name to computing device 120. For example, wearable apparatus 110 may provide an image of the product and/or wearable apparatus 110 may execute an OCR function to identify the product name from a label included in an image. In this example, the selected function may include opening a website that compares prices, which may automatically search the product name to enable user 100 to review the prices of the same product in other stores.

Figure 17C:
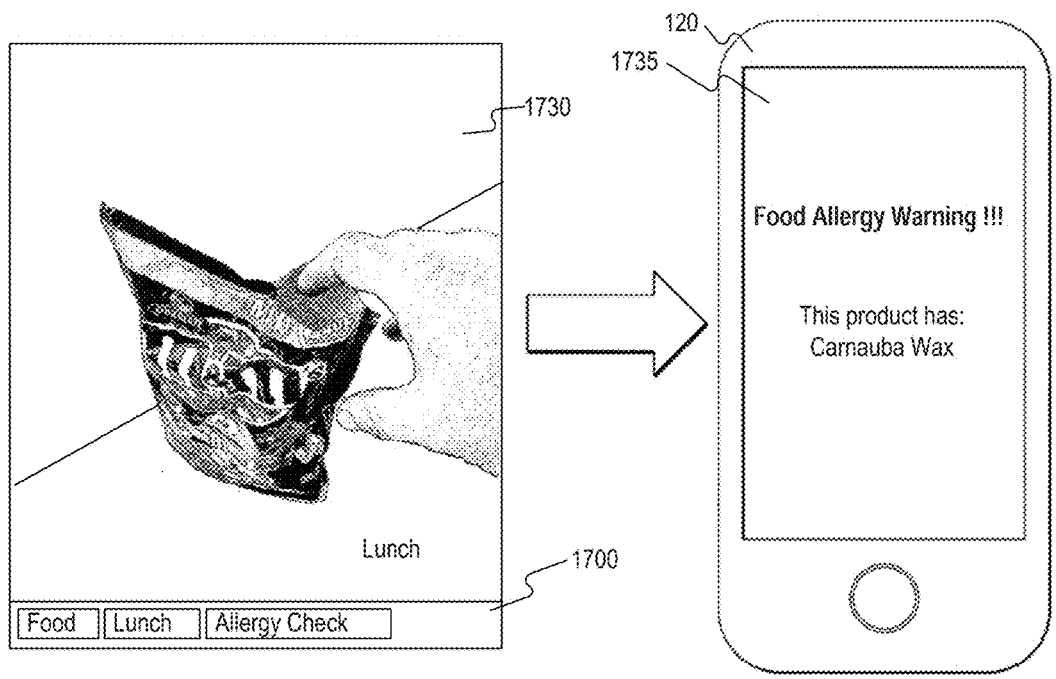
FIG. 17C is a schematic illustration of a third example of a contextual situation that triggers the paired device to execute a selected function according to a disclosed embodiment.

FIG. 17C is a schematic illustration of yet another contextual situation that may trigger computing device 120 to execute one or more selected functions consistent with the present disclosure. The contextual situation illustrated in this figure is the presence of food in front of user 100. Wearable apparatus 110 may identify this contextual situation by analyzing one or more images, such as image 1730. After identifying this contextual situation, wearable apparatus 110 may cause computing device 120 to execute one or more selected functions.

In the contextual situation illustrated in FIG. 17C, computing device 120 may request image-related information that includes an indication that user 100 is engaging with food associated with a dietary restriction. In one embodiment, the selected function may include updating a database with information related to the food associated with the dietary restriction. In another embodiment, the selected function may include providing an alert 1735 regarding the food in front of user 100. For example, the requested image-related information may include an indication that user 100 is engaging with food associated with a dietary restriction, such as a food allergy. In this example, user 100 may have previously installed an application on a paired device that maintains a list of known ingredients that user 100 is allergic to. The installed application may communicate with wearable apparatus 110 and request images of any packaged food that user 100 is engaged with. As shown, the category tags 1700 that may be assigned to image 1730 may include a "food" tag, a "lunch" tag, and an "allergy check" tag. When processor 210 detects that user 100 is engaging with the packaged food, wearable apparatus 110 may transmit an image of the packaged food to computing device 120. The installed application may search an offline database or an online database to determine if the packaged food that user 100 is engaging with includes an ingredient that may be dangerous to user 100 and provide a real-time warning to user 100. In other embodiments, the requested image-related information may include an indication that user 100 is engaging with food associated with a dietary restriction, where the dietary restriction relates to a disease (e.g., diabetes) or a weight loss goal.

Figure 17D:
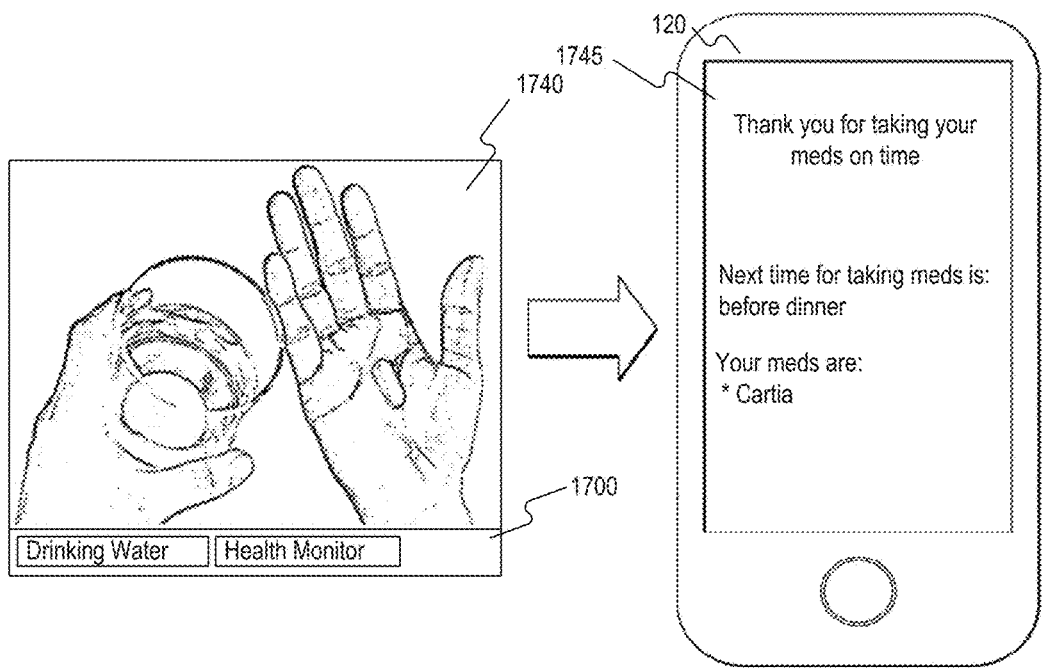
FIG. 17D is a schematic illustration of a fourth example of a contextual situation that triggers the paired device to execute a selected function according to a disclosed embodiment.

FIG. 17D is a schematic illustration of still another contextual situation that may trigger computing device 120 to execute one or more selected functions consistent with the present disclosure. The contextual situation illustrated in this figure is performing a health-related activity. Wearable apparatus 110 may identify this contextual situation by analyzing a one or more images, such as image 1740. After identifying this contextual situation, wearable apparatus 110 may cause computing device 120 to execute one or more selected functions.

In the contextual situation illustrated in FIG. 17D, computing device 120 may request image-related information that includes an indication that user 100 is engaged in the health-related activity. In one embodiment, the selected function may include providing information to an individual related to user 100. The individual related to user 100 may be the user's physician or a family member. For example, the information provided to the individual related to user 100 may include a medicine reminder concerning the user and an alert related to a health status of user 100. In another embodiment, the selected function may include providing information associated with the health-related activity to user 100. The health-related activity may include: taking medicine, performing a physical exercise, receiving a treatment, and more. In the example illustrated in FIG. 17D, user 100 installed an application on a paired device that monitors whether he/she takes all his/her medicine on time. The installed application may communicate with wearable apparatus 110 and request a notification if user 100 takes medicine. As shown, the category tags 1700 that may be assigned to image 1740 may include a "drinking water" tag and "health monitor" tag. When processor 210 detects that user 100 is engaging with the health-related activity, wearable apparatus 110 may transmit an indication to computing device 120. The indication may include an image of the medicine. The installed application may check that user 100 is about to take the correct medicine as admitted and provide a real-time feedback 1745 to user 100.

A person skilled in the art can appreciate that many more types of contextual situations (not shown in the figures) may trigger computing device 120 to execute one or more selected functions consistent with the present disclosure. In addition, while specific selected functions were described with regards to certain types of contextual situations, the present disclosure is not limited to the disclosed examples. As described below, any combination of selected functions may be triggered in response to any contextual situations, and any number of separated operations may be included in a selected function.

Furthermore, in some embodiments, for example, analyzing one or more images captured by wearable apparatus 110 may involve edge identification, in which an image is analyzed to detect pixels at which discontinuities (e.g., sudden changes in image brightness) occur and edges (e.g., edges of the external object) are identified to coincide with the detected pixels. Alternatively or additionally, in some embodiments analyzing one or more images may involve identifying in and/or extracting from an image pixels representative of objects in the environment, such as the external object. Pixels may be determined to be representative of an external object based on, for example, other images of the external device or similar external devices maintained, e.g., in a database and/or predetermined data describing the external object maintained, e.g., in a database. Alternatively or additionally, pixels may be determined to be representative of an external object based on, for example, a trained neural network configured to detect predetermined external objects. Other types of analysis are possible as well, including, but not limited to, gradient matching, greyscale matching, scale-invariant feature transform (SIFT) matching, and/or interpretation trees.

FIG. 18A is a message flow diagram that depicts the communication between wearable apparatus 110 and computing device 120 for three different types of selected functions. The first type of selected functions involves computing device 120. Specifically, computing device 120 may send wearable apparatus 110 a request 1800 that defines a contextual situation. After wearable apparatus 110 detects the contextual situation, it may send image-related information 1810 to computing device 120. Examples for the first type of selected function include: storing data on memory 550b (e.g., counting the occurrences of a certain event) and providing alerts to user 100 (e.g., as illustrated in FIGS. 29A-29D). The second type of selected functions involves computing device 120 communicating with server 250. Specifically, after computing device 120 receives image-related information 1810, it may transmit information 1820 to server 250. Information 1820 may be identical to image-related information 1810 or data derived from image-related information 1810. Examples of the second type of selected function include: updating a database (e.g., updating a cloud-based life logging service), forwarding a message to an individual (e.g., informing a parent that a child is engaging in a dangerous activity), opening a website (e.g., opening a weather forecast website when user 100 looks at his/her umbrella). The third type of selected functions involves retrieving information from server 250. Specifically, after computing device 120 receives image-related information 1810, it may transmit an inquiry 1830 to server 250, and receive back information 1840 to be presented to user 100 via computing device 120. Examples for this type of selected function include: providing information about a person or an object in the environment of user 100 (e.g., as illustrated in FIG. 17A and FIG. 17C).

Figure 18B:
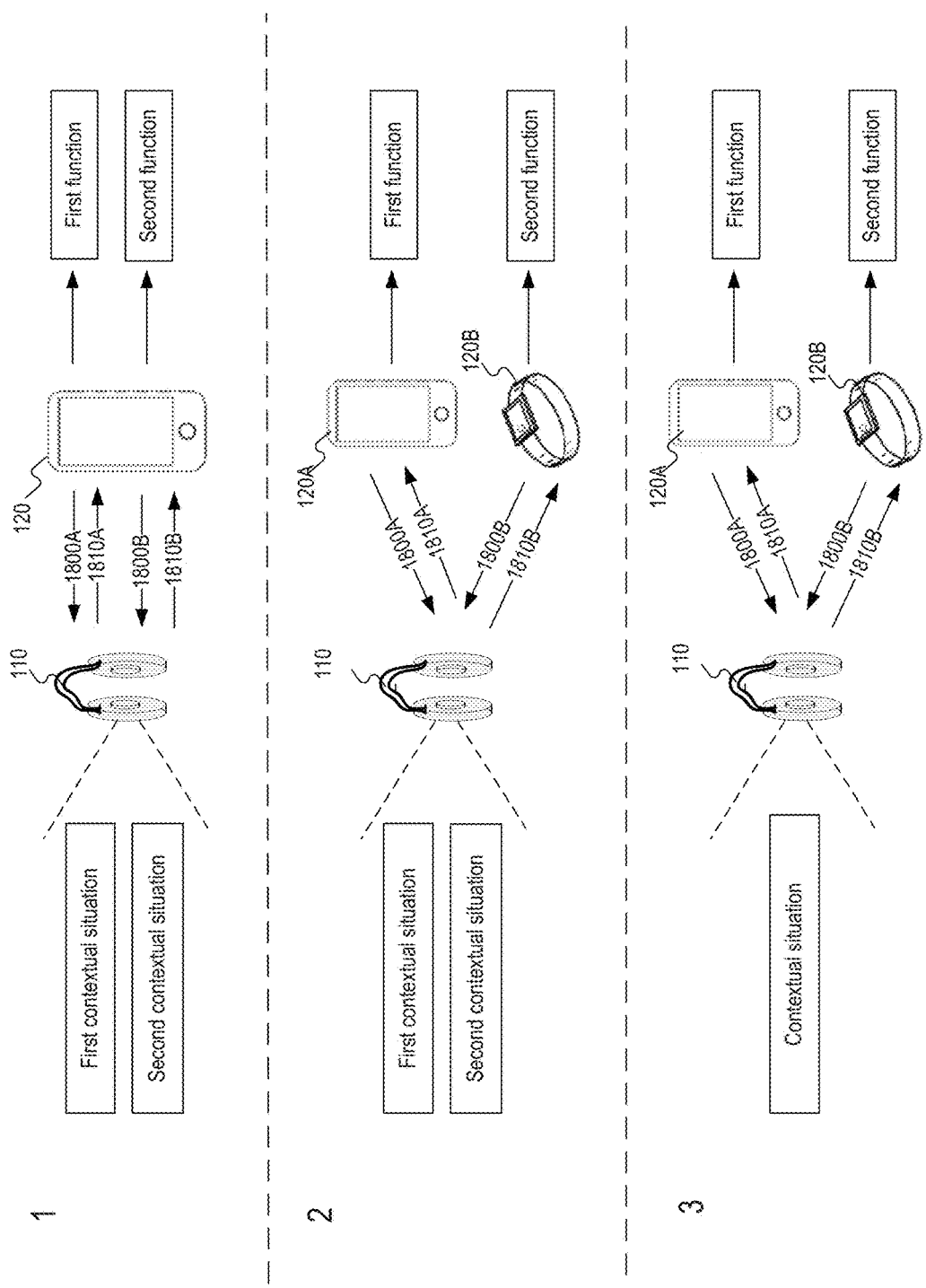
FIG. 18B is a schematic illustration of three different types of scenarios where multiple selected functions are triggered consistent with disclosed embodiments.

FIG. 18B is a schematic illustration of three different types of scenarios where wearable apparatus 110 may trigger multiple selected functions. In the first scenario, wearable apparatus 110 may receive multiple requests from a paired device (e.g., computing device 120). Each of the requests may be associated with a different contextual situation and trigger a different selected function. Specifically, a processing device (e.g., processor 210) may receive a first request 1800A and a second request 1800B from computing device 120 to transmit image-related information associated with first and second category tags. The first category tag is associated with a first selected function and the second category tag is associated with a second selected function. Thereafter, the processing device may analyze obtained images to detect first and second contextual situations. Based on the detected first and second contextual situations, the processing device may associate at least one image with the first category tag and at least one other image with the second category tag. The processing device may also determine first image-related information 1810A associated with the detected first contextual situation and the first category tag, and second image-related information 1810B associated with the detected second contextual situation and the second category tag. The processing device may further cause a transmitter (e.g., transceiver 530) to transmit first image-related information 1810A and second image-related information 1810B to computing device 120 to cause computing device 120 to execute the first and second selected functions based on the determined image-related information. For example, the first contextual situation may be a person present in an area in front of user 100 (as illustrated in FIG. 17A), and the second contextual situation may be the presence of food present in front of user 100 (as illustrated in FIG. 17C).

In the second scenario, wearable apparatus 110 may receive multiple requests from multiple paired devices. Each of the requests may be associated with a different contextual situation and may trigger a different selected function. Specifically, the processing device may receive first request 1800A from first computing device 120A and second request 1800B from second computing device 120B. Thereafter, the processing device may analyze obtained images to detect the first and the second contextual situations. Based on the detected first and second contextual situations, the processing device may associate at least one image with the first category tag and at least one other image with the second category tag. The processing device may also determine first image-related information 1810A associated with the first contextual situation and the first category tag, and second image-related information 1810B associated with the second contextual situation and the second category tag. The processing device may further cause a transmitter (e.g., transceiver 530) to transmit first image-related information 1810A to first computing device 120A and to transmit second image-related information 1810B to second computing device 120B, and thereby cause first computing device 120A to execute the first selected function based on first image-related information 1810A, and second computing device 120B to execute the second selected function based on second image-related information 1810B. For example, the first computing device 120A may be the user's smartphone and the second computing device 120B may be the user's smartwatch. Accordingly, a warning that user 100 is engaging with food including a dangerous ingredient may be provided to the user's smartwatch, and information about a person in front of user 100 may be provided to the user's smartphone.

In the third scenario, wearable apparatus 110 may receive multiple requests from multiple paired devices. The requests may be associated with the same contextual situation, but may trigger different selected functions. Specifically, the processing device may receive first request 1800A from first computing device 120A and second request 1800B from second computing device 120B. Thereafter, the processing device may analyze obtained images to detect a contextual situation. Based on the detected contextual situation, the processing device may associate at least one image with the first category tag and the second category tag. The processing device may also determine first image-related information 1810A associated with the detected contextual situation and the first category tag, and second image-related information 1810B associated with the detected contextual situation and the second category tag. The processing device may further cause the transmitter to transmit first image-related information 1810A to first computing device 120A and second image-related information 1810B to second computing device 120B, and thereby cause first computing device 120A to execute the first selected function based on first image-related information 1810A, and second computing device 120B to execute the second selected function based on second image-related information 1810B. For example, if the contextual situation includes the presence of food including an ingredient that may be dangerous, the user's smartwatch may provide a real-time warning to user 100, while the user's smartphone may provide information to an individual related to user 100. In some embodiments, wearable apparatus 110 may cause the first selected function and the second selected function to be executed concurrently or subsequently. The term "concurrently" means that the two selected functions occur during coincident or overlapping time periods, either where one begins and ends during the duration of the other, or where a later one starts before the completion of the other. In another scenario (not illustrated in the figure) a single paired device may execute concurrently or subsequently multiple selected functions based on a single contextual situation.

Figure 19:
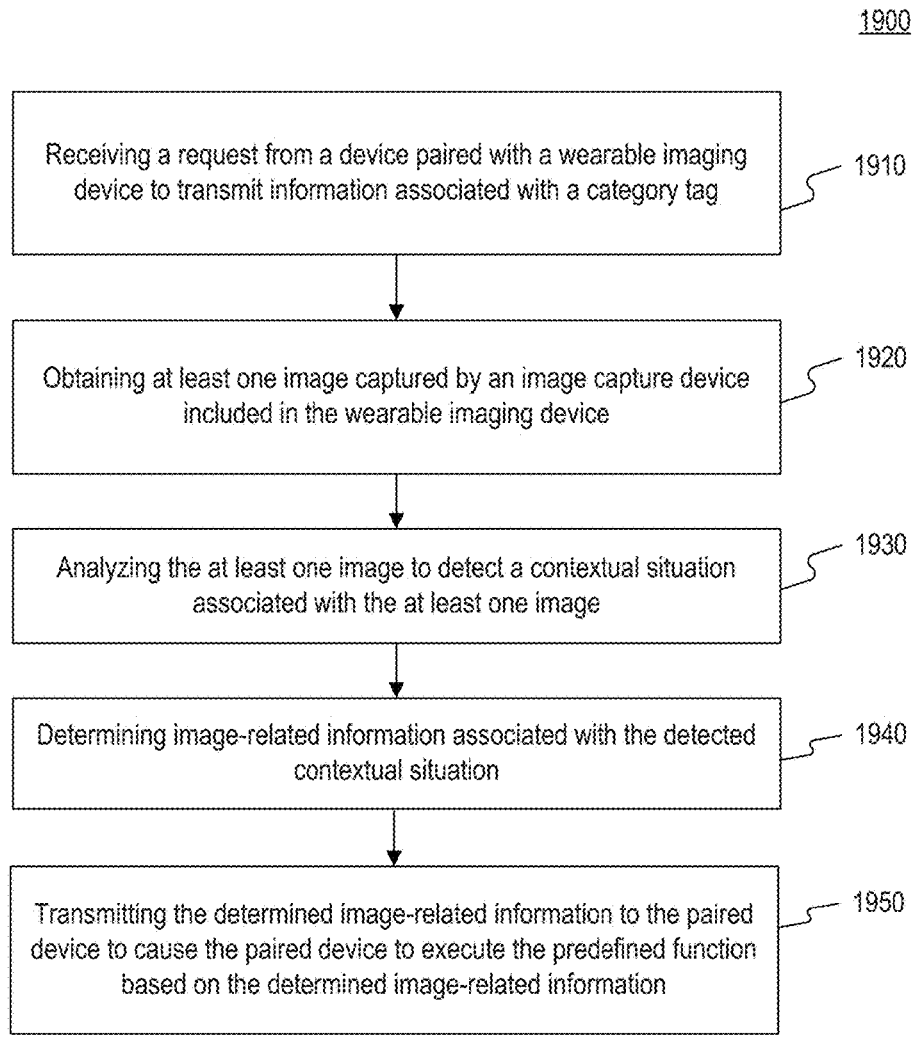
FIG. 19 is a flowchart showing an exemplary process for causing a device paired with a wearable apparatus to execute a selected function consistent with disclosed embodiments.

FIG. 19 is a flowchart showing an exemplary process 1900 for causing computing device 120 to execute a selected function based on information determined from an identified contextual situation, consistent with disclosed embodiments. Wearable apparatus 110 may implement process 1900 to trigger one or more selected functions based on different contextual situations, for example, as illustrated in FIGS. 17A-17D.

As illustrated in FIG. 19, at step 1910, a processing device (e.g., processor 210) may receive a request from computing device 120 to transmit information associated with a category tag. At step 1920, the processing device may obtain at least one image and at step 1930 the processing device may analyze the at least one image to detect a contextual situation associated with the at least one image. At step 1940, processing device may determine image-related information associated with the detected contextual situation. And at step 1950, the processing device may cause the paired device to execute the selected function based on the determined image-related information. These steps of process 1900 are discussed in greater detail below.

Specifically, at step 1910, the processing device may receive a request from computing device 120 to transmit information associated with a category tag. The request may be generated by user 100 interacting with an application running on computing device 120 or generated by computing device 120 without a direct interaction of user 100. In some embodiments, the category tag may be associated with a selected function. In a first example, when the selected function includes providing information related to the person included in the at least one image to user 100, the category tag may include a people category. In this example, the requested information includes at least part of the at least one image. In a second example, when the selected function includes storing information related to at least one detail about an objected located in front of user 100, the category tag may include an object category. In this example, the requested information may include the at least one detail about an object included in the at least one image. In a third example, when the selected function includes updating a database based on information related to the food associated with the dietary restriction, the category tag may include a food category. In this example, the requested information may include an indication that user 100 is engaging with food associated with a dietary restriction. In a fourth example, when the selected function includes providing information to an individual related to user 100, the category tag may include a health-related category. In this example, the requested information may include an indication that user 100 is engaging in a health-related activity.

At step 1920, the processing device may obtain at least one image, and at step 1930 the processing device may analyze the at least one image to detect a contextual situation associated with the at least one image. In some embodiments, the processing device may be programmed to detected in the at least one image a contextual situation that includes a presence of an object of interest. For example, the presence of a known person, the presence of text or a logo, the presence of recognized object, or the presence of an indicator of an event type. The event type may include at least one of: a sporting event, a family event, a work-related event, driving, reading, eating, and socializing. In other embodiments, the processing device may be programmed to receive audio information and to detect the contextual situation based on the received audio information and the obtained at least one image. The audio information may include a voice command, a name of a known individual, recognizable background noises, and more. In other embodiments, processing device may be programmed to retrieve additional information from one or more sources that may assist in identifying or improving the certainty level in the identification of the contextual situation. In one example, the processing device may access location information from the GPS to better detect a contextual situation. Alternatively, the processing device may derive location information from other sources, such as available Wi-Fi networks' service set identifier (SSID).

At step 1940, the processing device may determine image-related information associated with the detected contextual situation. Consisted with the present disclosure, computing device 120 may define in the request the type of image-related information that wearable apparatus 110 should determine and transmit after detecting the contextual situation. Alternatively, the type of image-related information may be selected as the result of default settings. In some embodiments, as mentioned above, the requested information may include at least part of the at least one image. Specifically, some selected functions may involve procedures, such as Optical Character Recognition (OCR) and/or facial recognition. Since these procedures may not require all of the images captured by image sensor 220, determining the image-related information may include identifying a Region of Interest (ROI) and enabling transmission of the ROI. In the example depicted in FIG. 17A, the determined image-related information may include a cropped image that includes a face of the woman in front user 100. In other embodiments, also as mentioned above, the requested information may include an indication that user 100 is engaging with a person and/or with an object. The indication may be a one-bit message, processed data including metadata information (e.g., time, location), and/or at least a portion of the captured image data that includes a representation of the contextual situation. As illustrated in the third scenario of FIG. 18B, in some cases different types of image-related information may be determined in response to detecting a single contextual situation. The different types may correspond with different selected functions.

At step 1950, after determining the image-related information, the processing device may cause computing device 120 to execute the selected function based on the determined image-related information. The selected function may be executed in real-time or at a later time (e.g., when computing device is being charged). One type of selected function may include providing information to user 100. Another type of selected function may include storing information in a memory. In one embodiment, even when the selected function is providing an alert to user 100 (such as illustrated in FIGS. 29A-29D), computing device 120 may be programmed to store information about the provided alert in memory 550b or in a remote server. In another embodiment, the selected function may include initiating a search related to the determined image-related information in a database. In this case, the selected function may include causing information related to a result of the search to be displayed on a display associated with computing device 120. In addition, computing device 120 may determine that the received image-related information is not sufficient to execute the selected function, and requests from wearable apparatus 110 for additional information. In the example depicted in FIG. 17A, computing device 120 may receive an image that includes the face of the woman in front user 100, but the image was not good enough for the facial recognition search engine. Accordingly, computing device 120 can request from wearable apparatus 110 to transmit another image. As those who are skilled in the art will appreciate, at least some of the steps depicted in FIG. 19 can be performed simultaneously or in a different order than that shown in the figure.

Visual Pairing of External Devices with a Wearable Apparatus

In some embodiments, an external device may be recognized in image data captured by wearable apparatus 110. An external device may be any device in an environment of wearable apparatus 110 that is configured to pair with wearable apparatus 110. Example external devices may include, but are not limited to computing devices, personal electronic devices, mobile devices, desktop devices, entertainment devices, household devices, audio and/or visual devices, illumination devices, appliances, fixtures, thermostats, televisions, coffee makers, printers, lights, lamps, Wi-Fi support devices, network devices, etc.

In some cases, the external device may provide one or more controllable functions. A controllable function may be any changeable aspect of the external device. Example controllable functions may include, but are not limited to, mode (e.g., a power-saving mode, a color printing mode, a shuffle mode, etc.), brightness, intensity, volume, position, on/off state, stop/play state, station and/or channel selection (e.g., for an audio and/or visual device), temperature, and/or speed.

In some cases, it may be desirable for wearable apparatus 110 to determine if the external device is one with which wearable apparatus 110 may pair (e.g., with which a communication path may be established). Pairing may permit wearable apparatus 110, for example, to control a controllable function of the external device or simply to exchange information with the external device. In order to determine whether the external device is one with which wearable apparatus 110 may pair, wearable apparatus 110 may transmit a signal configured to cause a response by the external device, such as a change in at least one aspect of the external device. Such a signal may be referred to as an interrogation signal. The interrogation signal may be transmitted by wearable apparatus 110 itself and/or through one or more intermediate devices, such as a device paired with wearable apparatus 110.

Figure 20:
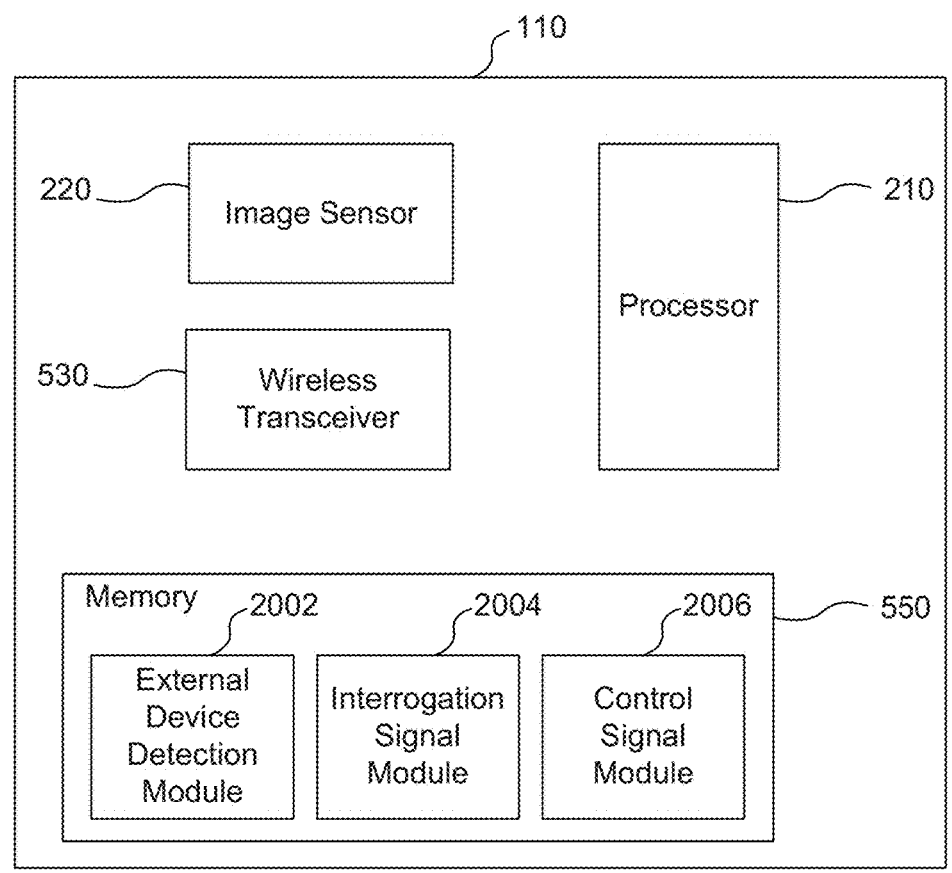
FIG. 20 is a block diagram illustrating an example of the components a wearable apparatus for visually pairing with an external device.

FIG. 20 is a block diagram illustrating an example of the components of wearable apparatus 110 for visually pairing with an external device. As shown in FIG. 20, wearable apparatus 110 includes image sensor 220, wireless transceiver 530, memory 550, and processor 210. While only one image sensor 220, wireless transceiver 530, memory 550, and processor 210 are shown, it will be understood that more of any of these components may be included. Further, while these components are shown to be included in wearable apparatus 110, in other embodiments one or more of these components may be remote from and configured to communicate with wearable apparatus 110 (e.g., distributed over one or more servers in communication with wearable device 110 over a network). In other embodiments, wearable apparatus 110 may include other components, such as any of the components described above in connection with FIGS. 5A-5C.

Image sensor 220 may take any of the forms described above in connection with FIGS. 2, 3A, 4A-4B, 5A-5C, and 7. Similarly, wireless transceiver 530 may take any of the forms described above in connection with FIGS. 5A-5C. Memory 550 may likewise take any of the forms described above in connection with FIGS. 5A-5C (including memory 550a and 550b), and processor 210 may take any of the forms described above in connection with FIGS. 2 and 5A-5C.

Image sensor 220 may be any device configured to capture images and/or a stream of images from an environment of a user of the wearable apparatus 110. The environment may include, for example, one or more external devices. The images and/or stream of images may include, for example, real-time image data of a field-of-view of the user. As discussed above, image sensor 220 may be configured to detect and convert optical signals into electrical signals, and the electrical signals may be used to form an image or a video stream (i.e., the stream of images) based on the detected signal.

Memory 550 may contain software modules consistent with the present disclosure. As shown, included in memory 550 are an external device detection module 2002, an interrogation signal module 2004, and a control signal module 2006. Modules 2002, 2004, and 2006 may contain software instructions for execution by processor 210, as described below. External device detection module 2002, interrogation signal module 2004, and control signal module 2006 may cooperate to facilitate visual pairing of wireless apparatus 110 with the external device.

Processor 210 may be configured to receive the stream of images from image sensor 220 and to analyze the stream of images to detect the external device in the environment of the user. In some embodiments, processor 210 may be configured to execute software instructions in external device detection module 2002 to receive the stream of images from image sensor 220 and analyze the stream of images to detect the external device in the environment. As described above, processor 210 may be configured to extract information from the stream of images. Extracting information, as described above, includes any process by which information associated with objects, individuals, locations, events, etc., is identified in the stream of images by any means known to those of ordinary skill in the art. Processor 210 may be configured to identify information associated with the external device in the stream of images.

Analyzing the stream of images may involve any analysis by which the external device may be detected based on the stream of images. In some embodiments, for example, analyzing the stream of images may involve edge identification, in which an image is analyzed to detect pixels at which discontinuities (e.g., sudden changes in image brightness) occur and edges (e.g., edges of the external object) are identified to coincide with the detected pixels. Alternatively or additionally, in some embodiments analyzing the stream of images may involve identifying in and/or extracting from an image pixels representative of one or more objects in the environment, such as the external object. Pixels may be determined to be representative of an external object based on, for example, other images of the external device or similar external devices maintained, e.g., in a database and/or predetermined data describing the external object maintained, e.g., in a database. Alternatively or additionally, pixels may be determined to be representative of an external object based on, for example, a trained neural network configured to detect predetermined external objects. Other types of analysis are possible as well, including, but not limited to, gradient matching, greyscale matching, scale-invariant feature transform (SIFT) matching, and/or interpretation trees.

Processor 210 may be further configured to cause wireless transceiver 530 to transmit an interrogational signal to the external device, and wireless transceiver 530 may be configured to transmit the interrogation signal. In some embodiments, processor 210 may be configured to execute software instructions in interrogation signal module 2004 to cause wireless transceiver 530 to transmit the interrogation signal. The interrogation signal may be any signal configured to cause a change in at least one aspect of the external device. The aspect may be, for example, a feature of the external device's appearance or another visually recognizable and/or detectable attribute. For example, the interrogation signal may be configured to cause the external device to illuminate and/or blink a light and/or display on the external device, modify a position of the external device and/or some component of the external device, and/or display certain information.

The interrogation signal may take the form of, for example, a radio frequency (RF) signal (e.g., a radio frequency identification (RFID) signal), a Bluetooth signal, an optical signal (e.g., an infrared signal, a visible light signal), and/or a Wi-Fi signal (e.g., an IEEE 802.11 signal). In some embodiments, different interrogation signals may be used for different external devices and/or different types of external devices. In some embodiments, interrogation signal module 2004 may determine which interrogation signal to use based on the detected external device. Alternatively or additionally, interrogation signal module 2004 may attempt more than one interrogation signal (e.g., in a predetermined order, an order dependent on the detected external device, etc.).

Wireless transceiver 530 may take different forms for different interrogation signals. For example, wireless transceiver 530 may take the form of a radio frequency transmitter and/or transceiver, a Bluetooth radio, and/or an optical transmitter (e.g., an LED). Where the external device is configured to pair with wearable apparatus 110, the external device may include a component configured to receive the interrogation signal, such as a radio transceiver, a Bluetooth detector, and/or an optical receiver (e.g., a photo diode detector). In some embodiments, the external device may include more than one component for receiving more than one type of interrogation signal (e.g., an external device may be configured to receive both an optical and a Bluetooth interrogation signal).

As described above, the interrogation signal may be configured to cause a change in at least one aspect of the external device. In some embodiments, the interrogation signal may include instructions (e.g., a command) to cause the external device to change the aspect(s) of the external device. For example, the interrogation signal may command the external device to illuminate, pulse, and/or blink a light and/or display on the external device, change an intensity of a light emitted by the external device, modify a position of the external device or some component of the external device, and/or display certain information.

In some embodiments, the external device may include one or more components for carrying out the command included in the interrogation signal. For example, where the interrogation signal commands the external device to illuminate a light (e.g., an LED array) on the external device, the external device may include a light configured to be illuminated or deilluminated. As another example, where the interrogation signal commands the external device to modify a position of the external device, the external device may include one or more motion mechanisms, such as an actuator, electric motor, wheels, or gears, and so forth, which may enable the external device to modify its position. As still another example, where the interrogation signal commands the external device to modify a position of some component of the external device, the external device may include, in addition to one or more motion mechanisms, a component adapted for movement, such as an arm. In some embodiments, the components configured to carrying out the command included in the interrogation signal may be components specially adapted to carry out the command. Alternatively, the components may have other purposes in the external device. For example, where the interrogation signal commands the external device to display certain information, the external device may display the information on a display of the external device that additionally serves to display other information at the external device.

In some embodiments, the change in the aspect(s) of the external device may be between binary states on the external device. For example, the external device may change a light from an on state to an off state. As another example, the external device may change a position of the external device from a resting position to a ready position. Alternatively, in some embodiments the interrogation signal may specify an extent of change in the aspect(s) of the external device. For example, the interrogation signal may specify that the external device is to move a component of the external device (e.g., raise an arm) by a specified distance and/or in a specified direction. As another example, the interrogation signal may specify that the external device is to change an intensity of a light by a specified amount and/or in a specified direction (e.g., reduce an intensity of the light by a specified amount). As another example, the interrogation signal may specify that the external device is to change the color of an emitted light. The change in the aspect(s) may be temporary. For example, the interrogation signal may specify that the external device is to modify a display to display certain information for a specified period of time. As another example, the interrogation signal may specify that the external device is to blink a light for a specified period of time.

Processor 210 may be further configured to analyze the stream of images to detect the change in the at least one aspect of the external device, as caused by the interrogation signal. In some embodiments, processor 210 may be configured to execute software instructions in external device detection module 2002 to detect the change in the at least one aspect of the external device. For example, where the interrogation signal caused the external device to illuminate and/or blink a light or display on the external device, processor 210 may be configured to extract information from the stream of images indicating the illumination and/or blinking. As another example, where the interrogation signal caused the external device to modify a position of the external device or some component of the external device, processor 210 may be configured to extract information from the stream of images indicating the changed position. As still another example, where the interrogation signal caused the external device to display certain information, processor 210 may be configured to extract information from the stream of images indicating the displayed information.

Processor 210 may be further configured to store in memory 550 information relating to the external device after detection of the change in the at least one aspect of the external device. The information may include, for example, information relating to a location associated with the external device, a type associated with the external device, information related to the appearance of the external device, a picture of the external device, and/or an indication of at least one controllable function associated with the external device. In another example, the external device may be a wearable external device, and processor 210 may be further configured to identify the person wearing the wearable external device and/or to determine information related to the person wearing the wearable external device, such as the person's gender, height, information related to the appearance of the person, a picture of the person, a picture of the face of the person, and so forth.

In some embodiments, a location of the external device may be determined by, for example, querying the external device (e.g., where the external device includes a global positioning system or is otherwise configured to determine its own location). Alternatively or additionally, a location of the external device may be determined relative to wearable apparatus 110 and/or another reference in the environment using one or more of stereo image analysis, time-of-flight analysis, triangulation, structured light techniques, and/or modulated light techniques using, for example, radar, lidar, and/or infrared detection. In some embodiments, wearable apparatus 110 may include and/or may pair with another device that includes a component configured for determining one or both of a geographic position of wearable apparatus 110, a geographic position of the external device, and/or a relative position of the external device to wearable apparatus 110, such as a global positioning system and/or a radar or lidar transceiver. In some embodiments, wearable apparatus 110 and/or another device paired with wearable apparatus 110 may be configured to generate a map or other representation of the environment (e.g., using simultaneous location and mapping (SLAM) techniques) indicating a relative location of the external device to wearable apparatus 110 and/or one or more other objects in the environment. The map may be, for example, a grid map or a topological map.

In some embodiments, wearable apparatus 110 and the external device may be paired, such that wearable apparatus 110 may, for example, exchange information with the external device or control a controllable function of the external device. Processor 210 may execute software instructions in control signal module 2006 to cause a control signal to be transmitted to the external device. The control signal may be configured to control one or more controllable functions of the external device, as further described below.

Figure 21:
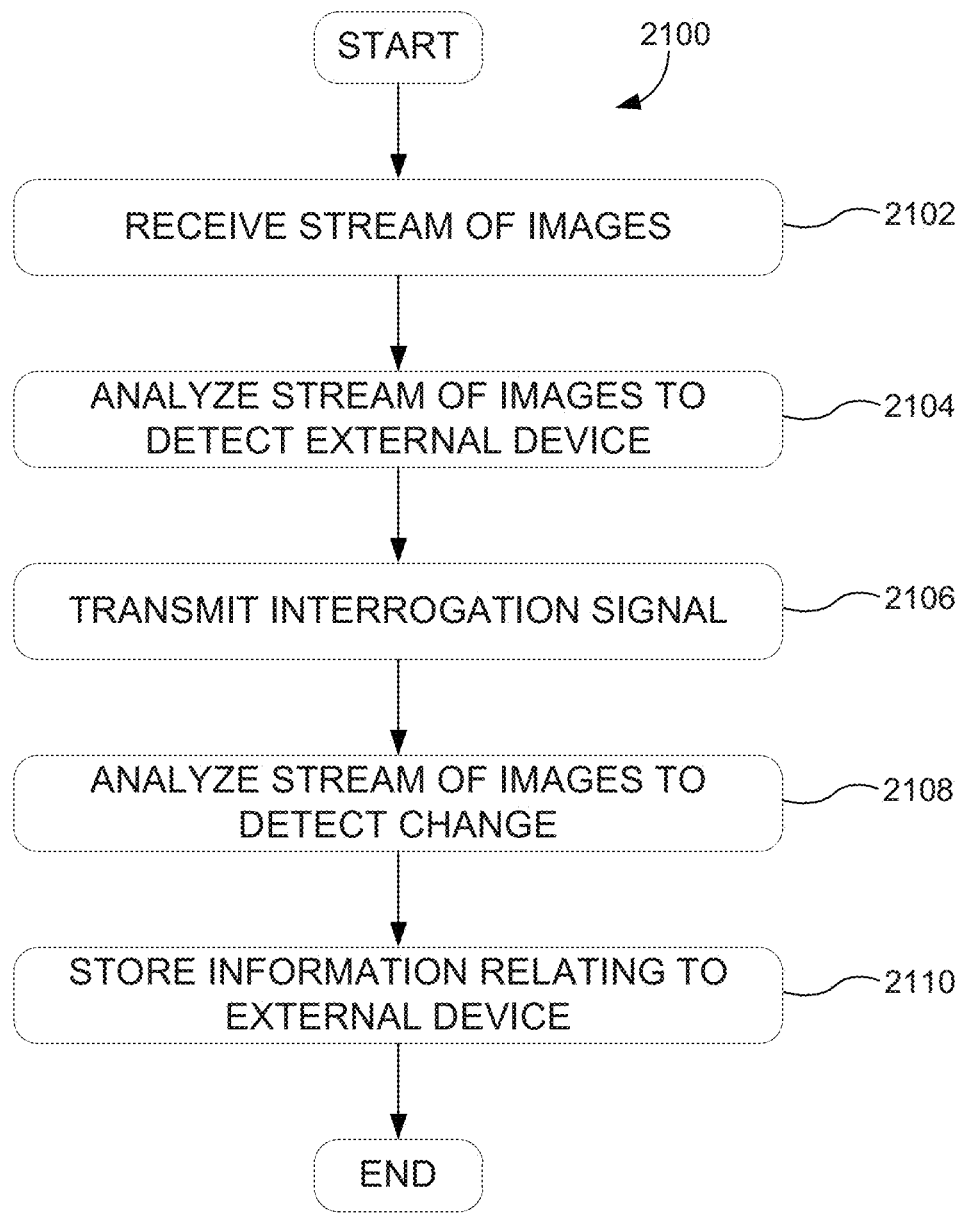
FIG. 21 is a flowchart illustrating an exemplary process for visually pairing with an external device.

FIG. 21 is a flowchart illustrating an exemplary process 2100 for visually pairing with an external device. Process 2100 is described with reference to FIGS. 22A-22C, which are schematic illustrations of an exemplary pairing between wearable apparatus 110 and an external device 2202 in an environment 2200. One of ordinary skill in the art will recognize that FIGS. 22A-22C are examples, and other kinds of devices may be paired with wearable apparatus 110.

As shown, process 2100 may begin at step 2102 with receiving a stream of images. The stream of images may be received from, for example, at least one image sensor (e.g., image sensor 220) of the wearable apparatus 110, which may be configured to capture the stream of images from an environment of a user of the wearable apparatus 110.

Figure 22A:
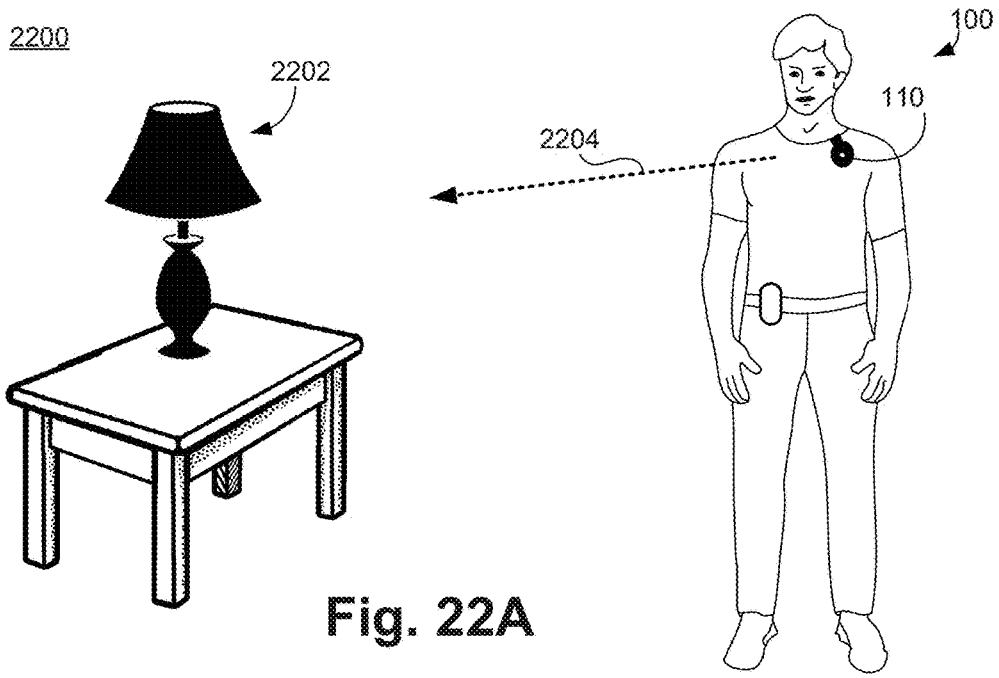
FIGS. 22A, 22B, and 22C are schematic illustrations of an exemplary visual pairing between a wearable apparatus and an external device.
Figure 22B:
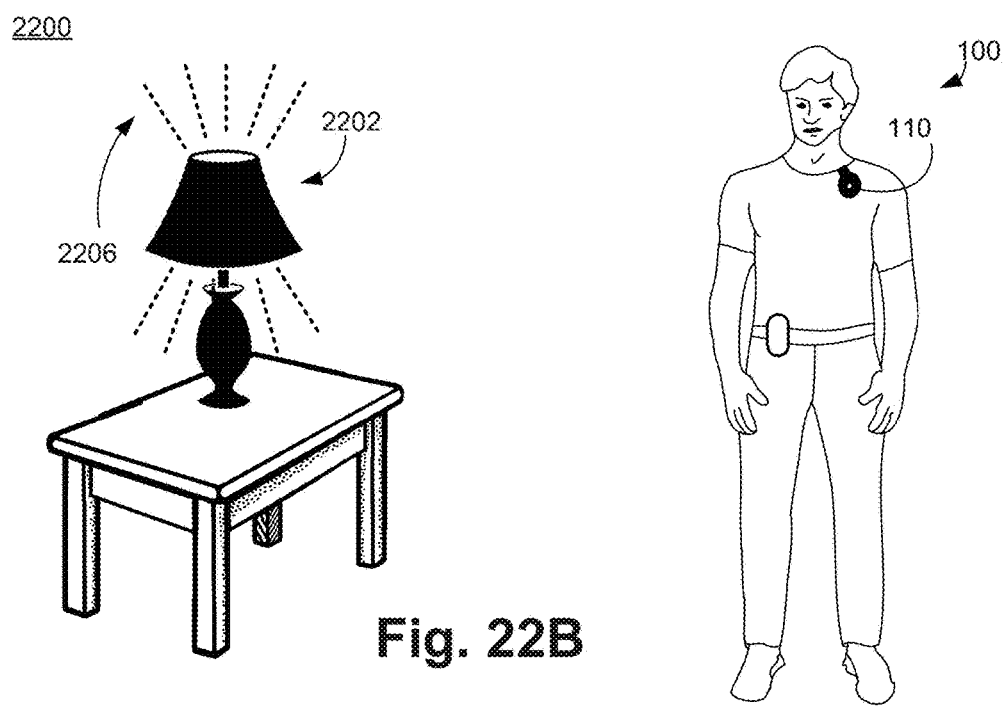
Figure 22C:
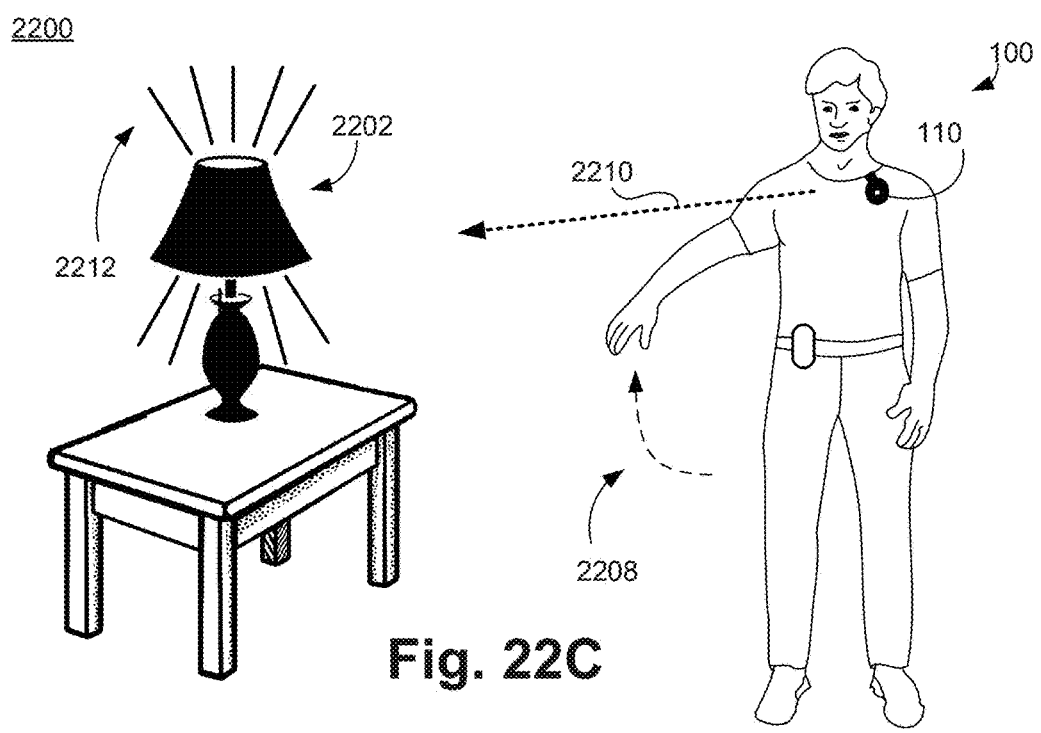

Example environment 2200 is shown in FIG. 22A. As shown, environment 2200 includes a user 100 wearing a wearable apparatus 110. While wearable apparatus 110 is shown to be configured to connect on an exterior surface of clothing of the user 100, similar to wearable apparatus 110 described in connection with FIG. 9, above, it will be understood that wearable apparatus 110 may take any of the forms described herein, including but not limited to those shown in FIGS. 1A-D, 3A-B, 4A-B, and 8-16. Wearable apparatus 110 may include and/or be communicatively coupled to an image sensor, such as image sensor 220 described above, that is configured to capture a stream of images from environment 2200. While environment 2200 is shown as an indoor environment, it will be understood that environment 2200 may be any proximity surrounding user 100, whether indoor, outdoor, or both.

Returning to FIG. 21, process 2100 may continue at step 2104 with analyzing the stream of images to detect an external device. For example, at least one processing device (e.g., processor 210) in the wearable apparatus 110 may be programmed to receive the stream of images from the image sensor 220 and analyze the stream of images to detect the external device in the environment of the user.

An example external device 2202 is shown in FIG. 22A. As shown, external device 2202 may be a light source, such as a visible light source or an infrared light source. While the external device 2202 is shown to be a light source, external device 2202 may take other forms as well. For example, rather than being a light source, external device 2202 may include, be included in, be communicatively coupled to, and/or otherwise associated with a light source. As another example, external device 2202 may be, include, be included in, be communicatively coupled to, and/or otherwise associated with a computing device (e.g., a desktop computer, laptop computer, tablet computer, printer, database, server, etc.), a personal electronic device (e.g., mobile device, cellular device, table, smartphone, smart watch, e-reader device, etc.), an entertainment device (e.g., television, digital media player, music player, radio, etc.), a household device (e.g., refrigerator, oven, stove, microwave, alarm system, appliance, fixture, etc.), audio and/or visual devices (e.g., display, projector, speaker, etc.), an illumination device (e.g., lamp, etc.), an appliance (e.g., washing machine, dryer, blender, etc.), a fixture (e.g., ceiling fan, lock, safe, garage door, etc.), and/or a wearable device.

The stream of images from environment 2200 captured by the image sensor(s) 220 of wearable apparatus 110 may include a representation of external device 2202, such that a processor 210 included in and/or communicatively coupled to wearable apparatus 110 may analyze the stream of images to detect external device 2202 in environment 2200 of user 100.

Returning to FIG. 21, process 2100 may continue at step 2106 with transmitting an interrogation signal. For example, the processing device(s) in the wearable apparatus 110 may be programmed to cause at least one transmitter (e.g., wireless transceiver 530) in the wearable apparatus 110 to transmit the interrogation signal. The interrogation signal may be configured to cause a change in at least one aspect of the external device.

An example interrogation signal 2204 is illustrated in FIG. 22A. As shown, wearable apparatus 110 may transmit (e.g., using a wireless transceiver 530 included in and/or communicatively coupled to wearable apparatus 110) interrogation signal 2204 to external device 2202. In the event external device 2202 is a device with which wearable apparatus 110 cannot pair, interrogation signal 2204 may have no effect on external device 2202. However, in the event external device 2202 is a device with which wearable apparatus 110 can pair, interrogation signal 2204 may cause a change in at least one aspect of external device 2202.

An example change 2206 in at least one aspect of external device 2202 is shown in FIG. 22B. External device 2202 may exhibit change 2206 in response to interrogation signal 2204. As shown, change 2206 may include, for example, a change in illumination of external device 2202, such as external device 2202 blinking. Other example changes 2206 may include turning off, turning on, dimming, and/or brightening. In some embodiments, for example where external device 2202 is not, does not include, is not included in and/or is not associated with a light source, change 2206 be another alteration of a feature of an appearance and/or other visually recognizable or detectable attribute of external device 2202. For example, external device 2202 may illuminate and/or blink a display on external device 2202, modify a position of external device 2202 or some component of external device 2202, and/or display certain information. The change 2206 may be permanent or may be temporary.

Returning to FIG. 21, process 2100 may continue at step 2108 with analyzing the stream of images to detect the change. For example, the processing device may be programmed to analyze the stream of images to detect the change in the at least one aspect of the external device. As shown in FIG. 22B, the stream of images from environment 2200 captured by the image sensor(s) 220 of wearable apparatus 110 may include a representation of external device 2202, including change 2206, such that the processor 210 included in and/or communicatively coupled to wearable apparatus 110 may analyze the stream of images to detect external device 2202 and change 2206.

Returning to FIG. 21, process 2100 may continue at step 2110 with storing information relating to the external device. For example, the processing device may be programmed to, after detection of the change in the at least one aspect of the external device, store in a memory (e.g., memory 550) of the wearable apparatus 110 information relating to the external device.

The information may include, for example, a location associated with the external device, such as a geographic location of the external device and/or a location of the external device relative to one or more of the wearable apparatus 110, the user, and/or another object in the environment. Alternatively or additionally, the information may include a type associated with the external device. The type may, for example, describe the external device. For example, the type may indicate a type of the external device (e.g., a light source, a microwave, or a garage opener), a brand, style, a version, and/or a design of the external device (e.g., a brand of television, a style of ceiling fan, a design of speaker, etc.), an identifier that uniquely identifies the external device (e.g., a MAC address, an IP address, etc.), an identifier of a particular type or brand of the external device, or other feature of the external device. Still alternatively or additionally, the information may include a picture of the external device. Still alternatively or additionally, the information may include an indication of at least one controllable function associated with the external device. The indication of the controllable function may, for example, describe the function that can be controlled, such as a mode (e.g., a power-saving mode, a color printing mode, a shuffle mode, etc.), brightness, intensity, volume, position, state, on/off state, stop/play state, station or selection (e.g., for an audio and/or visual device), temperature, and/or speed. Alternatively or additionally, the indication of the controllable function may, for example, describe how the function can be controlled, such as options (e.g., among modes, among, positions, among stations, etc.) and levels (e.g., of volume, brightness, etc.). Still alternatively or additionally, the information may include information related to devices coupled with the external device. For example, the external device may comprise a set-top box or a game console, the coupled device may comprise a TV connected to the external device, and the information related to the TV may comprise a location, a brand, a version, size, a picture of the TV, and so forth. In another example, the external device may comprise a thermostat, the coupled device may comprise an HVAC unit connected to the thermostat, and the information related to the HVAC unit may comprise a location, a brand, a version, a state, a picture of the HVAC unit, and so forth. Still alternatively or additionally, the external device may be a wearable external device, and the information may comprise information related to a person wearing the wearable external device, such as the person's gender, height, information related to the appearance of the person, a picture of the person, a picture of the face of the person, and so forth.

Example information relating to external device 2202 in FIG. 22B may include a location of external device 2202, such as a geographic location of external device 2202 and/or a location of external device 2202 relative to one or more of wearable apparatus 110, user 100, and/or another object in the environment (e.g., relative to the table shown). Alternatively or additionally, example information relating to external device 2202 may include a type associated with external device 2202, such as a type of external device 2202 (e.g., a light source), a brand of external device 2202 (e.g., a brand of the light source), a style of external device 2202 (e.g., whether the light source emits visible or infrared light, what type and/or how many light bulbs are used in the light source, a type of shade included in the light source, whether the light source is movable or fixed, etc.), a design of external device 2202 (e.g., whether the light source can be dimmed, whether the light source operates on a timer, etc.), and/or other feature of external device 2202. Still alternatively or additionally, the information may include an indication of at least one controllable function associated with external device 2202, such as a mode (e.g., the information may indicate that the light source can be turned on and/or off, that the light source can operate in a power-saving mode, that the light source can operate on a timer, etc.), a brightness and/or intensity of the light source, a position of the light source (if the light source is movable), or another function of the light source. Alternatively or additionally, the indication of the controllable function may, for example, describe how the function of external device 2202 can be controlled, such as options (e.g., among modes or positions of the light source, etc.) and levels (e.g., of brightness, intensity, etc.).

In some embodiments, the wearable apparatus 110 may detect a gesture or gestures by the user and, in response, may cause at least one aspect of the external device to be controlled, for example using the information relating to the external device stored in memory. For example, the processing device may be further programmed to analyze the stream of images to detect at least one recognized gesture (e.g., a hand-related trigger, as described above) made by the user. As shown in FIG. 22C, for example, user 100 may make a recognized gesture 2208. While the recognized gesture 2208 is shown to be a raise of an arm of user 100, it will be understood that other recognized gestures are possible as well.

Based on the detected recognized gesture(s), the processing device may cause a control signal to be transmitted (e.g., by wireless transceiver 530) to the external device. The control signal may be configured to control at least one aspect of the external device that is associated with the recognized gesture. In some embodiments, the control signal may be configured to cause the external device to activate (e.g., turn on), deactivate (e.g., turn off), change setting (e.g., changing the settings of an HVAC system, changing the illumination brightness, changing the volume of a sound system, and so forth). As shown in FIG. 22C, for example, based on the recognized gesture 2208, wearable apparatus 110 may transmit control signal 2210 to external device 2202, thereby controlling at least one aspect 2212 of external device 2202. Aspect 2212 may be associated with recognized gesture 2208.

As shown, aspect 2212 may be an illumination of external source 2202, and control signal 2210 may be configured to control the illumination of external source 2202 by, for example, turning on, turning off, dimming, or brightening the illumination. Alternatively or additionally, controlling aspect 2212 may involve controlling any feature of an appearance or other visually recognizable or detectable attribute of external device 2202, including modifying a position of external device 2202 or some component of external device 2202 and/or displaying certain information. The control may be permanent or may be temporary. Alternatively or additionally, controlling aspect 2212 may involve controlling any of the controllable functions described above, such as a mode of external device 2202, a brightness and/or intensity of external device 2202, a position of external device 2202, or another function of the light source.

While certain environments, external devices, changes, recognized gestures, and aspects are shown in FIGS. 22A-22C, it will be understood that these are merely exemplary and that other environments, external devices, changes, recognized gestures, and aspects are possible as well.

In some embodiments, step 2104 may detect in the stream of images one or more external devices in the environment of the user, and step 2106 may detect one or more external devices able to receive an interrogation signal, for example, through a wireless communication protocol. The number of external devices detected by step 2104 may be smaller, larger, or equal to the number of external devices detected by step 2106. In some examples, the visual appearance in the stream of images of the external devices detected by step 2104 may hint at which external devices detected by step 2104 correlate to which external devices detected by step 2106. In some examples, process 2100 may go through one or more of the external devices detected by step 2106, transmit interrogation signals to the external devices, and step 2108 may analyze the stream of images to detect the change corresponding to the transmitted interrogation signals, differentiating among the detected external devices based on the detected change. For example, the transmitted interrogation signals may be transmitted at different times, and step 2108 may differentiate among the detected external devices based on the timing of the detected change. For example, the transmitted interrogation signals may be configured to cause different changes, and step 2108 may differentiate among the detected external devices based on the type of the detected change. For example, step 2106 may detect, for example through a wireless communication protocol, two external devices able to receive an interrogation signal, and step 2104 may detect four external devices. Step 2106 may transmit interrogation signals to the two external devices detected by step 2106, and step 2108 may identify which, if any, of the four external devices detected by step 2104, corresponds to the external devices detected by step 2106, based on a detected change in the appearance of the external device detected by step 2104. In another example, step 2106 may detect, for example, through a wireless communication protocol, two wearable devices and one light source, and based on the visual appearance in the stream of images of the external devices, step 2104 may detect four external devices and recognize one as a wearable device and three external devices as light sources. Step 2106 may transmit interrogation signals to the two wearable devices detected by step 2106, and step 2108 may identify which, if any, of the two wearable devices detected by step 2106, is the wearable device detected by step 2104, based on a detected change in the appearance of the wearable device detected by step 2104. Step 2106 may transmit interrogation signals to the light source detected by step 2106, and step 2108 may identify which, if any, of the three light sources detected by step 2104, is the light source detected by step 2106, based on a detected change in the appearance, or lack thereof, of the light sources detected by step 2104.

Controlling an External Device Using a Wearable Apparatus

In some embodiments, wearable apparatus 110 may be used to control a controllable device. A controllable device may be any device in an environment of wearable apparatus 110 that can be controlled by wearable apparatus 110. Example controllable devices may include, but are not limited to, computing devices, personal electronic devices, mobile devices, desktop devices, entertainment devices, household devices, audio and/or visual devices, illumination devices, appliances, fixtures, thermostats, televisions, coffee makers, printers, light sources, lamps, Wi-Fi support devices, network devices, wearable devices, etc.

In some cases, wearable apparatus 110 may control (e.g., change) one or more aspects of the controllable device. Example controllable aspects may include, but are not limited to, mode (e.g., a power-saving mode, a color printing mode, a shuffle mode, etc.), brightness, intensity, volume, position, on/off state, locked/unlocked state, armed/unarmed state, stop/play state, station or channel selection (e.g., for an audio and/or visual device), temperature, time, and/or speed. As an example, the controllable device may be or may include a light source, and wearable apparatus 110 may cause the controllable device to change an illumination state of the light source. As another example, the controllable device may be or may include a heating device, ventilation device, air conditioning device, and/or HVAC system, and wearable apparatus 110 may be configured to change one or more settings (e.g., a temperature or fan speed) of the heating device, ventilation device, air conditioning device, and/or HVAC system. As still another example, the controllable device may be or may include a locking mechanism, and wearable apparatus 101 may be configured to cause the controllable device to lock or unlock the locking mechanism.

In some cases, wearable apparatus 110 may control the aspect(s) of the controllable device in response to detecting a visual trigger. A visual trigger may be any trigger that is visually detectable by wearable apparatus 110, such as a hand or body gesture by a user of wearable apparatus 110 and/or movement of an object associated with the user, such as a stylus or glove.

In order to control a controllable device, wearable apparatus 110 may be configured to identify the controllable device and detect the visual trigger by analyzing images obtained by wearable apparatus 110. Based on the detection of the trigger, wearable apparatus 110 may transmit a signal configured to change the aspect(s) of the controllable device. The signal may be referred to as a command. The command may be transmitted to the controllable device by wearable apparatus 110 itself and/or through one or more intermediate devices, such as a device paired with wearable apparatus 110.

Figure 23:
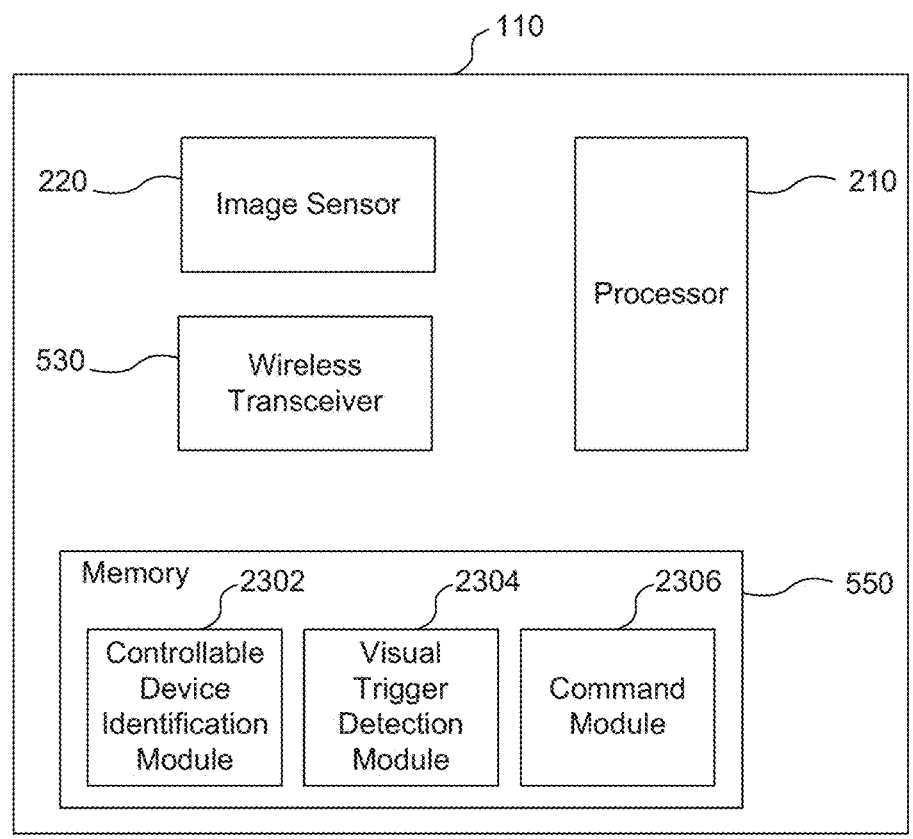
FIG. 23 is a block diagram illustrating an example of the components of a wearable apparatus for controlling an external device.

FIG. 23 is a block diagram illustrating an example of the components of a wearable apparatus 110 for controlling a controllable device. As shown in FIG. 23, wearable apparatus 110 may include image sensor 220, wireless transceiver 530, memory 550, and processor 210. While only one image sensor 220, wireless transceiver 530, memory 550, and processor 210 are shown, it will be understood that more of any of these components may be included. Further, while these components are shown to be included in wearable apparatus 110, in other embodiments one or more of these components may be remote from and configured to communicate with wearable apparatus 110 (e.g., distributed over one or more servers in communication with wearable device 110 over a network). In other embodiments, wearable apparatus 110 may include other components, such as any of the components described above in connection with FIGS. 5A-5C.

Image sensor 220 may take any of the forms described above in connection with FIGS. 2, 3A, 4A-4B, 5A-5C, and 7. Similarly, wireless transceiver 530 may take any of the forms described above in connection with FIGS. 5A-5C. Memory 550 may likewise take any of the forms described above in connection with FIGS. 5A-5C (including memory 550a, 550b), and processor 210 may take any of the forms described above in connection with FIGS. 2 and 5A-5C.

Image sensor 220 may be any device (e.g., camera, CCD, etc.) configured to obtain images from an environment of a user of the wearable apparatus 110. The environment may include, for example, one or more controllable devices. The images may include, for example, real-time image data of a field-of-view of the user. As discussed above, image sensor 220 may be configured to detect and convert optical signals into electrical signals, and the electrical signals may be used to form an image or a video stream (i.e., the stream of images) based on the detected signal.

Memory 550 may contain software modules consistent with the present disclosure. As shown, included in memory 550 are a controllable device identification module 2302, a visual trigger detection module 2304, and a command module 2306. Modules 2302, 2304, and 2306 may contain software instructions for execution by processor 210, as described below. Controllable device identification module 2302, visual trigger detection module 2304, and command module 2306 may cooperate to facilitate controlling of a controllable device be wearable apparatus 110.

Processor 210 may be configured to receive the images obtained by image sensor 220 and to analyze the images to identify the controllable device in the environment of the user. In some embodiments, processor 210 may be configured to execute software instructions in controllable device identification module 2302 to obtain the images from image sensor 220 and analyze the images to identify the controllable device in the environment. As described above, processor 210 may be configured to extract information from the stream of images. Extracting information, as described above, includes any process by which information associated with objects, individuals, locations, events, etc., is identified in the stream of images by any means known to those of ordinary skill in the art. Processor 210 may be configured to identify information associated with the controllable device in the images.

Processor 210 may be further configured to analyze the images to detect a visual trigger associated with the controllable device. In some embodiments, processor 210 may be configured to execute software instructions in visual trigger detection module 2304 to analyze the images to detect the visual trigger. As described above, processor 210 may be configured to extract information from the stream of images. Extracting information, as described above, includes any process by which information associated with objects, individuals, locations, events, etc., is identified in the stream of images by any means known to those of ordinary skill in the art. Processor 210 may be configured to identify information associated with the visual trigger in the images.

Analyzing the stream of images to identify the controllable device and/or detect the visual trigger may involve any analysis by which the controllable device and/or visual trigger may be identified or detected based on the images. In some embodiments, for example, analyzing the images may involve edge identification, in which an image is analyzed to detect pixels at which discontinuities (e.g., sudden changes in image brightness) occur and edges (e.g., edges of the controllable object, a body part of the user, and/or an object associated with the user) are identified to coincide with the detected pixels. Alternatively or additionally, in some embodiments analyzing the images may involve identifying in and/or extracting from an image pixels representative of one or more objects in the environment, such as the controllable object, a body part of the user, and/or an object associated with the user. Pixels may be determined to be representative of an object based on, for example, other images of the object maintained, e.g., in a database and/or predetermined data describing the object maintained, e.g., in a database (e.g., other images of the controllable device, of the body part of the user, and/or of the device associated with the user). Alternatively or additionally, pixels may be determined to be representative of an object based on, for example, a trained neural network configured to detect predetermined objects (e.g., predetermined controllable devices, body parts of the user, and/or devices associated with the user). Other types of analysis are possible as well, including, but not limited to, gradient matching, greyscale matching, scale-invariant feature transform (SIFT) matching, and/or interpretation trees.

Processor 210 may be further configured to, based on the detection of the visual trigger, cause wireless transceiver 530 to transmit a command to the controllable device. In some embodiments, processor 210 may be configured to execute software instructions in command module 2306 to cause wireless transceiver 530 to transmit the command. The command may be configured to change at least one aspect of the controllable device. The aspect may be, for example, a feature of the controllable device's appearance or function. Example aspects may include, but are not limited to, mode (e.g., a power-saving mode, a color printing mode, a shuffle mode, etc.), brightness, intensity, volume, position, on/off state, locked/unlocked state, armed/unarmed state, stop/play state, station or channel selection (e.g., for an audio and/or visual device), temperature, time, and/or speed.

The command may take the form of, for example, a radio frequency (RF) signal (e.g., a radio frequency identification (RFID) signal), a Bluetooth signal, an optical signal (e.g., an infrared signal, a visible light signal), or a Wi-Fi signal (e.g., an IEEE 802.11 signal). In some embodiments, different commands may be used for different controllable devices and/or different types of controllable devices. In some embodiments, control module 2304 may determine which command to use based on the identified controllable device. Alternatively or additionally, control module 2304 may attempt more than one command (e.g., in a predetermined order, an order dependent on the identified controllable device, etc.).

Wireless transceiver 530 may take different forms for different commands. For example, wireless transceiver 530 may take the form of a radio frequency transmitter or transceiver, a Bluetooth radio, and/or an optical transmitter (e.g., an LED). Likewise, the controllable device may include a component configured to receive the command, such as a radio transceiver, a Bluetooth detector, and/or an optical receiver (e.g., a photo diode detector). In some embodiments, the controllable device may include more than one component for receiving more than one type of command (e.g., a controllable device may be configured to receive both an optical and a Bluetooth command).

As described above, the command may be configured to cause a change in at least one aspect of the controllable device. In some embodiments, the command may include instructions to cause the controllable device to change the aspect(s) of the controllable device. For example, the command may cause the controllable device to change a mode in which the controllable device is operating (e.g., a power-saving mode, a color printing mode, a shuffle mode, etc.) or change a brightness, intensity, volume, position, on/off state, stop/play state, station or channel selection (e.g., for an audio and/or visual device), temperature, and/or speed of the controllable device.

In some embodiments, the controllable device may include one or more components for carrying out the command. For example, where the wearable apparatus 110 commands the controllable device to change a brightness of the controllable device, the controllable device may include a light configured to be brightened or dimmed. As another example, where the wearable apparatus 110 commands the controllable device to change from an unlocked state to a locked state, the controllable device may include a locking mechanism that enables the controllable device to change to a locked state. In some embodiments, the components configured to carrying out the command may be components specially adapted to carry out the command. Alternatively, the components may have other purposes in the controllable device. For example, where the command commands the controllable device to display certain information, the controllable device may display the information on a display of the controllable device that additionally serves to display other information at the controllable device.

In some embodiments, the change in the aspect(s) of the controllable device may be between binary states on the controllable device. For example, the controllable device may change a light from an on state to an off state. As another example, the controllable device may change from a power-saving mode to a non-power-saving mode. Alternatively, in some embodiments the command may specify an extent of change in the aspect(s) of the controllable device. For example, the command may specify a change in brightness and/or color of a light or may specify that the controllable device is to change a time for performing a function (e.g., a cook time on a microwave) by a specified amount and/or in a specified direction (e.g., add 30 seconds to the cook time). The change in the aspect(s) may be temporary. For example, the command may specify that the controllable device is to modify a display device to display certain information for a specified period of time. As another example, the command may specify that the controllable device is to remain in a power-saving mode for a specified period of time.

Figure 24:
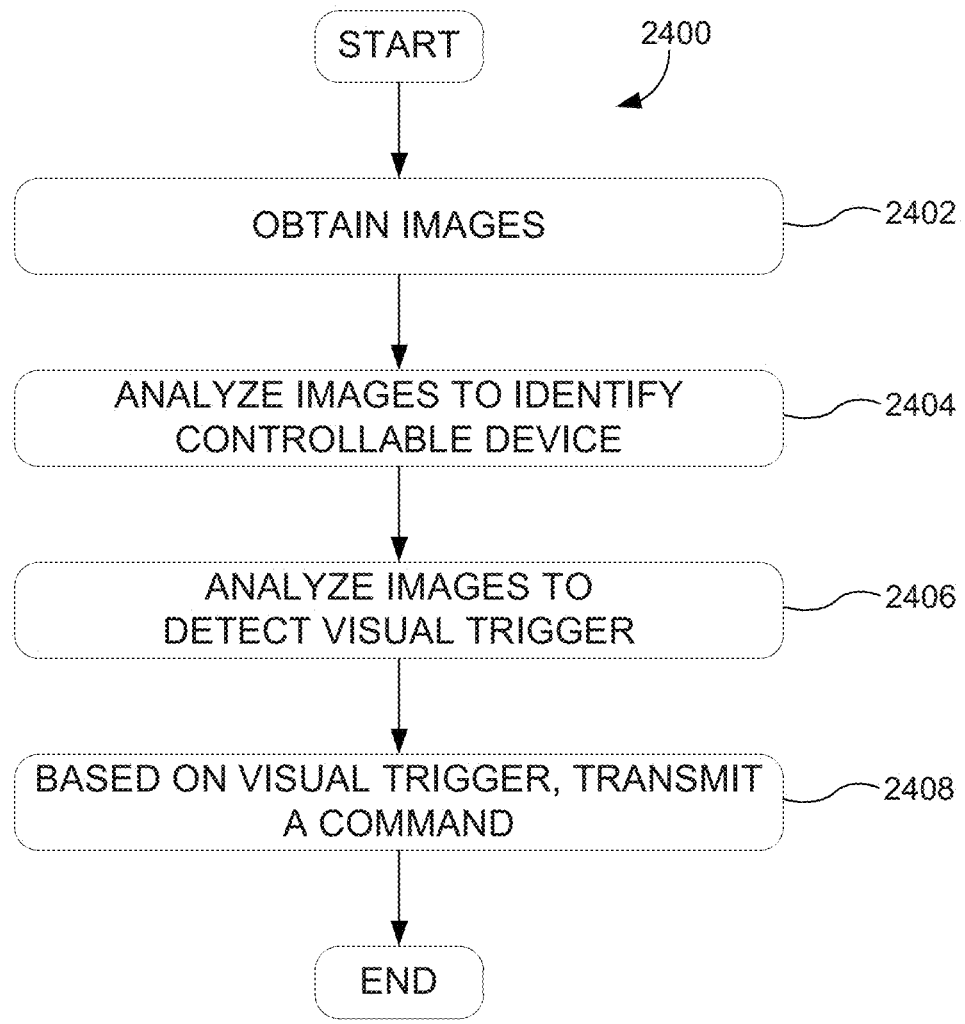
FIG. 24 is a flowchart illustrating an exemplary process for controlling an external device.

FIG. 24 is a flowchart illustrating an exemplary process 2400 for controlling a controllable device. Process 2400 is described with reference to FIGS. 25A-C, which are schematic illustrations of an exemplary controlling of a controllable device 2502 by a wearable apparatus 110 in an environment 2500. One of ordinary skill in the art will recognize that FIGS. 25A-C are examples, and other kinds of devices may be paired with wearable apparatus 110.

As shown, process 2400 may begin at step 2402 with obtaining images. The images may be obtained from, for example, at least one image sensor (e.g., image sensor 220) of the wearable apparatus 110, which may be configured to capture the images from an environment of a user of the wearable apparatus 110.

Figure 25A:
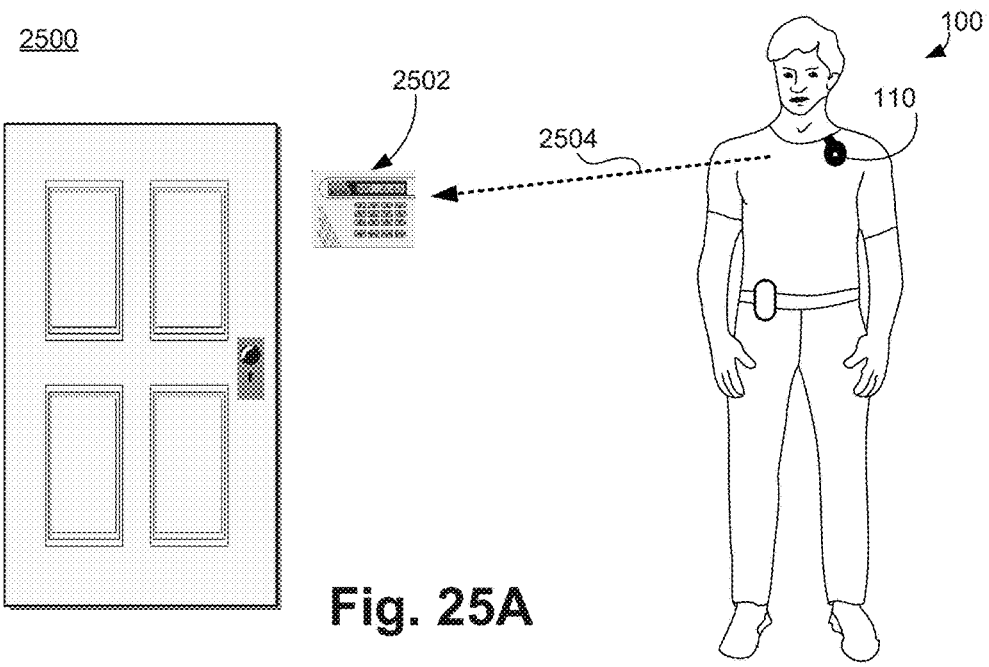
FIGS. 25A, 25B, and 25C are schematic illustrations of examples showing an external device being controlled by a wearable apparatus.
Figure 25B:
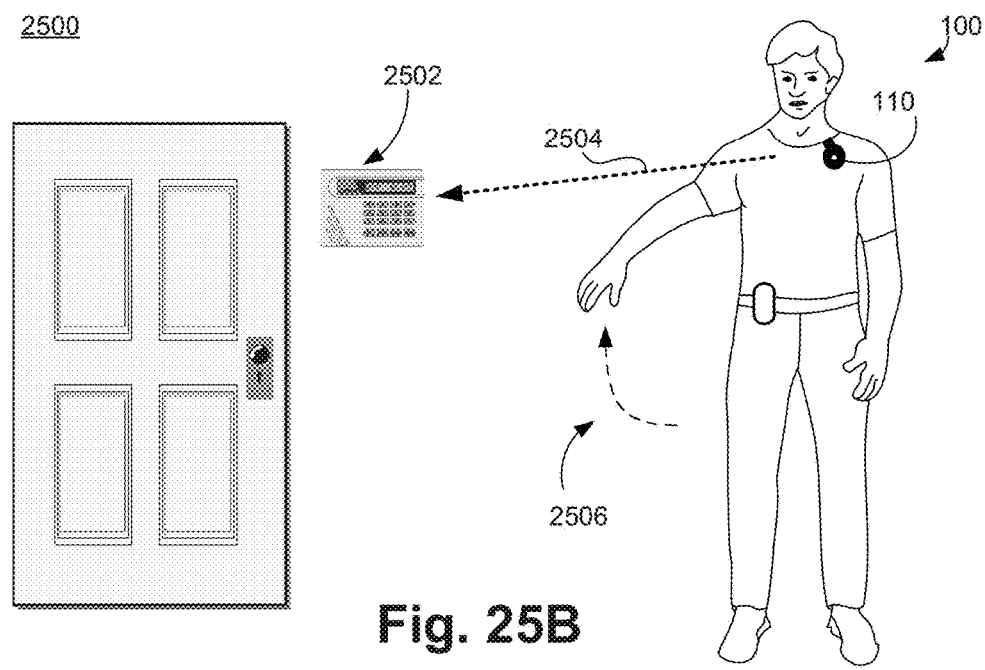
Figure 25C:
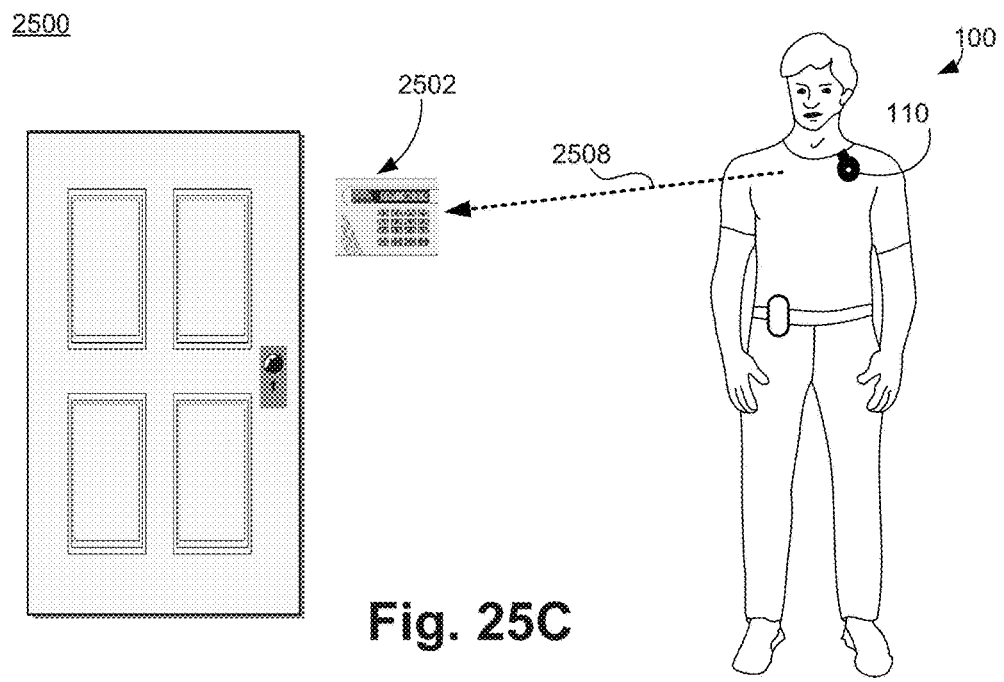

Example environment 2500 is shown in FIG. 25A. As shown, environment 2500 includes a user 100 wearing a wearable apparatus 110. While wearable apparatus 110 is shown to be configured to connect on an exterior surface of clothing of the user 100, similar to wearable apparatus 110 described in connection with FIG. 9, above, it will be understood that wearable apparatus 110 may take any of the forms described herein, including but not limited to those shown in FIGS. 1A-D, 3A-B, 4A-B, and 8-16. Wearable apparatus 110 may include and/or be communicatively coupled to an image sensor, such as image sensor 220 described above, that is configured to capture images from environment 2500. While environment 2500 is shown as an indoor environment, it will be understood that environment 2500 may be any proximity surrounding user 100, whether indoor, outdoor, or both.

Returning to FIG. 24, process 2400 may continue at step 2404 with analyzing the images to identify a controllable device. For example, at least one processing device (e.g., processor 210) in the wearable apparatus 110 may be programmed to analyze the images to identify the controllable device in the environment of the user of the wearable apparatus 110.

In some embodiments, in addition to identifying the controllable device, wearable apparatus 110 (e.g., at least one processing device in the wearable apparatus 110) may further analyze the images to identify a current state of the controllable device. The state may be any current setting or level of an aspect of the controllable device. The state may be, for example, a binary state of the controllable device, such as on/off state, a locked/unlocked state, an armed/unarmed state, a stop/play state, etc. Alternatively or additionally, the state may be a variable state of the controllable device, such as a brightness, intensity, volume, position, station or channel selection (e.g., for an audio and/or visual device), temperature, time, and/or speed of the controllable device. Still alternatively or additionally, the state may be a mode (e.g., a power-saving mode, a color printing mode, a shuffle mode, etc.) of the controllable device.

Alternatively or additionally, in some embodiments, in addition to identifying the controllable device, wearable apparatus 110 (e.g., at least one processing device in the wearable apparatus 110) may further analyze the images to identify a context associated with the controllable device. The context may be any features of the environment in which the controllable device is identified. The context may be, for example, a context associated with a particular user behavior, such as waking up, going to sleep, arriving, leaving, cleaning, preparing a meal, eating a meal, hosting a party, exercising, an object held by the user, etc. Alternatively or additionally, the context may be a context associated with a particular environmental feature, such as a time of day, an indoor or outdoor temperature, a state of another controllable device, an action involving the controllable device, etc.

An example controllable device 2502 is shown in FIG. 25A. As shown, controllable device 2502 may include a security system. While only a keypad of the security system/alarm is shown, controllable device 2502 may be the keypad itself and/or a security alarm system (e.g., comprising sensors, alerting devices, locks, etc.) of which the keypad is a part. Moreover, while the controllable device 2502 is shown to be a security alarm, controllable device 2502 may take other forms as well. For example, rather than being a security alarm, controllable device 2502 may include, be included in, be communicatively coupled to, and/or otherwise associated with a security alarm. As another example, controllable device 2502 may be, include, be included in, be communicatively coupled to, and/or otherwise associated with a computing device (e.g., a desktop computer, laptop computer, tablet computer, printer, database, server, etc.), personal electronic device (e.g., mobile device, cellular device, table, smartphone, smart watch, e-reader device, toy, etc.), entertainment device (e.g., television, digital media player, music player, radio, etc.), household device (e.g., refrigerator, oven, stove, microwave, alarm system, appliance, fixture, heating device, ventilation device, air conditioning device, HVAC system, security system, etc.), audio and/or visual devices (e.g., display, projector, speaker, etc.), illumination device (e.g., lamp, etc.), appliance (e.g., washing machine, dryer, blender, etc.), vehicle (e.g., automobile, lawn equipment, bicycle, boat, etc.), wearable device, and/or fixture (e.g., ceiling fan, lock, safe, door, garage door, etc.).

The images from environment 2500 captured by the image sensor(s) 220 of wearable apparatus 110 may include a representation of controllable device 2502, such that a processor 210 included in and/or communicatively coupled to wearable apparatus 110 may analyze the images to identify controllable device 2502 in environment 2500 of user 100. In some embodiments, wearable apparatus 110 may further determine a current state of the controllable device 2502, as described above. For example, wearable apparatus 110 may determine that controllable device 2502 is in an armed state, at a certain brightness level, and/or a door associated with controllable device 2502 is unlocked. Alternatively or additionally, in some embodiments wearable apparatus 110 may further determine a context associated with the controllable device 2502, as described above. For example, wearable apparatus 110 may determine a context associated with an action involving controllable device 2502, an object held by user 100, and/or a state of controllable device 2502.

In some embodiments, instead or in addition to step 2404, process 2400 may also comprise a procedure for identifying controllable devices in the vicinity of wearable apparatus 110 by detecting signals transmitted by the controllable devices. For example, wireless transceiver 530 may detect wireless signals transmitted by controllable devices in the vicinity of wearable apparatus 110. In another example, a RFID reader and/or RFID scanner may detect RFID enabled devices in the vicinity of wearable apparatus 110. In some examples, instead or in addition to step 2404, process 2400 may also determine the current state of the controllable device by receiving information related to the current state in signals transmitted by the controllable devices.

In some embodiments, in process 2400, step 2404 may be executed before, after or simultaneously with step 2606. In some embodiments, in process 2400, step 2404 and/or step 2606 may be executed after or simultaneously with step 2402.

In some embodiments, wearable apparatus 110 may pair (e.g., establish a communication path) with the controllable device, as described above in connection with FIGS. 20-22A-C. Pairing may permit wearable apparatus 110 to, for example, transmit command signals to control the controllable device, as described below, or simply exchange information with the controllable device. In some embodiments, for example, wearable apparatus 110 may transmit an interrogation signal configured to cause a change in at least one aspect of the controllable device, analyze one or more images captured by the image sensor after transmission of the interrogation signal to detect the change in the aspect(s) of the controllable device and, after detecting the change, store in the memory information relating to the controllable device. The information relating to the controllable device may include, for example, a location associated with the controllable device, a type associated with the controllable device, and/or at least one controllable function associated with the controllable device. The interrogation signal, the aspect(s) of the controllable device, and/or the information may take any of the forms described above in connection with FIGS. 20-22A-C.

In some embodiments, as described above in connection with FIGS. 20-22A-C, wearable apparatus 110 may additionally be configured to analyze one or more images captured by the image sensor to detect at least one recognized gesture made by the user and transmit a control signal configured to control at least one aspect of the controllable device. The aspect(s) of the controllable device may be associated with the recognized gesture, as described above. The control signal and the aspect(s) of the controllable device may take any of the forms described above in connection with FIGS. 20-22A-C.

Returning to FIG. 24, process 2400 may continue at step 2406 with analyzing the images to detect a visual trigger. For example, at least one processing device (e.g., processor 210) in the wearable apparatus 110 may be programmed to analyze the images to detect a visual trigger associated with the controllable device. Example visual triggers may include, but are not limited to, movements of the user 100, a body part of the user 100, and/or an object associated with the user 100 such as a stylus or glove. Alternatively or additionally, the visual trigger may include a hand gesture, an action involving a hand of the user 100, and/or an action involving the controllable device. In some embodiments, wearable apparatus 110 may store in memory 550 associations between visual triggers and controllable devices. Such associations may be predetermined, user-defined, and/or provided by the controllable device (e.g., during pairing with the controllable device, as described above). In some embodiments, wearable device 110 may further identify a type associated with the visual trigger. For example, wearable device 110 may identify if the visual trigger is a hand gesture, an action involving the user's hand, an action involving the controllable device, etc.

An example visual trigger 2506 is illustrated in FIG. 25B. While the visual trigger 2506 is shown to be a raise of an arm of user 100, it will be understood that other visual triggers are possible as well. For example, the visual trigger 2506 may be another movement by the same and/or another body part of the user 100, such as a hand gesture (e.g., an upward flick of an index finger). As another example, the visual trigger 2506 may be a movement by an object associated with the user 100, such as a stylus held by the user 100 or a glove worn by the user 100. As still another example, the visual trigger 2506 may be an action involving the controllable device 2502, such as tapping the controllable device 2502 or making a movement near the controllable device 2502.

The images from environment 2500 captured by the image sensor(s) 220 of wearable apparatus 110 may include a representation of the visual trigger 2506, such that a processor 210 included in and/or communicatively coupled to wearable apparatus 110 may analyze the images to detect the visual trigger 2506. In embodiments where wearable apparatus 110 determines a context associated with the controllable device 2502, as described above, the context may alternatively or additionally be associated with the visual trigger.

In some embodiments, instead or in addition to step 2406, process 2400 may also comprise a procedure for detecting a non-visual trigger, such as a non-visual trigger produced by user 100. Some examples of such non-visual triggers may include a press of a button, an audible trigger, and so forth. In some embodiments, instead or in addition to step 2404, process 2400 may also determine a type associated with the non-visual trigger. For example, when the non-visual trigger comprises a press of a button, the type of the non-visual trigger may be based on the identity of the pressed button, and the duration of the press, on the intensity of the press, and so forth. In another example, when the non-visual trigger comprises an audible trigger, the type of the non-visual trigger may be based on sounds and/or speech included in and/or surrounding the audible trigger.

Process 2400 may continue at step 2408, with, based on the visual trigger and/or the non-visual trigger, transmitting a command. For example, the processing device(s) in the wearable apparatus 110 may be programmed to cause at least one transmitter (e.g., wireless transceiver 530) in the wearable apparatus 110 to transmit the command. The command may be configured to cause a change in at least one aspect of the controllable device. In embodiments where the controllable device is paired with wearable apparatus 110 (e.g., through visual pairing, as described above), the command may be transmitted via the communication path established by the pairing.

In embodiments where wearable apparatus 110 identifies a current state of the controllable device, wearable apparatus 110 may select the command from among a plurality of commands based on the identified current state of the controllable device. For example, if the controllable device is identified to be in an off state, wearable apparatus 110 may select, based on the identified off state, a command to power on the controllable device. As another example, if the controllable device is identified to be tuned to a particular channel or station, wearable apparatus 110 may select, based on the identified channel or station, a command to tune the controllable device to another channel or station.

Alternatively or additionally, in embodiments where wearable apparatus 110 identifies a context associated with the controllable device and/or the user and/or the environment, wearable apparatus 110 may select values for one or more parameters associated with the command based on the identified context. For example, if the controllable device is a microwave, and an identified context is associated with a meal to be prepared held by the user, the one or more parameters may include settings for the microwave determined based on the content of the meal. As another example, if the controllable device is a vehicle, and the identified context is associated with a user preparing to leave, the one or more parameters may include starting the vehicle, adjusting a seat position of the vehicle, and/or opening a garage door associated with the vehicle based on the user that is leaving.

Alternatively or additionally, in embodiments where wearable apparatus 110 identifies a type associated with the visual trigger and/or the non-visual trigger, wearable device 110 may select the command from among a plurality of commands based on the identified type and the visual trigger. For example, if the identified type is a hand gesture, and the visual trigger is an upward flick of an index finger, and this type and visual trigger are associated with a command for turning on a light switch, wearable device 110 may select the command to turn on the light switch.

Alternatively or additionally, in some embodiments, wearable apparatus 110 may be further configured to obtain audio data captured by at least one audio sensor included in wearable apparatus 110. The audio sensor may take the form of, for example, a microphone, and wearable apparatus 110 may be further configured to process the audio data using one or more types of audio signal processing including, but not limited to, digital signal processing and/or voice recognition techniques, such as those based on Hidden Markov Models, dynamic time warping (DTW) techniques, and/or neural networks. In these embodiments, wearable apparatus 110 may select the command from among a plurality of commands based, at least in part, on the audio data. For example, if the controllable device is identified to be tuned to a particular channel or station, and the audio data indicates a requested channel or station (e.g., the user 100 states aloud the name or number of a channel or station), wearable apparatus 110 may select, based on the audio data, a command to tune the controllable device to the requested channel or station.

As shown in FIG. 25C, for example, based on the visual trigger 2506, wearable apparatus 110 may transmit command 2508 to controllable device 2502, thereby controlling at least one aspect of controllable device 2502. The controlled aspect(s) may be associated with visual trigger 2506.

For example, based on the visual trigger 2506, wearable apparatus 110 may transmit command 2508 to cause controllable device 2502 to change from an unarmed state to an armed state. As another example, based on the visual trigger 2506, wearable apparatus 110 may transmit command 2508 to cause controllable device 2502 to lock a door associated with controllable device 2502. As still another example, based on the visual trigger 2506, wearable apparatus 110 may transmit command 2508 to cause controllable device 2502 to contact emergency personnel, such as the police. The control may be permanent or may be temporary (e.g., command 2508 may cause controllable device 2502 to power down for a period of time or change a setting of controllable device 2502 permanently). Alternatively or additionally, controlling the aspect(s) may involve controlling any of the aspects described above, such as a mode of controllable device 2502, a brightness and/or intensity of controllable device 2502, a position of controllable device 2502, or another function of controllable device 2502.

As described above, in some embodiments, wearable apparatus 110 may determine a current state of the controllable device 2502. For example, wearable apparatus 110 may determine whether a door associated with controllable device 2502 is locked or unlocked. In these embodiments, wearable apparatus 110 may select the command 2508 from among a plurality of commands based on the identified current state of controllable device 2502. For example, wearable apparatus 110 may select a command 2508 to lock the door where it is determined that the door is unlocked, while wearable apparatus 110 may select a command 2508 to arm the security alarm where it is determined that the door is locked.

In some embodiments, wearable apparatus 110 may determine a context associated with the controllable device 2502. For example, wearable apparatus 110 may determine a context indicating that user 100 is going to sleep. In these embodiments, wearable apparatus 110 may select values for one or more parameters associated with the command 2508 based on the identified context associated with the controllable device 2502. For example, when the context indicates that user 100 is going to sleep, wearable apparatus 110 may set parameters associated with the command 2508 to lock all the doors and windows, activate a motion sensor, and/or arm the security alarm.

In some embodiments, wearable apparatus 110 may receive an indication that the aspect(s) has changed. For example, the controllable device and/or another device paired with wearable apparatus 110 may generate and provide the indication. In another example, wearable apparatus 110 may analyze the stream of images to identify a change in the aspect(s) of the controllable device. After receiving the indication and/or identifying the change in the aspect(s) of the controllable device, wearable apparatus 110 may provide feedback to user 100 indicative of the change in the aspect(s) of the controllable device. Example feedback may include visual, audio, and/or haptic feedback.

In some embodiments, wearable apparatus 110 may receive an indication that the command transmitted by step 2408 was received, for example by the controlled device, by an intermediate device, by a paired device, and so forth. For example, the indication may be received as an incoming signal using transceiver 530. After receiving the indication, wearable apparatus 110 may provide feedback to user 100 indicative that the command was received. Example feedback may include visual, audio, and/or haptic feedback.

While certain environments, controllable devices, visual triggers, and aspects are shown in FIGS. 25A-25C, it will be understood that these are merely exemplary and that other environments, controllable devices, visual triggers, and aspects are possible as well. It should be noted that while wearable apparatus 110 may communicate commands directly to one or more controllable devices, such commands may also be provided to one or more intermediate devices. For example, in some embodiments, wearable apparatus 110 may communicate a state or command with one or more intermediate hubs or controllers, and those hubs or controllers may distribute subcommands to devices (e.g., lights, locks, etc.) linked on a network to the hubs or controllers, the subcommands being generated for accomplishing the received commands of wearable apparatus 110.

Crowd-Sourced Vision-Based Information Collection

In some embodiments, a plurality of wearable apparatuses 110 may capture image data and may stream the image data to server 250 and/or computing device 120 and/or another wearable apparatus 110 for further processing. Server 250 and/or computing device 120 and/or another wearable apparatus 110 may analyze the plurality of data streams to determine a trait common to two or more of the users of the plurality of wearable apparatuses. As such, the analysis of the plurality of data streams may be carried out, for example, by a computing device, such as server 250, computing device 120 and/or another wearable apparatus 110. For exemplary purposes, the analysis of the plurality of data streams is described as being performed by server 250. In one example of determining a trait common to two or more users wearing wearable apparatuses 110, the two or more users may face the same person, and their wearable apparatuses 110 may capture image data of that person. The image data may be streamed to server 250 and analyzed to determine that the trait of the two users is an interaction with the same person. The server may store the data representing the determined trait in a database and/or report information relating to the trait to the user.

Figure 26:
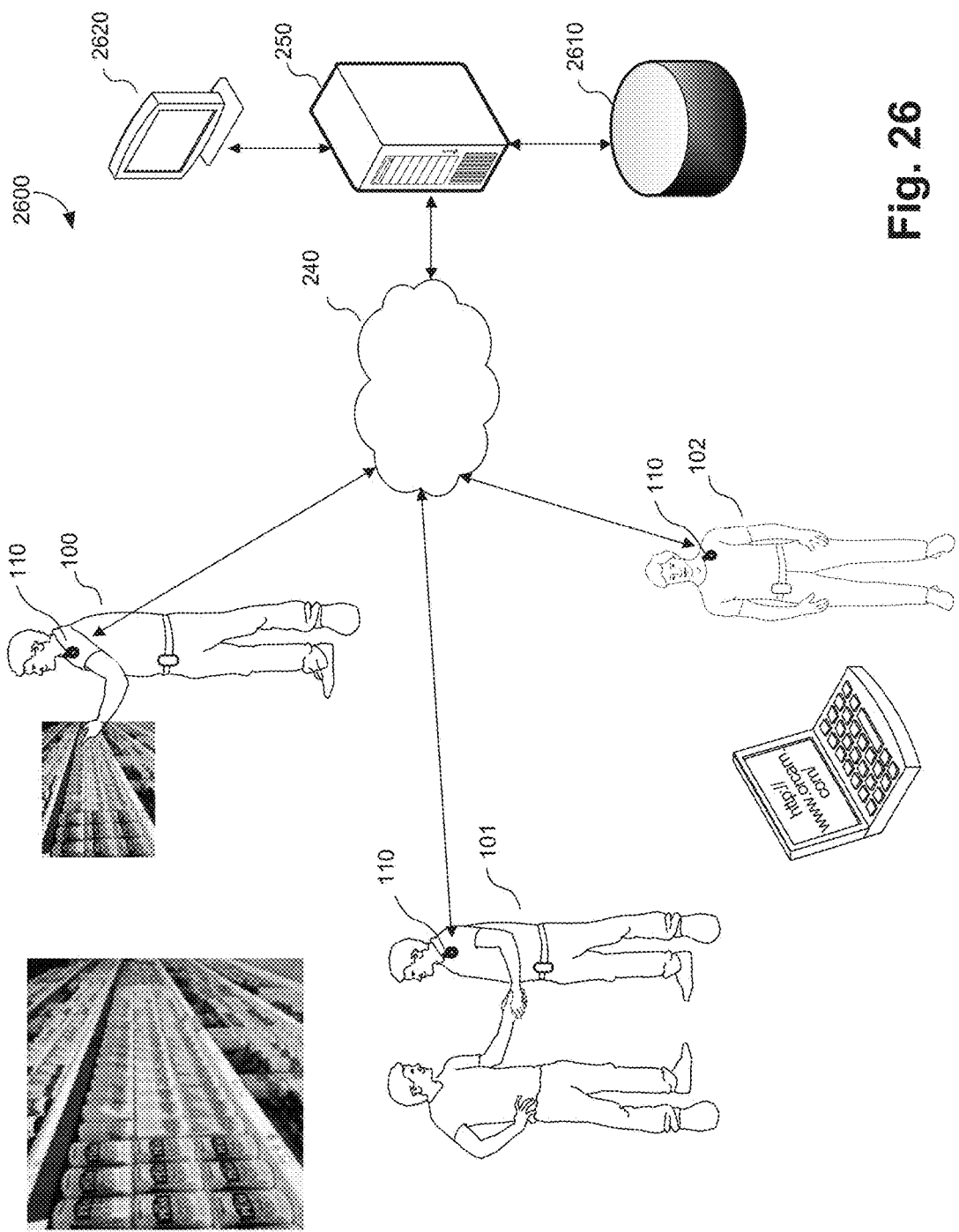
FIG. 26 illustrates an example environment consistent with the disclosed embodiments.

FIG. 26 is an illustration of an example environment 2600 including users (100, 101, 102) wearing wearable apparatuses 110 and a server 250 capable of communicating with wearable apparatuses 110 via network 240, consistent with disclosed embodiments. Server 250 may be used in environment 2600 to determine traits of users 100, 101, and 102, for example relating to image data acquired from each wearable apparatus. In some embodiments, each wearable apparatus 110 may be configured as shown in FIG. 7. For example, wearable apparatuses 110 may include an orientation adjustment unit 705 configured to permit adjustment of image sensor 220.

By way of example, FIG. 26 shows three users, each wearing wearable apparatus 110, experiencing different situations. Although only three users are shown, any number of wearable apparatuses 110 worn by users may communicate to server 250, for example, through network 240. The data sent to server 250 is, therefore, crowd-sourced because it comes from many different wearable apparatuses 110. Each wearable apparatus 110 may acquire image-based information associated with images captured by the camera on the particular wearable apparatus. Image-based information may include raw images captured from the camera and formatted as jpeg, pic, tiff, mpeg, or any other suitable image format. Image-based information may also include images pre-processed by a processing device on the wearable apparatus 110. The pre-processed images may be categorized, enhanced, compressed, or otherwise altered. Image-based information may include logos, words and/or facial information extracted from the images. Image-based information may also include names of products, people, etc. that the users interact with.

In some embodiments, the image-based information may be of the situation or environment of the user wearing the wearable apparatus 110. For example, user 100 may be shopping in a grocery store and retrieving an item from a shelf. The wearable apparatus 110 may capture images of the user reaching for the product (as well as nearby products) and transmit the image-based information to server 250. In the second example, user 101 may be meeting another person. Wearable apparatus 110 affixed to user 101, thus, may acquire images of the person as user 101 is facing the person. In the third example, user 102 is looking at a computer screen with a particular website displayed on the screen. The wearable apparatus 110 being worn by user 102 may acquire images of the computer screen.

In some embodiments, each wearable apparatus 110 may transmit image-based information to server 250. In some examples, wearable apparatuses 110 may first transmit the information to a network and then to server 250. In other examples, the wearable apparatuses 110 may transmit the information directly to server 250. In some embodiments, the image-based information may be streamed to server 250. The data stream may occur in real-time (e.g., shortly after the image data is acquired, for example within one second), or the stream may be delayed by a predetermined amount of time. Thus, server 250 may receive one or more data streams of image-based information from each wearable apparatus 110.

In some embodiments, server 250 may include a data interface (not shown) that allows server 250 to receive the data streams from wearable apparatuses 110. The data interface may include hardware and/or software to interface with network 240 or directly to wearable apparatuses 110. For example, the data interface may include transmitting and receiving circuitry for a wired or wireless connection to network 240. Server 250 may also include a processing device operatively coupled to memory for storing instruction for the processing device.

In some embodiments, devices other than or in addition to server 250 may receive the transmitted data streams from wearable apparatuses 110. For example, computing device 120 may receive the data streams. Alternatively, any one or all of the wearable apparatuses 110 may receive the data streams from the other wearable apparatuses 110.

In some examples, server 250 may analyze the image-based information in each of the received data streams. For example, server 250 may receive a data stream from a particular wearable apparatus 110 using the data interface. Server 250 may, using the processing device, unpack or extract the image-based information in the data stream. In some examples, the image-based information may be a series of images captured by the camera on the wearable apparatus 110. In other examples, the image-based information may include camera settings, such as f-stop, focal length, light and color content of the image, etc.

Server 250 may analyze the image-based information to determine at least one trait of the user wearing the wearable apparatus 110. A trait in this aspect may refer to a descriptor associated with the user wearing the wearable apparatus 110. The descriptor may refer to any aspect or aspects of the user's interactions with the user's environment. In some examples, a trait may involve a situation, environment, and/or activity of the user. A trait may also involve an action and/or interaction by the user. For example, a trait may include interactions with people, interactions with certain products or types of products, activities engaged in, materials read and/or reviewed, etc. In some embodiments, server 250 may determine the frequency at which a trait occurs. Server 250 may, for example, increment a counter each time the particular trait is determined and associate the counter with the trait. Thus, each trait, or category of traits, may be associated with a respective counter to keep track of the number of occurrences of the trait. Moreover, timers may be used to track the number of occurrences over time. The frequency of occurrence may be associated with the trait and stored, as described below, in a database. In some examples, server 250 may use image recognition algorithms and/or machine vision algorithms to determine objects and/or persons in the received images. For example, optical character recognition (OCR) may be used to determine words in an image, such as on a paper, sign, book, etc. Detected words may be used to recognize consumer products, brand names, and/or categories of products. In some examples, edge and shape recognition may be used to determine objects in images, such as a ball, a tree, line on a playing field, etc. Facial recognition may be used to determine features on a human face, where the features may be compared to a database of features to determine the identity of a person. In some examples, context analysis may be used to determine situations involving the recognized words, object, people, etc. For example, an image may be captured and analyzed to determine the presence of a ball, grass, lines on the grass, and a soccer player. Contextual analysis may then determine that the user is attending a soccer game. Other non-exhaustive examples of context analysis include: water+boat=boating; grass+ball=sport (the type of ball may also be recognized to determine if the sport is, for example, soccer, baseball, football, etc.); recognize lines of a playing field; aisles+products=grocery store; read text on object to recognize brands of products (e.g., Colgate, etc.); recognize general descriptive words (e.g., potatoes, milk, etc.), for example, at a produce market.

Furthermore, in some embodiments, for example, analyzing images may involve edge identification, in which an image is analyzed to detect pixels at which discontinuities (e.g., sudden changes in image brightness) occur and edges (e.g., edges of the external object) are identified to coincide with the detected pixels. Alternatively or additionally, in some embodiments analyzing images may involve identifying in and/or extracting from an image pixels representative of objects in the environment, such as the external object. Pixels may be determined to be representative of an external object based on, for example, other images of the external device or similar external devices maintained, e.g., in a database and/or predetermined data describing the external object maintained, e.g., in a database. Alternatively or additionally, pixels may be determined to be representative of an external object based on, for example, a trained neural network configured to detect predetermined external objects. Other types of analysis are possible as well, including, but not limited to, gradient matching, greyscale matching, scale-invariant feature transform (SIFT) matching, and/or interpretation trees.

In the case where multiple images are received over a period of time, server 250 may compare sequential images to determine actors and/or actions taking place in the images. For example, as illustrated in FIG. 26, user 100 is reaching towards a product on the shelf in a grocery store. Analysis of the image-based data received from the wearable apparatus 110 being worn by user 100 may determine that the user is reaching towards a specific commercial product, such as a can of peas, and it may further be determined the particular brand of peas. Analysis of the image-based information may also determine the brands of products near to the particular brand that the user is interacting with. Thus, server 250 may determine that the user 100 is interacting with a commercial product and classify this interaction as a trait. Server 250 may further determine that user 100 is shopping based on extracted visual cues in the received image-based information. Thus, a separate trait may be determined and classified as shopping. In some examples, server 250 may also use non-visual information in order to obtain such determinations. Examples of such non-visual information may include, but are not limited to: financial information, including billing information; positioning information, such as geolocation data; temporal information, including time of day, date, etc.; information obtained from a calendar and/or day planner; information obtained from a social network; information based on captured audio; and so forth.

In some embodiments, server 250 may determine the frequency at which user 100 interacts with commercial products. For example, server 250 may keep track of the number of times a certain trait occurs with the user. Server 250 may, for example, increment a counter each time the particular trait is determined and associate the counter with the trait. The frequency of occurrence may be associated with the trait and stored, as described below, in a database.

Similarly, server 250 may analyze the received data stream from wearable apparatus 110 being worn by user 101. In this example, user 101 is interacting with a person (e.g., shaking hands, a face appearing within a predetermined distance, detection of eyes having a looking direction toward the user, etc.). The image-based information received from user 101 may be analyzed to determine several aspects of the interaction. For example, the identity of the person may be determined using facial recognition. The type of interaction with the person may also be determined. For example, edge and contour recognition may determine that user 101's arm and the other person's arm are meeting between their bodies, and context analysis may be used to deter mine that a handshake is taking place. The mood of the person may also be determined by, for example, employing trained neural networks to determine characteristics related to mood, such as furrowed brow—angry, smiling, laughing, tears/crying—sad etc. The environment surrounding the interaction may also be determined by recognizing objects and landscapes, etc. Thus, in the example shown, server 250 may determine that the user 101 is interacting with a person (e.g., greeting the person by shaking hands) and classify this interaction as a trait. Again, multiple traits may be determined from the same situation. For example, the trait may be classified as a "greeting," a "salutation," a "business event" (if the data indicate that the person is a business colleague), etc. In some examples, server 250 may also use non-visual information in order to obtain such determinations, as described above. For example, server 250 may use information from a calendar and/or day planner to identify the nature of the interaction, the identity of the person, and so forth. Along the same lines, server 250 may receive a data stream from wearable apparatus 110 being worn by user 102. In this case, user 102 is looking at a computer screen where a particular website is being displayed. Server 250 may receive images of the website as content in the data stream. Server 250 may analyze the received data stream to determine and/or identify the website. For example, server 250 may determine the URL of the website, recognize images on the web page and compare the images to known images for particular websites, recognize logos, read an entity name from the displayed page, etc., and determine that user 102 is visiting the identified website. Thus, server 250 may determine that the user 102 is visiting a particular website and classify this interaction as a trait. Furthermore, in some examples, server 250 may analyze the received data stream to determine one or more activities associated with the website, such as searches, posting, and so forth.

In some embodiments, server 250 may determine the frequency at which user 102 visits a particular website, interacts with a particular person, performs a particular task, chooses a particular consumer product, etc. As explained above, timers and counters associated with particular traits or categories of traits.

In other examples, the image-based information may relate to a hand gesture captured by wearable apparatus 110 (not shown in FIG. 26). For example, the user may point to an object, swipe in a particular direction in front of the camera, wave to a person, etc. The hand gesture captured in the image-based information may indicate an action to be taken, such as retrieving information about a product, saving a location of an item, deleting an item for a database, etc.

The hand gesture may also be used by server 250 in contextual analysis of a situation. For example, if a user waves to another person, server 250 may determine that the user and the person are friends. Wearable apparatus 110 may acquire images of the hand gesture and stream the image-based information to server 250. Server 250 may analyze the image-based information to determine the gesture performed. In some examples, server 250 may analyze image-based information from two or more wearable apparatuses 110 to determine the gesture. For example, the wearable apparatus of a first user may capture partial images of the hand gesture such that the gesture is not fully recognized. A second user with a different wearable apparatus may be in the same environment and also capture images of the first user's hand gesture. Server 250 may recognize that the images from the second user include a hand gesture from the first user and subsequently recognize the hand gesture associated with the first user.

Several examples of traits have been described above, but other traits are possible. Further examples of traits may be: experiencing a sporting event (e.g., the field, type of ball, uniforms, etc. may be recognized to determine particular sporting event), a birthday party (e.g., objects, such as a cake, candles, decorations, etc. may be recognized), eating a meal (e.g., the location, logo of a restaurant, type of food may be recognized), driving a car (e.g., steering wheel may be recognized along with acceleration occurring when the images were captured), etc.

In some embodiments, two or more users may be experiencing or may have experienced the same or similar situation (e.g., trait). In this case, server 250 may determine that two or more users have at least one trait in common. For example, two of the users may be shopping in the same grocery store. Server 250 may analyze the data streams from the two users and determine that both users have interacted with the same commercial product. Thus, the common trait may be identified. In some examples, the common trait may be interaction with the same person, performing the same action (e.g., shaking hands), visiting the same website, etc.

In some embodiments, server 250 may analyze the received data streams in parallel to determine the common trait. For example, image-based information with images of the same situation from two or more wearable apparatuses 110 may be analyzed. Server 250 may recognize that the images provide views from different angles of the same environment. For example, server 250 may use location coordinates of where the images were taken to determine that they are of the same environment. Server 250 may also recognize names of places or other location identifiers to determine that the images are of the same environment. In other examples, server 250 may use timestamps to determine that the images were taken at the same or similar time. Furthermore, server 250 may recognize the same objects or persons in images from the different data streams. Analyzing the images from the multiple data streams in the same environment may aid in determining the trait for each user. For example, the image-based information may be correlated to, for example, recognize individuals, products, activities, contexts, etc. from different angles. Moreover, server 250 may also determine the frequency at which each user experiences the particular trait. For example, server 250 may determine a frequency or an average time of interaction for the common trait and store the frequency or average time, as described below.

In some embodiments, server 250 may store the information relating to the determined trait or traits in a storage resource 2610. The storage resource 2610 may be local to server 250, at a remote location, distributed (e.g., in multiple locations on part of multiple systems), and so forth. In some examples, the storage resource 2610 may include internal memory of server 250 and/or computing device 120. Storage resource 2610 may also include memory within one or more of wearable apparatuses 110. In some examples, storage resource 2610 may be a nonvolatile storage medium, such as a hard disk or a solid state disk. Server 250 may store the information relating to the determined trait or traits in a database on storage resource 2610. The database may be of any known kind, such as a relational database or a self-referencing database. The database may include demographic information about the user or users associated with the trait or traits. For example, a database entry containing information relating to the determined trait or traits may also contain biographical information (e.g., demographics) about the user or users associated with the trait or traits.

In some embodiments the stored information and/or information based on the stored information may be output to a user. For example, server 250 may include a monitor 2620 and display a graphical user interface (GUI) containing the information relating to the determined traits. In other examples, the stored information may be displayed on computing device 120. In still other examples, the stored information may be presented to the user through a display on a wearable apparatus. In some embodiments, the stored information may be communicated to a user audibly. For example, the results of a query to the database may be read by devices, such as server 250, computing device 120, and/or wearable apparatus 110. The displayed or otherwise communicated information may include the determined trait and/or demographics information about the users of the wearable apparatuses to which the trait belongs.

In some embodiments, server 250 may receive a query pertaining to the stored information. Server 250 may respond to the query by transmitting information requested in the query to the requesting device. For example, computing device 120 may send a query to server 250 requesting particular information about a trait, such as shopping in a grocery store. Server 250 may access the database containing the stored information, sort the information and organize a response. For example, the response may contain the most common commercial product chosen, the most active grocery store, where in a grocery store a particular item is located, etc.

In some embodiments, the data stream may include more information than just image-based information. For example, the data stream may also include position information, recognizing the location of where the images were captured. In some examples, position information may include global position system information (e.g., latitude and longitude), proximity to Wi-Fi hotspots or cellular towers, or other absolute positioning information. Position information may also include names of locations where the images were captured. For example, a user may input location information, such as "home" or "work" or "Leaning Tower of Pisa." In other examples, image recognition may be used to identify the location of images. Wearable apparatus 110 and/or server 250 may analyze the images and determine a location based on identifying characteristics of the images. By recognizing specific objects, places, words, etc. in the images. For example, the words "Hank's Supermarket" may be recognized on an identified building that the user walks toward. Server 250 may search a database to determine the location of "Hank's Supermarket" and assign a location to the images.

In some embodiments, server 250 may analyze the received data stream containing position information to determine the position of wearable apparatus 110. For example, the processing device may be programmed to extract the position information from the one or more data streams received from wearable apparatuses 110, and based on the position information, determine the location of each wearable apparatus. Server 250 may store the determined location of the wearable devices in the database as additional information about the determined trait or traits.

In some embodiments, the one or more data streams may include timing information, which may identify when a particular image is captured by a wearable apparatus 110 or the duration between captured images. For example, each wearable apparatus 110 may provide a timestamp (including a date and/or time) associated with each captured image. The timestamp may be integrated into the image-based information and/or associated a particular image by reference. In some examples, server 250 may extract the timing information to order received image-based information prior to or while analyzing the image-based information to determine the trait or traits.

In some embodiments, interaction frequency, schedule, and/or duration may be determined, in part, using the timing information. For example, timing information may be associated with the determination of a trait for each user. Based on the trait timing information, server 250 may determine a pattern of interaction, such as a schedule, and associate the schedule with the user and trait. In other examples, timing information may be used to determine how long a particular trait lasts. For example, timing information may be used to determine how long a user (e.g., user 102) spends on a particular website.

In some embodiments, the one or more data streams may include information based on audio captured from an environment of wearable apparatus 110. For example, the information based on audio may include conversation topics, transcriptions, noise level, musical genre, and so forth. In some examples, the information based on audio may be used to determine a type of interaction a user is involved in, a preference of the user, and so forth.

In some embodiments, the one or more data streams may include motion information related to motion of the wearable apparatus 110. For example, each wearable apparatus 110 may include a motion sensor, such as a multi-axis accelerometer, gyroscope (e.g., MEMs-based), pressure sensor, magnetic sensor (e.g., compass), etc. Motion information may be associated with the captured images in the image-based information and/or include in the data stream with reference to captured images. Because the motion information may correspond to motion of the wearable apparatus, the motion information may also be unassociated with captured images and transmitted in the data stream as independent data. In some embodiments, server 250 may receive the motion information as part of the received data stream. Server 250 may extract the motion information from the data stream and use the information to determine the trait or traits of each user. For example, server 250 may determine that user 101 walks towards the person before shaking hands. The received motion information would indicate that the handshake is a greeting and the trait may be classified accordingly. In another example, the motion information may be used to determine or confirm participation in particular activities. For example, server 250 may recognize a soccer ball on a grass field and tentatively determine that the user is playing soccer. Server 250 may confirm the tentative determination by analyzing the motion information and proximity of the ball to confirm that the user is playing soccer.

Figure 27B:
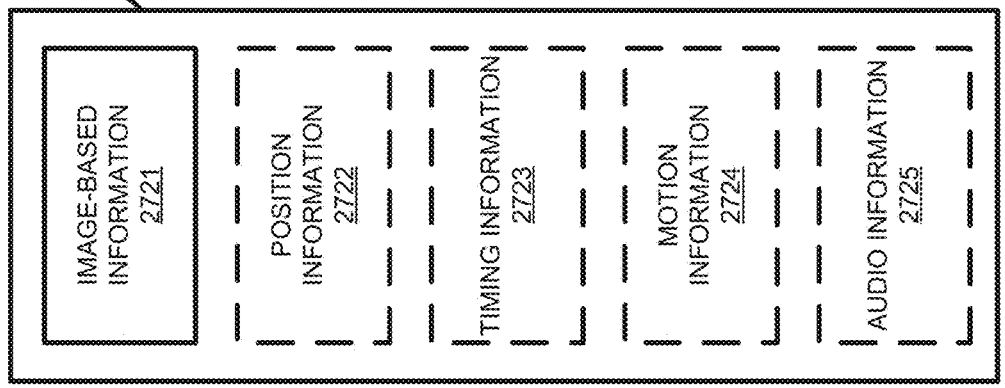
FIG. 27B illustrates an exemplary embodiment of a data stream consistent with the present disclosure.
Figure 27A:
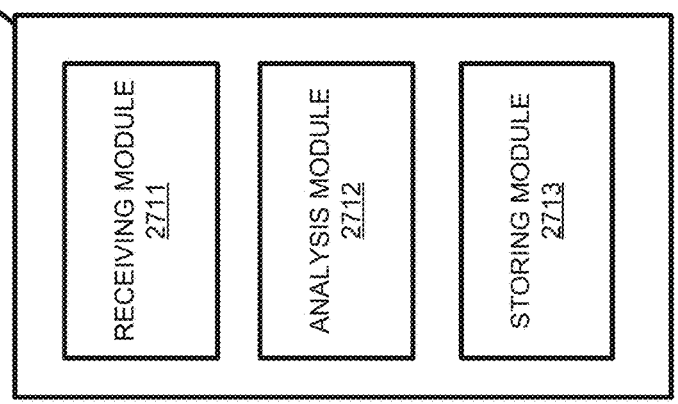
FIG. 27A illustrates an exemplary embodiment of a memory containing software modules consistent with the present disclosure.

FIG. 27A illustrates an exemplary embodiment of memory 2710 containing software modules to determine a trait common to two or more users. For example, one or more of server 250, computing device 120, or wearable apparatus 110 may execute instructions from the modules to perform one or more of the functions as described with respect to FIG. 26, above. Included in the memory are receiving module 2711, analysis module 2712, and storing module 2713. Modules 2711, 2712, and 2713 may contain software instructions for execution by at least one processing device included with a server-based system, such as is included in server 250.

Receiving module 2711 may be configured to receive one or more data streams transmitted by wearable apparatuses. Receiving module 2711 may interact with a data interface to receive the one or more data streams. Receiving module 2711 may control the data interface to receive multiple data streams simultaneously from one or more transmission sources. For example, data streams may be received through a wired connection or through a wireless connection or through both.

Analysis module 2712 may be configured to analyze the one or more received data streams to determine one or more traits associated with different users wearing wearable apparatuses originating the data streams. Analysis module 2712 may extract information from the data streams to aid in determination of specific traits of the users. For example, analysis module 2712 may extract image-based information, position information, timing information, and/or motion information from the data streams. Analysis module 2712 may use facial detection and recognition to determine traits, such as interaction with other persons. Analysis module 2712 may also use machine vision algorithms to determine traits such as identifying commercial products, landscape, objects, locations, etc. Furthermore, analysis module 2712 may use position information to determine a location of a trait; timing information to determine frequency, scheduling, and/or duration of a trait; information based on audio; and motion information to determine specific interaction states, such as movement towards an object.

Storing module 2713 may be configured to store information relating to a trait, such as a trait that is common to two or more user wearing wearable apparatuses. Storing module 2713 may include instructions to interact with internal or external storage resources, such as memory, solid state hard drives, or removable memory devices. Storing module 2713 may also interact with the data interface to access remote storage resources such as computing device 120 or wearable apparatuses 110. Storing module 2713 may also store information relating to the determined traits in cloud computing storage devices.

FIG. 27B illustrates the contents of a data stream 2720 received by a processing device, such as server 250, computing device 120, or wearable apparatus 110. The data stream 2720 may consist of packet or frames that are transmitted by any suitable transmission means. For example, the data stream 2720 may be transmitted through the Internet using a TCP/IP protocol, over wireless connection using Bluetooth®, or other suitable transmission means. The packets or frames may be divided into segments containing image-based information 2721, position information 2722, timing information 2723, and/or motion information 2724. As shown in FIG. 27B, position information 2722, timing information 2723, and motion information 2724 are optional, as depicted by the dashed line. In some examples, position information 2722, timing information 2723, and/or motion information 2724 may be included in image-based information so that the data stream 2720 would use only one segment. In other examples, position information 2722, timing information 2723, and/or motion information 2724 may be associated with image-based information 2721, such as by reference. The association of position information 2722, timing information 2723, and/or motion information 2724 may be to the image-based information in the same or different packets or streams. In some examples, the data stream may contain a header identifying the wearable apparatus 110 from which the data stream is transmitted. The header may also contain demographic information about the user wearing the wearable apparatus 110.

In some examples, image-based information 2721 may comprise one or more images captured by the camera in wearable apparatus 110. The one or more images may be compressed and may be represented in any suitable format, such as JPEG, TIFF, PDF, GIF, PNG, BMP, SVG, etc. In some examples, image-based information 2721 may comprise video in any suitable format, such as MPEG, AVX, MOV, etc. Image-based information 2721 may also contain meta-data with additional image related information, such as camera settings, location, time, etc. Alternatively, in some embodiments, image-based information 2721 may include information derived from analysis of one or more images (e.g., a description of a context of an image, an identifier of a person, object, or location in an image, etc.). In some examples, image-based information 2721 may comprise information derived from the one or more images captured by the camera by wearable apparatus 110.

Position information 2722 may be included in data stream 2720. Position information 2722 may include GPS location coordinates of the camera in wearable apparatus 110. Position information may also include other triangulated coordinates, such as derived from Wi-Fi, cellular towers, etc. Positional information 2722 may be embedded in image-based information 2721 or be included in a separate segment of data stream 2720.

Timing information 2723 may be included in data stream 2720. Timing information 2723 may include absolute or relative time. For example, Timing information 2723 may include the time of day and/or date that an image was captured. Timing information 2723 may also include the time since a last image was captured, providing relative timing information between images. Timing information 2723 may be embedded in image-based information 2721 or be included in a separate segment of data stream 2720.

Motion information 2724 may be included in data stream 2720. Motion information 2724 may include acceleration information in multiple direction (e.g., 3-axis, 6-axis, 9-axis), speed information, or other data that indicates motion of wearable apparatus 110. Motion information 2724 may be embedded in image-based information 2721 or be included in a separate segment of data stream 2720.

In some examples, other types of information may be included in data stream 2720. For example, data stream 2720 may include audio information 2725. Audio information 2725 may include audio captured by wearable apparatus 110 and/or information based on audio captured by wearable apparatus 110.

Figure 28:
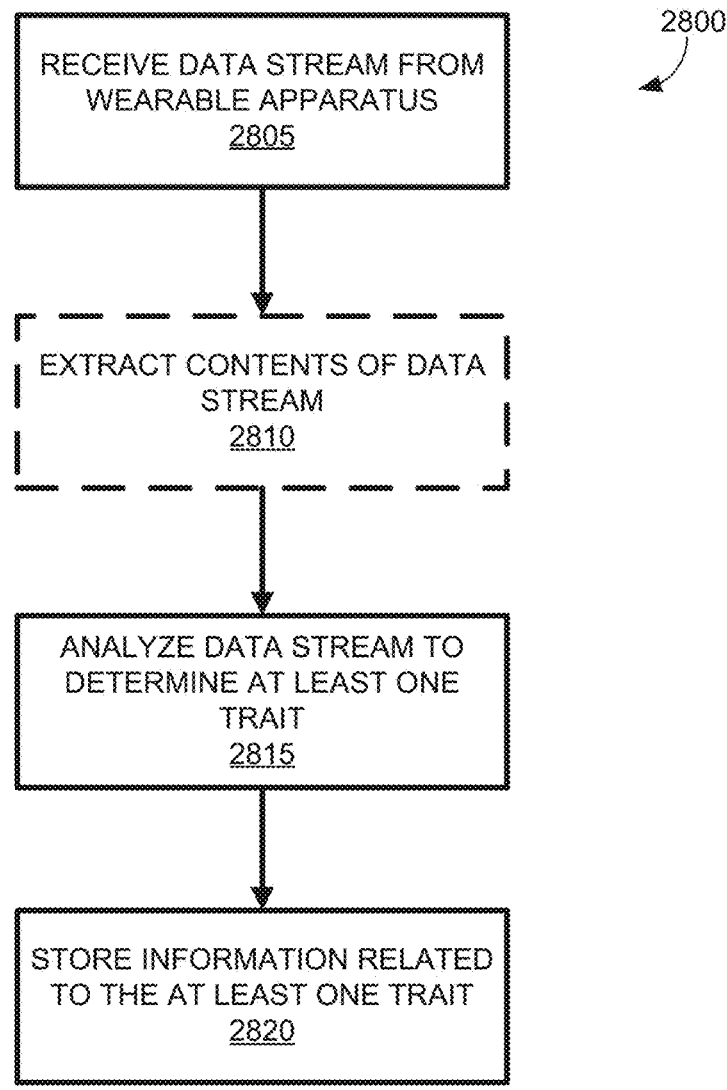
FIG. 28 is a flowchart illustrating an exemplary method of determining a trait consistent with the disclosed embodiments.

FIG. 28 is a flowchart illustrating an exemplary method 2800 of determining and storing a trait of a user or a trait common to two or more users consistent with the disclosed embodiments. The method may be implemented in a system such as shown in FIG. 5 and/or FIG. 26.

At step 2805, one or more data streams are received. In some examples, the data streams may be received from wearable apparatuses 110 and be configured as described above in connection with FIG. 27B. The one or more data streams may be received from one or more wearable apparatuses 110. The one or more data streams may contain image-based information, position information, timing information, motion information, audio information, and so forth. The one or more data streams may be sent in packets, frames, and so forth. The data streams may be continuously received over time, received at predetermined intervals, received at selected times, received in response to a trigger, and so forth.

At optional step 2810, the contents of the one or more data streams may be extracted. For example, the data streams may contain image-based information, position information, timing information, and/or motion information. The data streams may be processed by a processor device to extract the type of information desired for further processing.

At step 2815, the one or more data streams may be analyzed to determine at least one trait. In some examples, the trait is common to two or more users from which the data streams are received. In some embodiments, server 250 may analyze the data streams. In other embodiments, computing device 120 or wearable apparatus 110 may analyze the data streams. For example, the image-based information in the data streams may be analyzed by executing instructions stored in analysis module 2721. In some embodiments, the image-based information may be analyzed to determine whether a trait identified in a data stream received from one user is common with a trait identified in a data stream received from a different user. In some embodiments, position information, timing information, and/or motion information may be analyzed in addition to image-based information in order to determine a trait. For example, image-based information may be analyzed using machine vision or image recognition algorithms to determine that a user's hand is near a commercial product. Timing and motion information may be used to determine that the user's hand is moving towards the commercial product. Thus, a trait of choosing a commercial product may be determined. In some examples, two or more users may be choosing the same or similar product. Therefore, the trait is determined to be common to the two or more different users.

At step 2820, information related to the at least one identified trait may be stored. The at least one identified trait may be common to two or more different users. The at least one identified trait may be stored in a database, such as a relational database or self-referencing database. The database may be stored, for example, in server 250, computing device 120, wearable apparatus 110, among distributed systems, or in a separate storage resource, such as a cloud computing device. In some embodiments, the stored information relating to the at least one trait, or information based on the stored information, may be output to a graphical display. For example, the information may be output to a graphical display of a device (e.g., computing device 120) paired with wearable device 110 and/or to a display associated with server 250 (e.g., monitor 2620).

Context-Based Suggestions Through Image Analysis

In some embodiments, apparatus 110 may cause a paired device, such as computing device 120, to provide one or more alerts to user 100 based on information determined from an identified contextual situation. As mentioned above, contextual situations may refer to a combination of circumstances that may influence the user's action. Examples of factors that may differentiate contextual situations include: the identity of other people in the vicinity of user 100 (e.g., certain individual, family members, coworkers, strangers, and more), the type of activity user 100 is doing (e.g., watching a movie, meeting with an individual, visiting a location, interacting with an object, entering a car, participating in a sport activity, eating a meal, and more), the time in which the situation took place (e.g., the time of the day, the time of the year, and more), the location in which the situation occurs (e.g., home, working place, shopping mall, and more). During a typical day, user 100 may experience dozens, if not hundreds, of contextual situations. Identifying these contextual situations can assist in categorizing and organizing the personal experiences of the user's life. Moreover, consistent with this aspect of the disclosure, apparatus 110 can analyze in real-time the images captured from the environment of user 100 to identify a current contextual situation. By identifying contextual situations substantially in real-time, apparatus 110 can provide added value to user 100. For example, after identifying a contextual situation, apparatus 110 may cause computing device 120 to provide one or more alerts to user 100. In some cases, the task of determining which alerts to provide user 100 may be very complex, because of the huge amount of similar contextual situations that user 100 experiences every day and the desire to provide only relevant alerts. For example, when the contextual situation includes an identification of a worker at a work site, apparatus 110 may provide an alert that indicates that the worker is not using and/or wearing safety equipment. Additional exemplary embodiments of contextual situations and the type of alerts that may be provided to user 100 are discussed in further detail with respect to FIGS. 29A-29D.

Figure 29A:
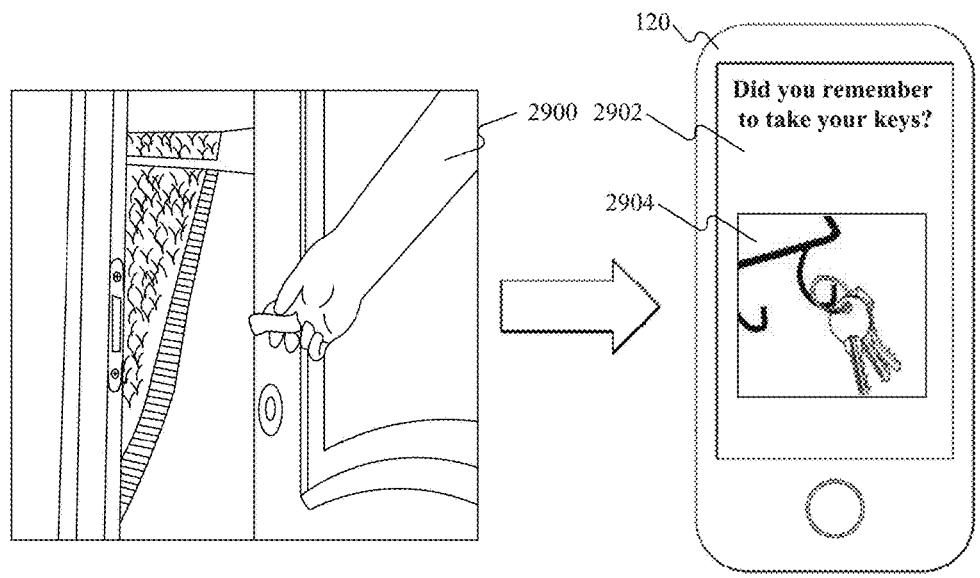
FIG. 29A is a schematic illustration of a first example of a contextual situation that triggers provisioning of an alert according to a disclosed embodiment.

FIG. 29A is a schematic illustration of a contextual situation that may trigger provisioning of an alert consistent with the present disclosure. The contextual situation illustrated in this figure is transitioning from indoors to outdoors. Apparatus 110 may identify this contextual situation by analyzing a plurality of images, such as image 2900. After identifying this contextual situation, apparatus 110 may cause computing device 120 to provide different alerts to user 100.

One type of alert that may be provided to user 100 includes a suggestion 2902 to remember a key. In one example, suggestion 2902 may include the last captured image of the key 2904. Another type of alert provided to user 100 includes a suggestion (not shown) to remember rain gear. In one embodiment, prior to providing this alert, computing device 120 may check the weather forecast online to determine the likelihood that a rain gear will be needed. Another type of alert that may be provided to user 100 includes a suggestion (not shown) to change the heating, ventilation, and air conditioning (HVAC) settings. In one embodiment, prior to providing this suggestion, apparatus 110 may determine that there are no other individuals indoors. Another type of alert that may be provided to user 100 includes a suggestion (not shown) to feed a cat.

User 100 may transition from indoors to outdoors numerous times a day. Not all the alerts may be relevant to all of the users, and not all the alerts will be relevant all the time. In some embodiments, apparatus 110 (or computing device 120) may determine which alerts to provide and when to provide them to user 100. For example, apparatus 110 may cause computing device 120 to provide user 100 with suggestion 2902 to remember his/her key in some cases and avoid providing user 100 with suggestion 2902 in other cases. In order to determine which cases are relevant, apparatus 110 (or computing device 120) may use predefined context rules. The context rules may be determined over time using machine learning, be selected by user 100, or may be the result of default settings. Examples of context rules may include providing user 100 with suggestion 2902 only when user 100 leaves his/her own house, or only when the transitioning from indoors to outdoors occurs between 6 a.m. and 9 a.m., or only if apparatus 110 determined that user 100 didn't hold his/her keys in the last 30 minutes. Apparatus 110 (or computing device 120) may apply different combinations of these context rules using logical operators (e.g., AND, OR, NOT, etc.) to determine when to provide user 100 the alert. For example, suggestion 2902 may be provided only when user 100 leaves his/her own house AND the time is between 6 AM and 9 AM.

Figure 29B:
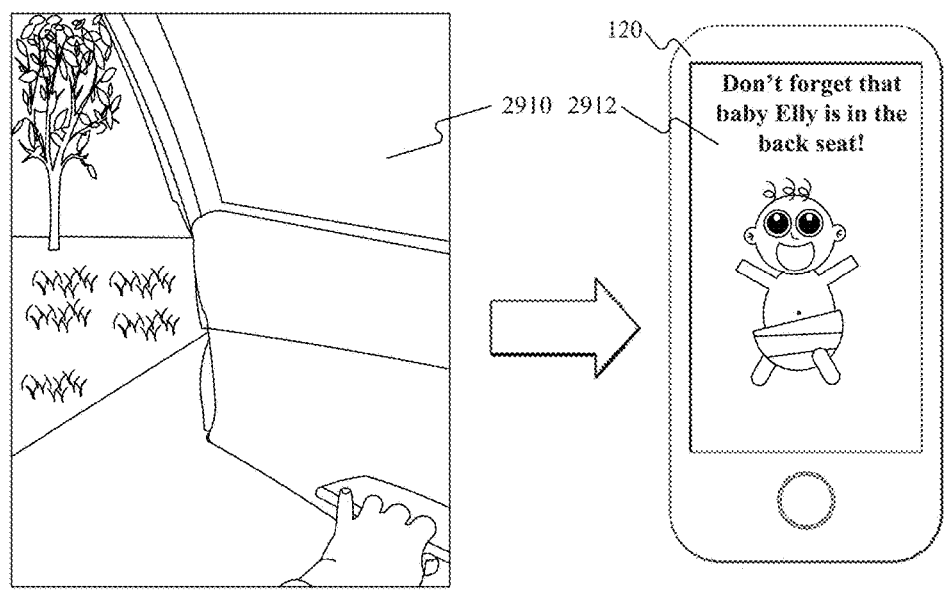
FIG. 29B is a schematic illustration of a second example of a contextual situation that triggers provisioning of an alert according to a disclosed embodiment.

FIG. 29B is a schematic illustration of another contextual situation that may trigger provisioning of an alert consistent with some embodiments of the present disclosure. The contextual situation illustrated in this figure is exiting a vehicle. Apparatus 110 may identify this contextual situation by analyzing a plurality of images, such as image 2910. After identifying this contextual situation, apparatus 110 may cause computing device 120 to provide different alerts to user 100.

One type of alert that may be provided to user 100 may include a reminder 2922, indicating that a child is present in the vehicle. In some embodiments, apparatus 110 may cause computing device 120 to provide reminder 2922 after a determination was made that the child is indeed present in the vehicle. For example, apparatus 110 may have previously captured images of the child in the vehicle after user 100 entered the vehicle. Another type of alert provided to user 100 may include a suggestion (not shown) to pay for parking using a parking application. In some embodiments, apparatus 110 may cause computing device 120 to provide this suggestion after a determination was made that the vehicle is parked in area where payment is required. Additional details regarding the determination process is provided below with reference to FIG. 30.

Figure 29C:
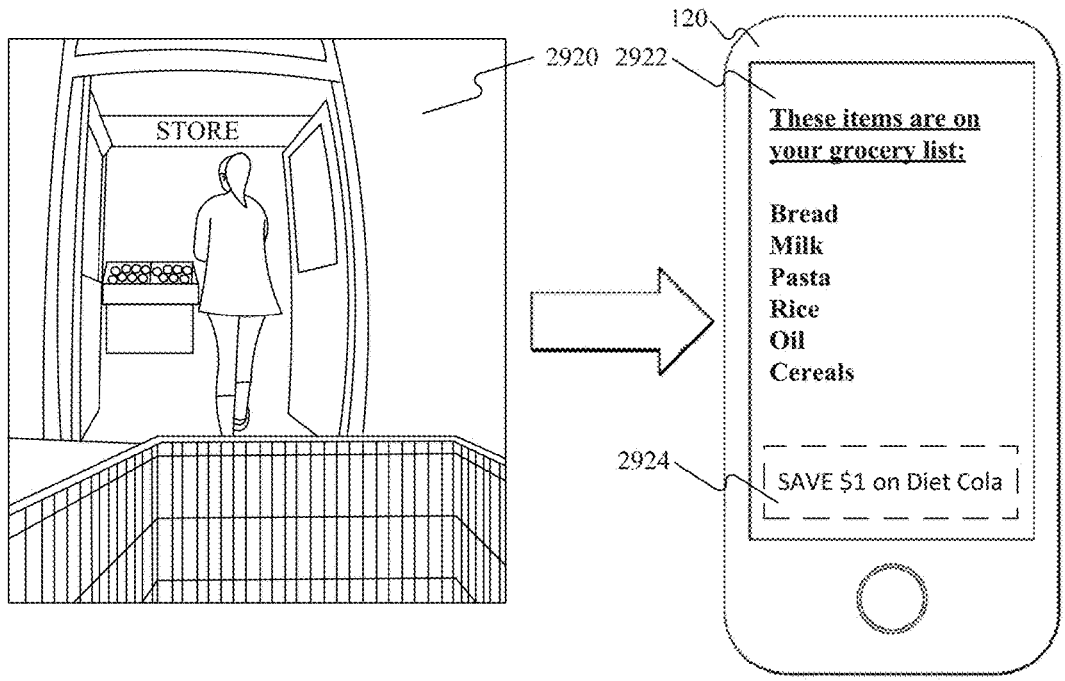
FIG. 29C is a schematic illustration of a third example of a contextual situation that triggers provisioning of an alert according to a disclosed embodiment.

FIG. 29C is a schematic illustration of yet another contextual situation that may trigger provisioning of an alert consistent with some embodiments of the present disclosure. The contextual situation illustrated in this figure is entering a grocery store. Apparatus 110 may identify this contextual situation by analyzing a plurality of images, such as image 2920. After identifying this contextual situation, apparatus 110 may cause computing device 120 to provide different alerts to user 100.

One type of alert that may be provided to user 100 may include a suggestion 2922 to purchase one or more items. The one or more items may be previously identified by apparatus 110 as products that user 100 needs or wishes to buy. Specifically, suggestion 2922 may be provided based on a determination using prior captured images, that a container associated with the item was discarded by user 100. For example, apparatus 110 may have previously identified that user 100 threw an empty container of milk into a waste receptacle, which will automatically cause the milk product to be included in the grocery list. Alternatively, the one or more items may have been previously identified by user 100 as products that he/she wants to buy. For example, user 100 may see an interesting recipe in a book and use a predefined hand movement or voice command to indicate a selection of this recipe. Another type of alert provided to user 100 may include a coupon 2924 for a specific product. Apparatus 110 may use computing device 120 to search for coupons available in the specific grocery store that user 100 entered to and which may have value to user 100.

Figure 29D:
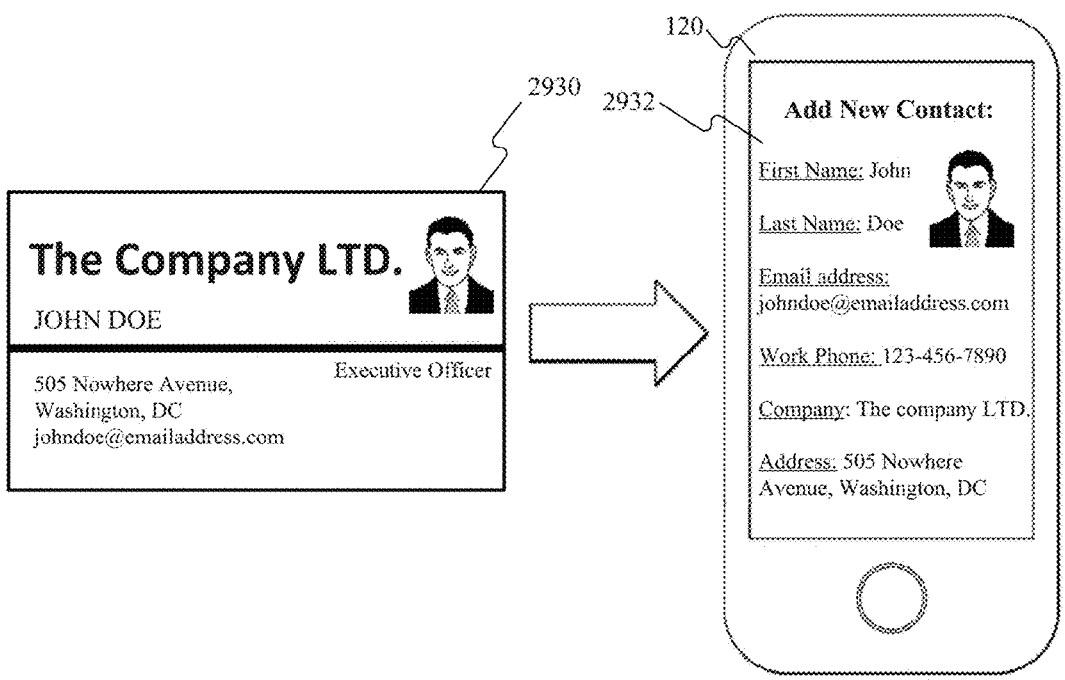
FIG. 29D is a schematic illustration of a fourth example of a contextual situation that triggers provisioning of an alert according to a disclosed embodiment.

FIG. 29D is a schematic illustration of still another contextual situation that may trigger provisioning of an alert consistent with some embodiments of the present disclosure. The contextual situation illustrated in this figure is a document present in an area in front of user 100. The document in front of user 100 may be printed on paper or digitally displayed on a screen. Apparatus 110 may identify this contextual situation by analyzing a plurality of images, such as image 2930. After identifying this contextual situation, apparatus 110 may cause computing device 120 to provide different alerts to user 100.

In the embodiment illustrated in FIG. 29D the document in front of user 100 is a business card. In this embodiment, apparatus 110 may transmit details (e.g., text and/or image) from the business card as the determined information associated with the contextual situation. In some embodiments, text may be determined using optical character recognition (OCR). Transmitting the details to computing device 120 may cause the computing device 120 to add a new contact based on the received details. In addition, apparatus 110 may be configured to transmit the details to computing device 120 in response to a visual trigger or a voice command from user 100. For example, the visual trigger may include placing the business card opposite to apparatus 110 for a predefined period of time, such as three seconds. In another embodiment, the document may include an address and apparatus 110 may transmit the address appearing on the document as the determined information associated with the contextual situation. Transmitting the address to computing device 120 may cause the computing device 120 to add the address to a user interface associated with a navigation assistance application. For example, the document may be an invitation to an event and after apparatus 110 recognized the invitation in front of user 100, apparatus 110 may cause the user's smartphone to start navigating to the location of the event. In another embodiment, the document in front of user 100 is a financial document. In this embodiment, apparatus 110 may transmit details (e.g., text, numbers, figures) from a financial document as the determined information associated with the contextual situation. Transmitting the details from the financial document to computing device 120 may cause at least some of the details from the financial document to appear in a user interface associated with a financial-related application on computing device 120. For example, the financial document may be a bank account check, and once apparatus 110 recognizes the check in front of user 100, it may causes the user's smartphone to open his/her online banking application and starts the process of depositing the check.

A person skilled in the art can appreciate that many more types of contextual situations (not shown in the figures) may trigger event more types of alerts consistent with the present disclosure. For example, as discussed above, the contextual situation may include an identification of at least one worker at a work site and the alert indicates that the worker is not using and/or wearing safety equipment. The present disclosure is not limited to the disclosed exemplary contextual situations and exemplary alerts. In addition, the different types of alerts discussed above with respect to FIGS. 29A-29D may be part of predefined functions that were triggered by the transmission of image-related information. The image-related information may be determined based on a request associated with a category tag from the paired device, as discussed above with respect to FIG. 19.

As discussed above, apparatus 110 may analyze the plurality of images to identify a contextual situation related to user 100. Consistent with present disclosure, analyzing the plurality of images to identify the contextual situation may include executing a region-of-interest (ROI) analysis to detect at least one object in an image. The at least one object in the image may be represented by one or more ROI that can be varied in types and formats. Examples of region of interest descriptions include, but are not limited to bounding boxes, masks, areas, and polygons. Apparatus 110 may detect the at least one object using a ROI database that contains searchable fields and vectors representing the image characteristics of objects. In some embodiment, each entry in the ROI database may have a data structure that includes one or more of the following components: an ROI type field that contains the type of the region of interest, an ROI descriptor field that contains the description of the region of interest, a color vector, a shape vector, a texture vector, a size vector, a location vector, and a content vector. Apparatus 110 may detect the at least one object in the image by comparing the one or more ROI that are found in the image with the ROI found in the ROI database. After detecting the at least one object in the image, apparatus 110 may start the process of identifying the contextual situation. In one embodiment, each contextual situation may include data identifying one or more objects that a particular type of contextual situation has to include, data identifying one or more objects that the particular type of contextual situation may include, and data identifying one or more objects that the particular type of contextual situation could not include. By considering the detected objects in the image, apparatus 110 may select a plurality of candidate contextual situations that may be appropriate for the image being analyzed. To improve the certainty level, apparatus 110 may use image-information from previously obtained images, and additional information that does not originate from image data, such as, information from a Global Positioning System (GPS). In one embodiment, apparatus 110 may rank the plurality of candidate contextual situations. Accordingly, in one embodiment, the identified contextual situation may be the highest ranking contextual situation from the plurality of candidate contextual situations.

Furthermore, in some embodiments, for example, analyzing the plurality of images may involve edge identification, in which an image is analyzed to detect pixels at which discontinuities (e.g., sudden changes in image brightness) occur and edges (e.g., edges of the external object) are identified to coincide with the detected pixels. Alternatively or additionally, in some embodiments analyzing the plurality of images may involve identifying in and/or extracting from an image pixels representative of objects in the environment, such as the external object. Pixels may be determined to be representative of an external object based on, for example, other images of the external device or similar external devices maintained, e.g., in a database and/or predetermined data describing the external object maintained, e.g., in a database. Alternatively or additionally, pixels may be determined to be representative of an external object based on, for example, a trained neural network configured to detect predetermined external objects. Other types of analysis are possible as well, including, but not limited to, gradient matching, greyscale matching, scale-invariant feature transform (SIFT) matching, and/or interpretation trees.

Figure 30:
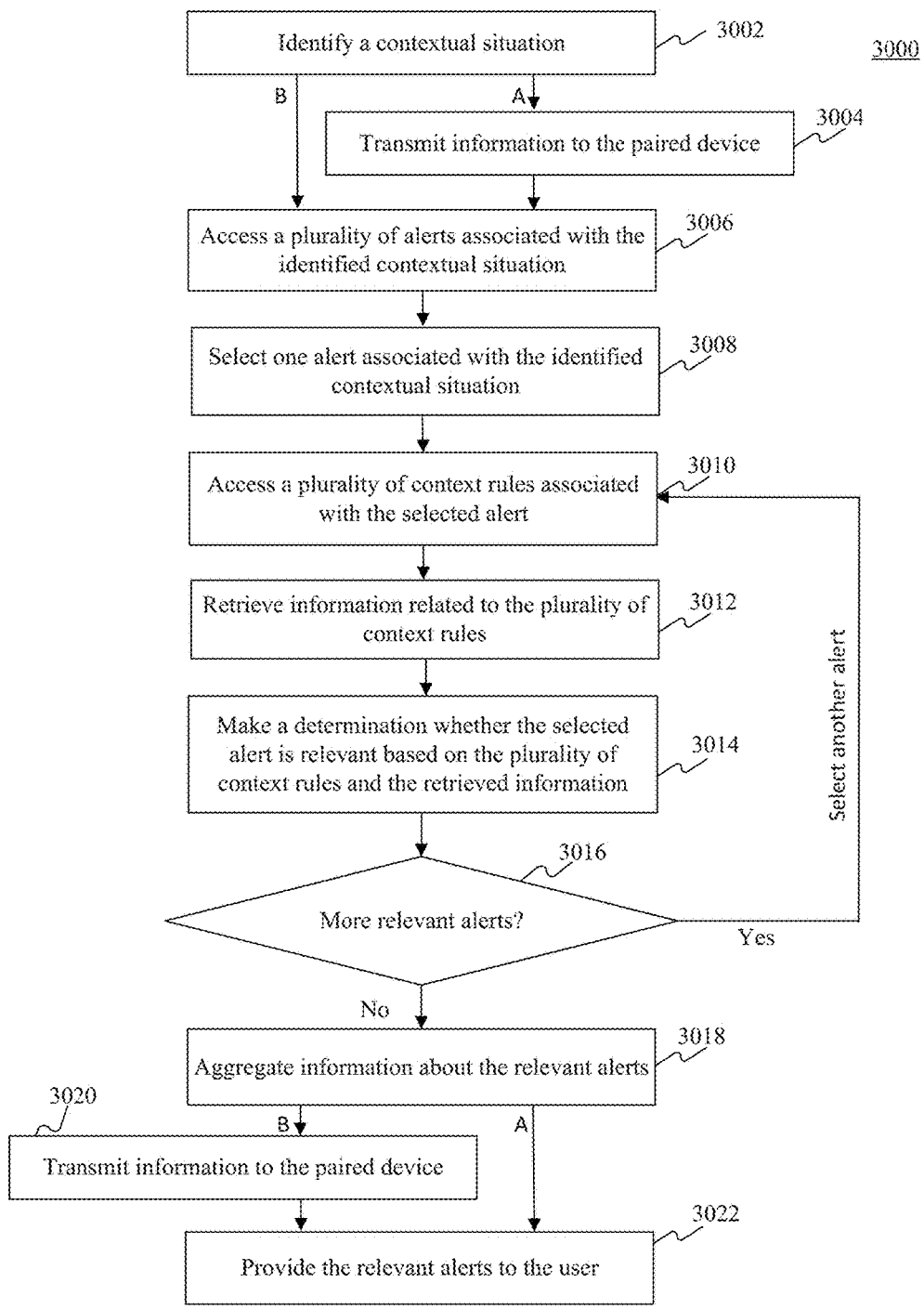
FIG. 30 is a flow diagram showing an exemplary process for providing alerts to a user consistent with disclosed embodiments.

FIG. 30 is a flowchart of an example process 3000 for providing one or more alerts to user 100. The process starts when apparatus 110 identifies a contextual situation (block 3002) and ends when computing device 120 provides one or more relevant alerts to user 100 (block 3022). In one example, the one or more relevant alerts may include all the alerts determined to be relevant to user 100. The identification of the contextual situation may be done by apparatus 110 when apparatus 110 analyzes the plurality of images captured from an environment user 100. Relevant alerts may be provided by computing device 120 as a visual output or as an audible output.

FIG. 30 depicts two ways to complete process 3000. The first way, marked as path "A," is to transmit information about the identified contextual situation to computing device 120 (block 3004) and thereafter continuing the process (blocks 3006-3022) at computing device 120. The second way, marked as path "B," is to continue the process (blocks 3006-3018) at apparatus 110 and afterwards transmit information related to the one or more relevant alerts to computing device 120 (block 3020).

A processing device, either processor 210 or processor 540, may access a plurality of alerts associated with the identified contextual situation (block 3006). The alerts may be stored in an associated memory device, for example, memory 550 or memory 550*b*. For example, in case the identified contextual situation is transitioning from indoors to outdoors, the potential alerts may include: a suggestion to remember a key, a suggestion to remember rain gear, a suggestion to change an HVAC setting, a suggestion to feed a pet, and more. The processing device may select one alert associated with the identified contextual situation (block 3008), for example, the suggestion to change an HVAC setting.

Next, the processing device may access a plurality of context rules associated with the selected alert (block 3010). The plurality of context rules may be also stored in the associated memory device. For the selected alert "suggestion to change an HVAC setting," the plurality of context rules may include: provide the suggestion when the identified contextual situation occurs took place at a predefined location (e.g., home, work), provide the suggestion when the identified contextual situation occurs at a predefined period of time (e.g., between 6 a.m. and 9 a.m., or after 7 p.m.), provide the suggestion when there are no other individuals indoors, provide the suggestion when there is an indication that HVAC is working, and more. In other words, the context rules may be used to define the combination of conditions in which it would be appropriate to provide a certain alert for the identified contextual situation.

Thereafter, the processing device may retrieve information related to the plurality of context rules (block 3012). In one embodiment, the retrieval of information related to the plurality of context rules may be based on prior captured images. For example, to determine that there are no other individuals indoors, the processing device may review captured images from the last 15 minutes. In another embodiment, the retrieval of information related to the plurality of context rules may be based on additional sensors and/or publicly available data sources. For example, to determine that the HVAC is working, processing device may determine the indoors temperature using a sensor in the paired device, and the outdoors temperature using an online database. Then, the processing device may make a determination whether the selected alert is relevant based on the plurality of context rules and the retrieved information (block 3014). In some embodiments, the processing device may facilitate machine learning algorithms to determine the likelihood that providing the alert will caused user 100 to perform an action. Alerts that are determined to have a likelihood of relevant exceeding, for example, a threshold may be classified as relevant alerts to a particular user. For example, when user 100 leaves a work location at 7 PM, a relevant alert might be to turn off the HVAC, while a non-relevant alert might be to feed the user's pet.

If the relevant alerts have been identified (decision block 3016), the processing device may aggregate information about one or more alerts determined to be relevant (block 3018) and transmit the one or more relevant alerts to a paired device (e.g., computing device 120) (block 3018). If all of the relevant alerts have not been identified, the processing device may select another alert from the list of alerts and repeat blocks 3010 to 3014. In embodiments proceeding according to path "B," following block 3020, the process may proceed to block 120, and the paired device (e.g., computing device 120) may provide the one or more relevant alerts to the user (e.g., by displaying the alert on a display of computing device 120). In embodiments proceeding according to path "A", following block 3018, the process may proceed to block 3022, the one or more relevant alerts may be provided to the user via computing device 120.

Figure 31:
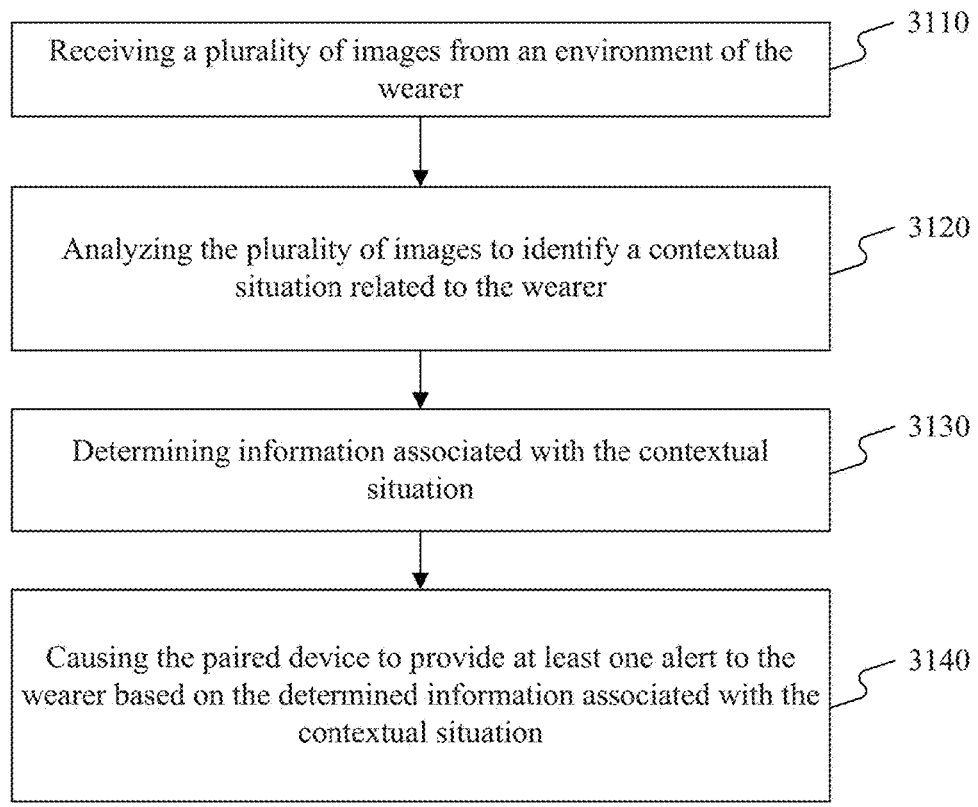
FIG. 31 is a flowchart showing an exemplary process for providing alerts to a user consistent with disclosed embodiments.

FIG. 31 is a flowchart showing an exemplary process 3100 for identifying a contextual situation related to user 100, consistent with disclosed embodiments. Apparatus 110 or computing device 120 may implement one or more steps of process 3100 to identify contextual situations illustrated in, for example, FIGS. 29A-29D.

As illustrated in FIG. 31, at step 3110, a processing device (e.g., processor 210, processor 540) may receive a plurality of images from an environment of user 100. At step 3120, the processing device may analyze the plurality of images to identify a contextual situation related to user 100. At step 3130, the processing device may determine information associated with the contextual situation. After determining the information associated with the contextual situation, at step 3140, the processing device may cause a paired device (e.g., computing device 120) to provide at least one alert to user based on the determined information associated with the contextual situation. These steps of process 3100 are discussed in further detail below.

Specifically, at step 3110, the processing device may receive a plurality of images from an environment of user 100. In some embodiments the plurality of images are captured by image sensor 220. The field of view of image sensor 220 may include an area in front of user 100. For example an optical axis of image sensor 220 may extend generally in a walking direction of user 100. The field of view of image sensor 220 may be more than 100°, for example, more than 120°, or more than 150°. The image sensor may be included in a capturing unit (such as capturing unit 710). In addition, apparatus 110 may include a directional microphone configured to detect or receive a sound or sound wave. Accordingly, the processing device may receive a plurality of images from an environment of user 100 associated with an audio data stream.

A step 3120, the processing device may analyze the plurality of images to identify a contextual situation related to user 100 (e.g., transitioning from indoors to outdoors, transitioning from outdoors to indoors, entering a grocery store, exiting a grocery store, entering a vehicle, exiting a vehicle, detection of one or more persons, identification of one or more persons, a document present in an area in front of user 100, etc.). In some embodiments, analyzing the plurality of images may include determining an existence of elements in the plurality of images that may be indicative of a contextual situation (e.g., existence of a door), and comparing the determined elements with the sample elements in the database (e.g., an image sample of the door in the user's home). After determining the existence of elements, the processing device may be programmed to retrieve additional information from one or more sources that may assist in identifying or improving the certainty level in the identification of the contextual situation. For example, the processing device may access location information from a Global Positioning System (GPS) to confirm that user 100 is currently exiting his/her own home. In another example, the processing device may be programmed to analyze the audio data stream to assist in identifying or improving the certainty level in the identification of the contextual situation. Consistent with the present disclosure, analyzing part of the pictures captured by image sensor 220, may help reduce the time needed to identify the contextual situation. For example, repetitive images of the environment of user 100 may not all be necessary for identifying a contextual situation related to user 100. Two images may be considered repetitive when the images show the same, similar, or overlapping image content. Therefore, when analyzing the plurality of images, the processing device may perform methods to discard and/or ignore at least some of the repetitive images.

At step 3130, the processing device may determine information associated with the contextual situation. The determined information may be specific to the identified contextual situation. In addition, the determined information may be associated with the types of alerts and/or the list of context rules associated with each contextual situation. For example, when the contextual situation is "transitioning from indoors to outdoors," the determined information may be: "where and when was the last appearance of the user's keys in the captured images." In another example, when the contextual situation is "a document present in an area in front of the user," the determined information may be: "an address appearing on the document." In some embodiments, the determined information may be determined using information derived from previously captured images. In other embodiments, the determined information may be determined using information from multiple independent sources, such as additional sensors in apparatus 110, additional sensors in computing device 120, and/or information stored in a remote database.

At step 3140, the processing device may cause a paired device to provide at least one alert to a user based on the determined information associated with the contextual situation. The paired device (e.g., computing device 120) may be at least one of: a smartphone, a tablet, a smarthome controller, or a smart watch. When the processing device is part of apparatus 110 (e.g., processor 210), step 3140 may include causing a transmitter (e.g., wireless transceiver 530) to transmit the determined information to the paired device to cause the paired device to provide the at least one alert. In one embodiment, apparatus 110 is configured to select which paired device should provide the at least one alert. To do so, apparatus 110 may determine the distance of each paired device from apparatus 110 and transmit the determined information to the selected paired device. For example, when user 110 is at his/her home and not in proximity to his/her smartphone, apparatus 110 may select to transmit the determined information to a smarthome controller that will provide a voice alert using associated speakers.

When the processing device is part of computing device 120 (e.g., processor 540), step 3140 may include using feedback outputting unit 545 or display 260 to provide the at least one alert to user 100. In some embodiments, the at least one alert may be associated with at least one of a determined reading speed of user 100, a last page read of a book, or progress toward a predetermined reading goal. In addition, the processing device may record one or more reactions of user 100 to the at least one alert, and to take into consideration past reactions to a certain type of alert, when determining if and how to provide future alerts to user 100. For example, the processing device may determine that user 100 ignores visual alerts presented on display 260 in some cases (e.g., while user 100 is in movement). Accordingly, the processing device may determine to use feedback outputting unit 545 when identifying contextual situations in these cases.

In another embodiment, after transmission of the determined information in step 3140, apparatus 110 may continue to capture at least one image using image sensor 220. The processing device may analyze the at least one image to identify a second contextual situation related to user 100. The second contextual situation may be related to the first identified contextual situation (e.g., a repetitive of the same contextual situation, a contextual situation that involves the same individuals, or a contextual situation that involves associated objects), or not related at all. The processing device may then determine a time difference between the first contextual situation and the second contextual situation. Using the identified first contextual situation, the identified second contextual situation, and the determined time difference, the processing device may withhold transmission associated with the second contextual situation to computing device 120. The processing device may withhold the transmission for an unlimited period of time, a predetermined period of time, or until the next time the apparatus 110 is being charged. In one of the examples mentioned above, the first contextual situation may include an identification of a worker at a work site not wearing safety equipment. In this example, the second contextual situation may include another identification of the same worker at the same work site still not wearing safety equipment. The processing device, may determine to withhold the transmission of information associated with the second contextual situation to computing device 120 if the determined time difference between the two times that apparatus 110 identified that the worker is not wearing safety equipment is under or above a predefined threshold. For example, the predefined threshold may be twelve hours, six hours, two hours, thirty minutes, five minutes, one minute, thirty seconds, etc.

Collaboration Facilitator for Wearable Devices

In some embodiments, a wearable apparatus 110 may capture image data (e.g., one or more images) of an environment of the wearer of the wearable apparatus 110. The image data may be analyzed to detect a visual trigger in the environment. The visual trigger may indicate that a collaborative action is to be taken. An indication based on the visual trigger may then be transmitted to other wearable apparatuses 110, computing devices 120 that are paired with wearable apparatuses 110, and/or to server 250. Receipt of the indication of the visual trigger may cause an action by the receiving device, such as distributing information to other devices.

FIG. 32A illustrates an example environment 3200 including a user 3205 wearing a wearable apparatus 110, computing devices 3210 and 3220, and meeting attendees 3230. Environment 3200 may depict a meeting in which user 3205 is standing at a blackboard, video screen, or other presentation device 3207, and giving a presentation to a group of meeting attendees 3230. User 3205 may be wearing wearable apparatus 110, which may have a field of view (FOV) such that the wearable apparatus 110 may capture images of at least part of presentation device 3207. Wearable apparatus 110 may also be used in environment 3200 to detect a visual trigger in the environment. In some examples, a system independent of wearable apparatus 110 may be used to capture images and detect the visual trigger, or to detect the visual trigger in images captured by wearable apparatus 110. For example, a smart phone, computer with an attached camera, a digital camera, or other image capturing device may be used. By way of example, the following embodiments will describe the system with respect to wearable apparatus 110.

In some embodiments, wearable apparatus 110 (or other system) may include a transceiver and at least one processing device, as described above for FIG. 5. The processing device may be coupled to memory storing instructions, which when executed may cause the device to perform operations. In some embodiments the processing device may be programmed to cause the wearable apparatus 110 to capture images of the environment of user 3205. The wearable apparatus 110 may include an image sensor, as described above, to capture images. The processor may obtain the captured images from the image sensor. In some examples, the captured images may be of the presentation device 3207. For example, the FOV of wearable apparatus 110 may be such that wearable apparatus 110 generally "sees" what user 3207 sees. In other examples, the captured images may be of a wide angle view capturing an image with an FOV of, for example, 270 degrees. The wide angle FOV may allow an image to be captured that includes meeting attendees or other persons or objects that may or may not be visible to user 3205.

In some embodiments, environment 3200 may include instances where a collaborative action may be taken. For example, a collaborative action may be an action common to or shared amongst the wearer of wearable apparatus 110 and at least one other individual. In some examples, the collaborative action may be a group work project, updating a project status, treating a patient, updating a patient record, updating a task list, and/or assembling an item. For example, environment 3200 may include a meeting with attendees involved in a group work project, such as designing an automobile. Meeting attendees may work together on specific facets of the project and share information with one another based on visual triggers detected by wearable apparatus 110 when analyzing captured images of the environment. In other examples, the collaborative action may be commercial in nature, such as selling a product, marketing a product, or advertising a product. The collaborative action may also be recreational, such as playing a game or driving a car. In some instances, the collaborative action may be preparing a meal, cleaning a residence, buying groceries, or assembling furniture.

As described above, wearable apparatus 110 may capture images in environment 3200. The processing device may analyze the images to detect a visual trigger in the images. As discussed, the visual trigger may be associated with a collaborative action to be taken. Wearable apparatus 110 may transmit an indicator of the detected visual trigger using the transceiver to other devices. For example, the indicator may be transmitted to paired device 3210, which may be paired to wearable apparatus 110. In some examples, paired device 3210 may be any device capable of receiving information through a paired connection to wearable apparatus 110, such as a smartphone, a tablet, and/or a smart watch. Paired device 3210 may be worn by user 3205, such as on a belt, or integrated into a belt. Alternatively, paired device 3210 may be held by user 3205 or be located in the vicinity of user 3205 (e.g., be located in the same room). In other examples, paired device 3210 may be located in a remote location (e.g., in another room, building, city, etc.).

In some embodiments, the paired device 3210 may process the received indicator of the visual trigger and determine an action to be taken. In some examples, the indicator and/or visual trigger may be a command to perform a part of the collaborative action. The action may be a function associated with the collaborative action. The function may include actions that the device normally performs, such as display of data on the device, or the function may include distributing information to other devices, such as remote devices 3220. Remote devices 3220 may also be a smartphone, a tablet, a smart watch, and/or a server. For example, paired device 3210 may receive an indicator that a visual trigger has occurred in environment 3200. Receipt of the indicator may cause paired device 3210 to distribute information to remote devices 3220. The information may be related to the visual trigger and/or the collaborative action (e.g., an image of the presentation device, an update to a task list, an indication that the meeting has finished, etc.). The information may include images, documents, spreadsheets, or other information useful in the collaborative action.

In some examples, the information may be distributed to multiple devices, as depicted in FIG. 32A. Remote devices 3220 may be used by attendees 3230. For example, each attendee 3230 may hold a remote device 3220 and view the information on the device. The information received by remote devices may supplement and/or augment the presentation by user 3205.

In some embodiments, the information may identify a step in a task and/or the amount of time spent on a step of a task. For example, paired device 3210 may receive the indicator of the visual trigger, which may include a swiping hand gesture indicating to display the next picture or page of information regarding the task. Paired device 3210 may then distribute information to the remote devices 3220 identifying the current step, such as designing the interior of a car, and the next task, such as determining the color of the interior. The information may also include how long the group spent on the current task or step. In some examples, the amount of time may be factored into a budget. For example, the budget may indicate how long certain tasks require and may be used to properly budget future tasks. In some examples, the result of the current task may be distributed before progressing to the indicated next task. In this case, attendees may be able to view a task list on remote devices 3220. The task list may show the current task, with amount of time spent on the task, and the next task to be completed. The task list may also display all tasks in the collaborative action, whether or not completed.

FIG. 32B illustrates an exemplary hand gesture 3208 as a visual trigger associated with a collaborative action. For example, user 3205 may be wearing wearable apparatus 110 and presenting a design of a new car to an audience. At some point during the presentation, user 3205 may swipe his arm upward, for example, as in the gesture 3208 to indicate an action. The action may indicate an end to a task, such as moving to the next slide, signaling that a consensus has been reached, a decision has been made, a task has been completed, an item has been bought, or the like. In other examples, the gesture 3208 may indicate movement of the image, such as moving it from one side of the presentation to the other. In still another example, the gesture 3208 may indicate that the displayed image be transmitted to attendees and/or information in a document or spreadsheet (e.g., describing the image) be transmitted to attendees.

Figure 32C:
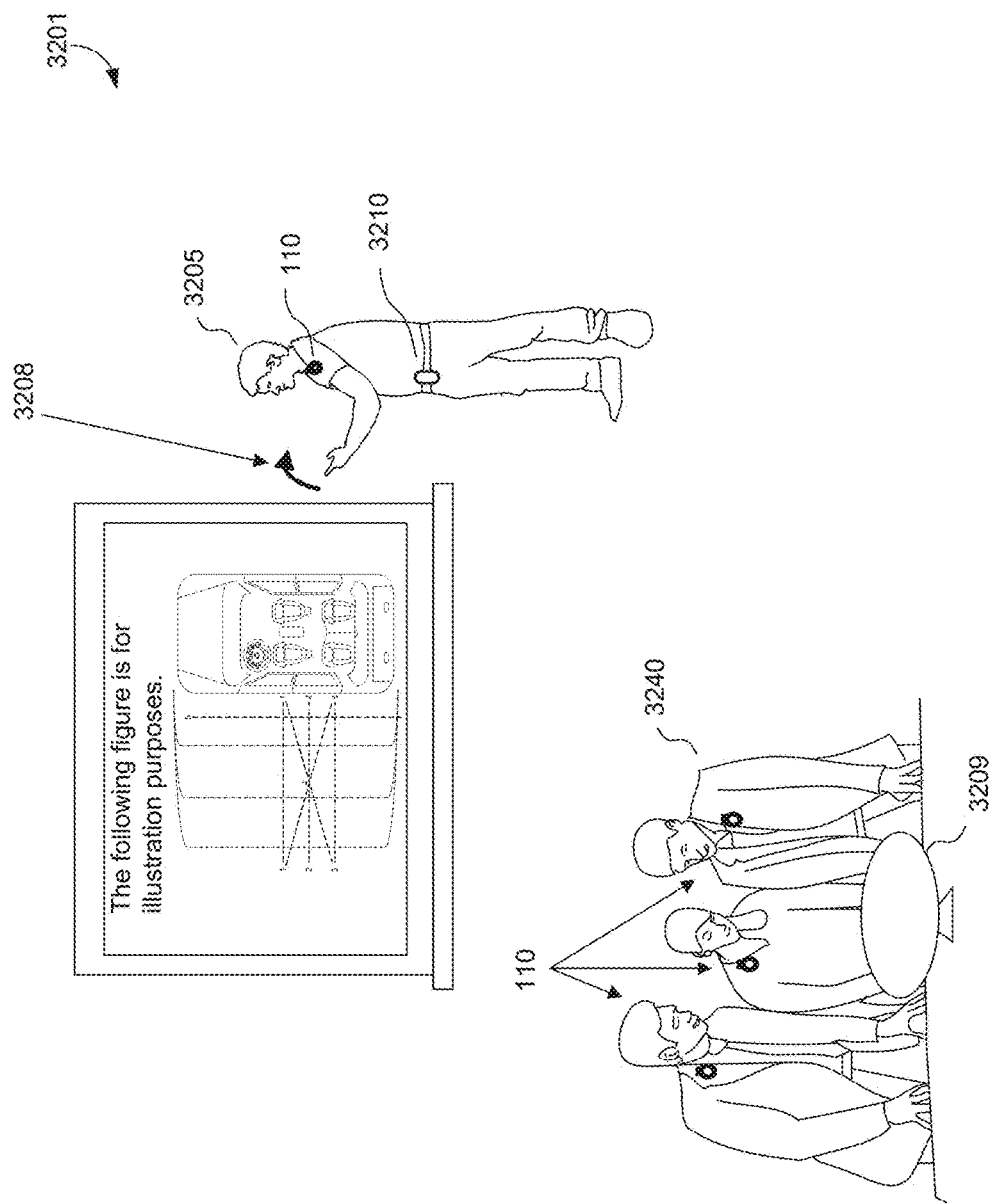
FIG. 32C illustrates an example collaborative environment consistent with the disclosed embodiments.

FIG. 32C illustrates and example environment 3201 in which information is distributed to other wearable apparatuses 110 in response to a hand gesture 3208. In the example, a user 3205 may be presenting to local meeting participants (not shown), while also presenting to remote individuals 3240, who may be at a remote location. Additionally or alternatively, a user 3205 may be presenting to local meeting participants, and remote individuals 3240 may be involve in a different task associated with a collaborative action common to user 3205 and remote individuals 3240. Additionally or alternatively, a user 3205 may be presenting to local meeting participants, where the meeting and/or the presentation may be associated with a collaborative action common to user 3205 and individuals 3240, while remote individuals 3240 may be involved in a task that is unrelated to the collaborative action. For example, paired device 3210 may distribute (e.g., transmit) the information to other wearable apparatuses 110, which are worn by attendees (or other persons not in the environment). In some examples, the other wearable apparatuses 110 may be paired with other devices and transmit information based on the received information to those paired devices. By way of example, environment 3201 depicts a user 3205 presenting a car design to meeting attendees (as shown in FIG. 32A). User 3205 may be wearing a wearable apparatus 110, which is paired to another device 3210, such a smartphone. User 3205 may point to the presentation and make a gesture 3208, which may cause the displayed image to move. Wearable apparatus 110 may capture an image of the presentation and the gesture, analyze the captured image, and determine that a visual trigger has occurred (e.g., the gesture 3208). Wearable apparatus 110 may transmit an indicator of the visual trigger to the paired device 3210. Wearable apparatus 110 may also transmit the image or other information to the paired device 3210. The paired device 3210 may receive the indicator and/or other information, which may cause the paired device 3210 to distribute information (e.g., a received image, an indicator of the slide in a presentation, steps in a task, etc.) to other wearable apparatuses 110. The other wearable apparatuses may be worn by attendees 3230 (not shown) or by remote individuals 3240. The other wearable apparatuses 110 may also be paired to devices, such as display device 3209. In some examples, one or more of the other wearable apparatuses 110 may transmit the received information to the display device 3209 for display to the remote individuals 3240. In some embodiments, other wearable apparatuses 110 worn by remote individuals 3240 may also capture images and detect visual triggers at the remote location. For example, one of the remote individuals 3240 may gesture to the display device 3209, which gesture may be detected as a visual trigger by one of the other wearable apparatuses 110. In response to detecting the visual trigger, feedback may be sent to either paired device 3210 or wearable device 110 being worn by user 3205.

FIG. 33A illustrates an exemplary visual trigger associated with an environment 3300. In the embodiment, a physician 3320 may enter an examination room where a patient 3315 is waiting. Physician 3320 may be wearing wearable apparatus 110. In some examples, wearable apparatus 110 may capture images depicting a transition of the physician 3320 from the lobby to the examination room (e.g., changing the environment of the physician 3320). In some examples, wearable apparatus 110 may capture images depicting a meeting with patient 3315. The transition and/or meeting may be detected as a visual trigger. An indicator of the visual trigger may, for example, be transmitted to a paired device, a remote device, a server, and/or other devices, to indicate, for example, that the physician 3320 is meeting with the patient 3315. The transmitted indicator may cause the paired device, for example, to update a task list associated with the patient 3315. In another example, the wearable apparatus 110 may capture an image of the patient 3315 as the physician 3320 enters the room. Wearable apparatus 110 may analyze the captured image and determine that the patient 3315 is present. The presence of the patient 3315 may cause wearable apparatus 110 to detect a visual trigger that the physician 3320 will examine and/or speak with the patient 3315. In some examples, an indication of the visual trigger may be transmitted to another device, where it may cause the device to perform a function related to the collaboration (e.g., update a task list, provide treatment options for the patient, update a patient record, etc.). For example, the indication of the visual trigger may be transmitted to a server 250, which includes a database of records for patient 3315. Receipt of the indication may cause the server 250 to update the records to indicate that the patient 3315 has arrived for her appointment. In another example, receipt of the indication may cause server 250 (or other device) to distribute to a paired device used by physician 3320 information related to patient 3315, such as a list of ailments that patient 3315 experiences, a treatment plan for patient 3315, test results for patient 3315, and so forth.

Figure 33B:
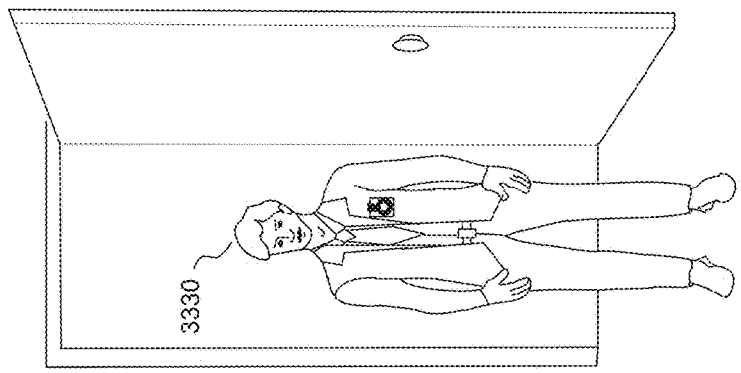
FIG. 33B illustrates an exemplary visual trigger associated with a collaborative action consistent with the disclosed embodiments.

FIG. 33B illustrates another exemplary visual trigger associated with an environment 3301. In the environment, user 3205 may be presenting at a meeting with remote individuals 3240 at a remote location and a new meeting participant, person 3330, may join the meeting. Alternatively, person 3330 may leave the meeting. In response to joining the meeting, person 3330 may receive information about the presentation, such as tasks associated with the meeting, the duration of the meeting, instructions pertaining to participation in the meeting, etc. In some embodiments, user 3205 may be wearing wearable apparatus 110, which may include an image sensor with a field of view that includes a door to the room. In some embodiments, wearable apparatus 110 may capture an image of a person 3330 entering (or exiting) the room where the presentation is taking place. The image may be analyzed to detect a visual trigger that the person 3330 has entered (or exited) the room and an indicator of the visual trigger may be transmitted to a remote device. For example, the indicator may be transmitted to a device being used by person 3330. The indicator may cause the presentation to be displayed on the device and/or an indication of the current task or step in a task may be displayed. In another example, the indicator may be transmitted to remote attendees 3240.

FIG. 33C illustrates an exemplary environment 3302 including a user 3205 wearing a wearable apparatus 110, an audience 3340, a network 240, and a server 250. In some embodiments, each audience member may also have a wearable apparatus 110. Each wearable apparatus 110 may acquire image-based information associated with images captured by the camera on the particular wearable apparatus. Image-based information may include raw images captured from the camera and formatted as jpeg, pic, tiff, mpeg, or any other suitable image format. Additionally or alternatively, image-based information may include images pre-processed by a processing device on the wearable apparatus 110. The pre-processed images may be categorized, enhanced, compressed, or otherwise altered. Additionally or alternatively, image-based information may include logos, words and/or facial information extracted from the images. Additionally or alternatively, image-based information may include information related to products, people, etc. that the users interact with, such as identifying information, names, and so forth. The image-based information may be of the situation or environment 3302 of the user 3205 wearing the wearable apparatus 110. In some embodiments, each wearable apparatus 110 may transmit image-based information to server 250. In some examples, wearable apparatuses 110 may first transmit the information to a network 240 and then to server 250. In other examples, the wearable apparatuses 110 may transmit the information directly to server 250.

In some embodiments, the image-based information is streamed to server 250 in a data stream. As discussed above in connection with FIG. 27B, the data stream may consist of packet or frames that are transmitted by any suitable transmission means. The packets may include image-based information, position information, timing information, motion information, and so forth. The data stream (e.g., as shown in FIG. 27B) may occur in real-time (e.g., shortly after the image data is acquired, for example within one second), or the stream may be delayed by a predetermined amount of time. Thus, server 250 may receive one or more data streams of image-based information from each wearable apparatus 110. In some examples, server 250 may also receive one or more data streams of image-based information from one or more wearable apparatuses 110 used by individuals not present in environment 3302.

In some embodiments, server 250 may include a data interface (not shown) that allows server 250 to receive one or more data streams from wearable apparatus(es) 110. The data interface may include hardware and/or software to interface with network 240 or directly to wearable apparatuses 110. For example, the data interface may include transmitting and receiving circuitry for a wired or wireless connection to network 240. Server 250 may also include a processing device operatively coupled to memory for storing instruction for the processing device.

In some embodiments, devices other than or in addition to server 250 may receive the transmitted data streams from wearable apparatus 110. For example, computing device 120 may receive the data streams. Alternatively, any one or all of the wearable apparatuses 110 may receive the data streams from the other wearable apparatuses 110.

In some examples, server 250 may analyze the image-based information in each of the received data streams. For example, server 250 may receive a data stream from a particular wearable apparatus 110 using the data interface. Server 250 may, using the processing device, unpack or extract the image-based information in the data stream. In some examples, the image-based information may be a series of images captured by the camera on the particular wearable apparatus 110. In other examples, the image-based information may include camera settings, such as f-stop, focal length, light and color content of the image, etc. In other examples, the image-based information may include an indication of at least one visual trigger, for example, an indication of a visual trigger associated with a collaborative action. In other examples, the image-based information may include information related to persons, objects, events, actions, etc. captured by wearable apparatus 110.

Server 250 may analyze the image-based information to determine at least one visual trigger associated with a collaborative action. In some examples, server 250 may use image recognition algorithms and/or machine vision algorithms to determine objects and/or persons in the received images. For example, optical character recognition (OCR) may be used to determine words in an image, such as on a paper, sign, book, etc. Detected words may be used to recognize consumer products, brand names, and/or categories of products. In some examples, edge and shape recognition may be used to determine objects in images, such as a ball, a tree, lines on a playing field, etc. Facial recognition may be used to determine features on a human face, where the features may be compared to a database of features to determine the identity of a person. In some examples, context analysis may be used to determine situations involving the recognized words, object, people, etc. For example, an image may be captured and analyzed to determine the presence of a ball, grass, lines on the grass, and a soccer player. Contextual analysis may then determine that the user is attending a soccer game. Other non-exhaustive examples of context analysis include: water+boat=boating; grass+ball=sport (the type of ball may also be recognized to determine if the sport is, for example, soccer, baseball, football, etc.); recognize lines of a playing field; aisles+products=grocery store; read text on object to recognize brands of products (e.g., Colgate, etc.); recognize general descriptive words (e.g., potatoes, milk, etc.), for example, at a produce market.

Furthermore, in some embodiments, for example, analyzing images may involve edge identification, in which an image is analyzed to detect pixels at which discontinuities (e.g., sudden changes in image brightness) occur and edges (e.g., edges of the external object) are identified to coincide with the detected pixels. Alternatively or additionally, in some embodiments analyzing images may involve identifying in and/or extracting from an image pixels representative of objects in the environment, such as the external object. Pixels may be determined to be representative of an external object based on, for example, other images of the external device or similar external devices maintained, e.g., in a database and/or predetermined data describing the external object maintained, e.g., in a database. Alternatively or additionally, pixels may be determined to be representative of an external object based on, for example, a trained neural network configured to detect predetermined external objects. Other types of analysis are possible as well, including, but not limited to, gradient matching, greyscale matching, scale-invariant feature transform (SIFT) matching, and/or interpretation trees. In the case where multiple images are received over a period of time, server 250 may compare sequential images to determine actors and actions taking place in the images.

In some examples, the collaborative action includes distributing (e.g., transmitting) information to other devices. The server may transmit the information through network 240 to, for example, wearable apparatuses 110, or to other devices, such as remote devices 3220 or computing device 120 (e.g., being used by audience 3340). The information may be as described above and distributed to other devices based on the visual trigger.

By way of example, wearable apparatus 110 being worn by user 3205 may stream image-based information to server 250 for analysis. Server 250 may detect one or more visual triggers in the image-based data. For example, the visual trigger may be a hand gesture such as pointing to a particular aspect of the presentation. Server 250 may interpret the gesture as a command to distribute a questionnaire, a task guide, or other interactive information to audience members 3340. Server 250 may transmit the information through network 240 to wearable apparatuses being worn by audience members 3340 or alternatively to computing devices being used by audience members 3340. Audience members 3340 may then provide feedback to user 3205, such as real-time results from a survey.

In some embodiments, server 250 may receive two or more data streams from different wearable devices. Server 250 may analyze the two or more data streams and determine multiple visual triggers. In some embodiments, server 250 may determine at least one visual trigger based on the two or more data streams being analyzed in parallel. For example, images from difference data streams may contain information that when analyzed together cause the server to detect a visual trigger. For example, server 250 may determine that two or more users of wearable apparatuses 110 are working on the same step of a collaborative action and performing redundant actions, such as buying the same item, editing the same document, processing the same information, and so forth. In another example, server 250 may determine that a need of a first user of a first wearable apparatus 110 may be fulfilled by a second user of a second wearable apparatus 110. For example, that the first user is lacking an item that the second user has excess of, that the location of the second user enables the second user to assist the first user, and so forth.

In some embodiments, server 250 may store the information relating to the determined visual trigger in a storage resource 3350. The storage resource 3350 may be local to server 250 or at a remote location. In some examples, the storage resource 3350 may be internal memory of server 250 and/or computing device 120. Storage resource 3350 may also be memory within any one of wearable apparatuses 110. In some examples, storage resource 3350 may be a non-volatile storage medium, such as a hard disc or a solid state disc. Server 250 may store the information relating to the determined visual trigger in a database on storage resource 3350. The database may be of any known kind, such as a relational database or a self-referencing database. The database may include demographic information about the user or users associated with the visual triggers. For example, a database entry containing information relating to the determined visual trigger may also contain biographical information (e.g., demographics) about the user or users associated with the trigger.

In some embodiments, the stored database information and/or information based on the stored database information may be output to a user, wearable apparatus 110, remote device, or other computing device 120. For example, server 250 may include a monitor 3360 and display a graphical user interface (GUI) containing the information relating to the visual trigger or associated collaborative action. In other examples, the stored information may be displayed on computing device 120. In still other examples, the stored information may be presented to the user through a display on a wearable apparatus 110 or paired device 3210. In some embodiments, the stored information may be communicated to a user audibly. The displayed or otherwise communicated information may include the determined visual trigger, collaborative action, and/or demographics information about the users of the wearable apparatuses to which the visual trigger or collaborative action belongs.

Figure 33B:
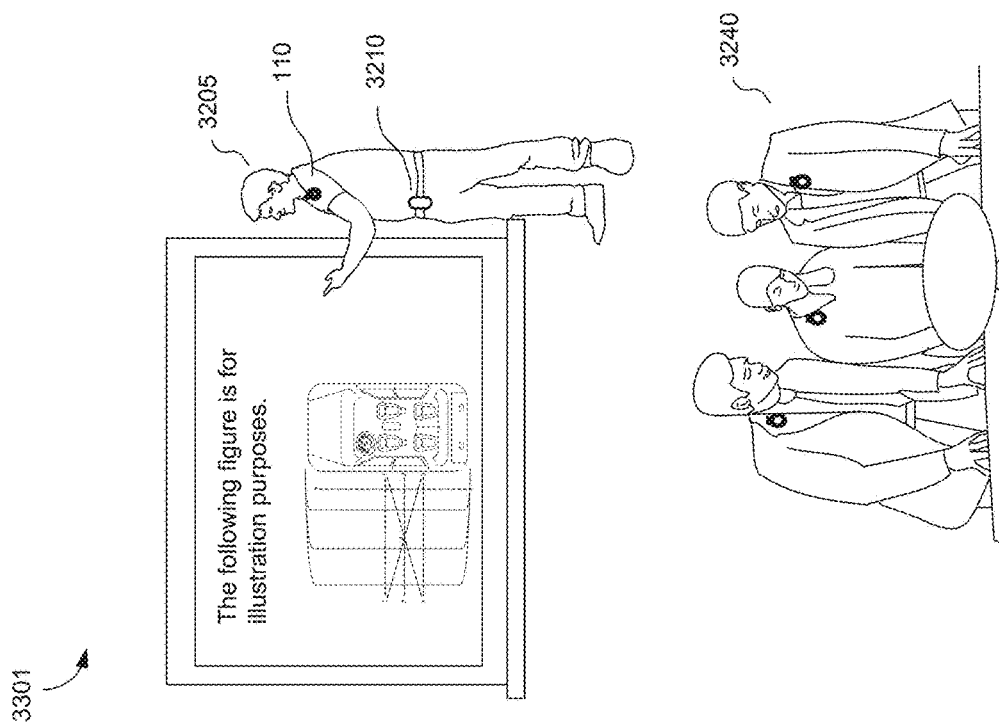
Figure 33D:
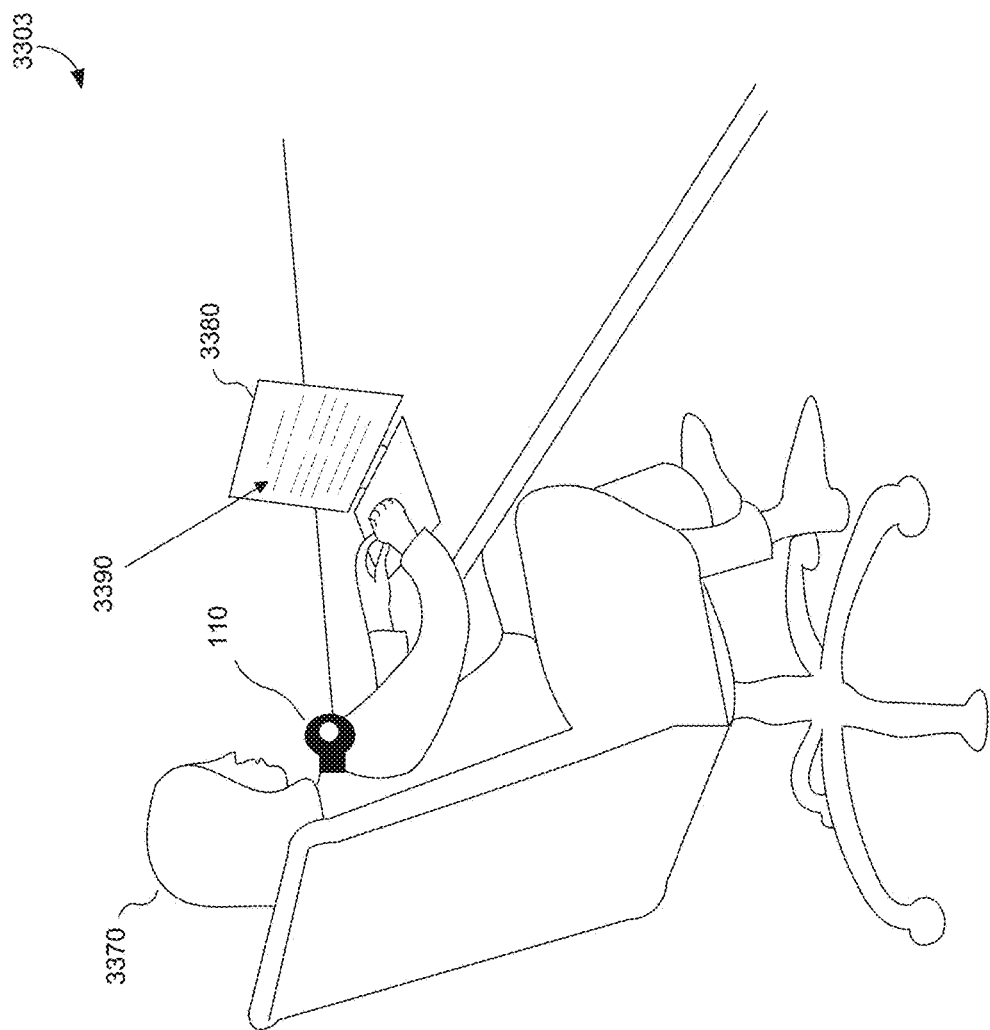
FIG. 33D illustrates an exemplary visual trigger associated with a collaborative action consistent with the disclosed embodiments.

FIG. 33D illustrates another exemplary visual trigger associated with an environment 3303. In the environment, a user 3370 may be wearing wearable apparatus 110 and working at a computer 3380. One of ordinary skill in the art will recognize that computer 3380 may include any computing device, such as a laptop, desktop computer and associated monitor, or a handheld device (e.g., a smartphone, tablet, smart watch, etc.)

In the example shown in FIG. 3D, user 3370 may be entering information into a graphical user interface (GUI) 3390, such as a spreadsheet or word processing program.

Wearable apparatus 110 may detect that the user 3370 is entering the information and determine that entering the information is a visual trigger. In some examples, wearable apparatus 110 may capture images of the GUI 3390 and determine which program is displayed on the screen. For example, wearable apparatus 110 may detect a logo present on the GUI 3390, the arrangement items on the screen, or other indicators of the type of program. Wearable apparatus 110 may also analyze the captured images for changes due to inputting of information by user 3370. Identification of the GUI 3390 and the inputting of information may cause detection of a visual trigger. An indication of the visual trigger may be sent to a paired device, or alternatively, to computer 3380. Receipt of the indication may cause, for example, computer 3380 to retrieve data from a database and input the information into the GUI 3390 (e.g., in the case that the user 3340 is entering tax return information, etc.). In other examples, the user 3370 may be completing a checklist by indicating that tasks associated with a collaborative action have been completed. Completion of the checklist may be detected as a visual trigger and an indication may be sent to a paired device, or other computing device. Receipt of the indication may cause the paired device to distribute information to other individuals involved with the collaborative action to inform them of its completion.

Figure 34:
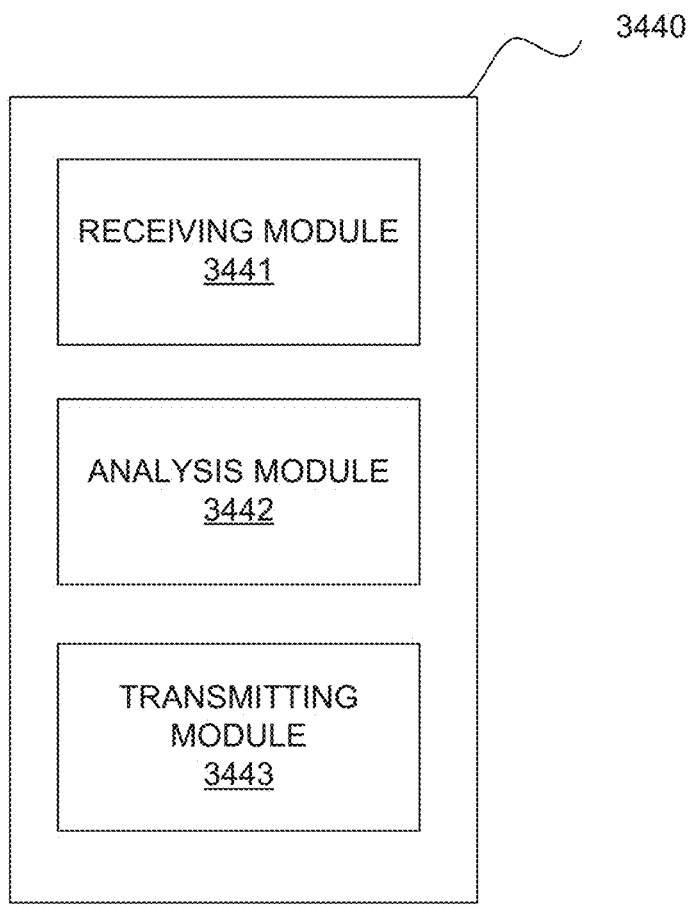
FIG. 34 illustrates an exemplary embodiment of a memory containing software modules consistent with the present disclosure.

FIG. 34 illustrates an exemplary embodiment of memory 3440 containing software modules to determine a visual trigger. For example, one or more of server 250, computing device 120, or wearable apparatus 110 may execute instructions from the modules to perform one or more of the functions as described with respect to FIGS. 32-33, above. Included in the memory are receiving module 3441, analysis module 3442, and transmitting module 3443. Modules 3441, 3442, and 3443 may contain software instructions for execution by at least one processing device included with a server-based system, such as is included in server 250, a wearable apparatus 110, or other computing device.

Receiving module 3441 may be configured to receive one or more data streams or image-based data transmitted by wearable apparatuses. Receiving module 3441 may interact with the data interface to receive the one or more data streams. Receiving module 3441 may control the data interface to receive multiple data streams simultaneously from one or more transmission sources. For example, data streams may be received through a wired connection or through a wireless connection or through both.

Analysis module 3442 may be configured to analyze the one or more received data streams or image-based data to determine one or more visual triggers associated with collaborative action to be taken with respect to a user in an environment. Analysis module 3442 may extract information from the data streams to aid in determination of the visual trigger. For example, analysis module 3442 may extract image-based information, position information, timing information, and/or motion information from the data streams. Analysis module 3442 may use facial detection and recognition to determine triggers, such as interaction with other persons. Analysis module 3442 may also use machine vision algorithms to determine triggers such as identifying commercial products, landscape, objects, locations, gestures, assembly of items, entry of data, etc. Furthermore, analysis module 3442 may use position information to determine a location of the trigger, timing information to determine frequency, scheduling, and/or duration of the trigger, and motion information to determine specific interaction states, such as movement towards an object.

Transmitting module 3443 may be configured to distribute information related to the collaborative action to be taken. Transmitting module 3443 may interact with the data interface to transmit the information to network 240, wearable apparatus 110, paired device 3210, and/or computing device 120. Transmitting module 3443 may control the data interface to transmit information to multiple devices simultaneously.

Figure 35:
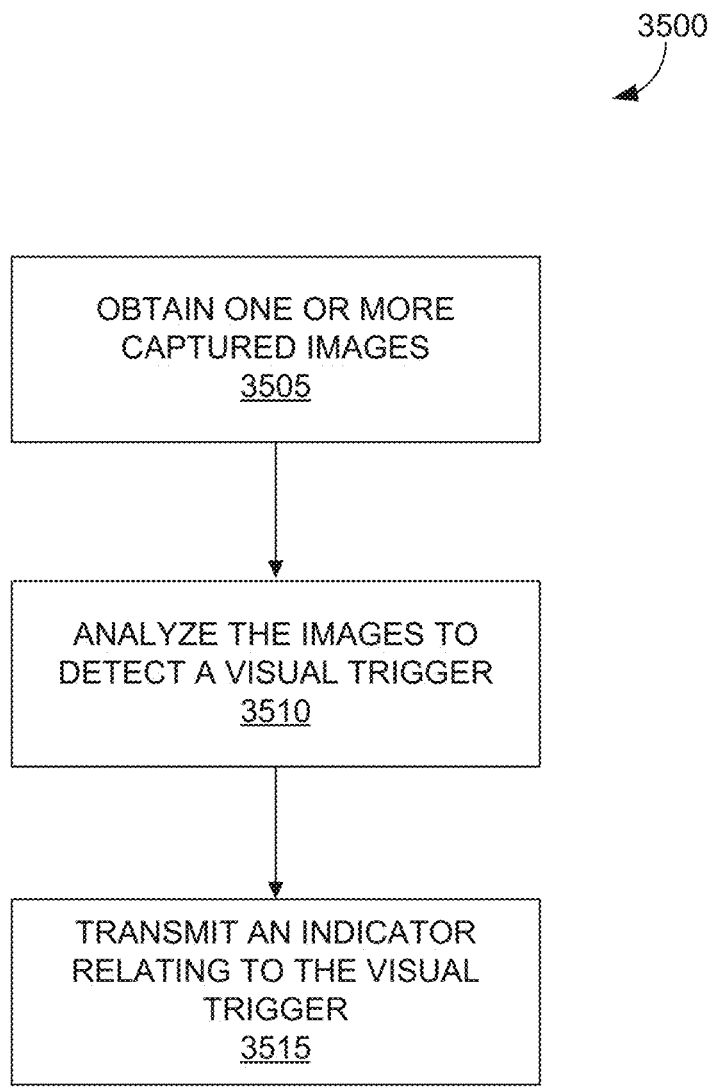
FIG. 35 is a flowchart illustrating an exemplary method of determining a visual trigger consistent with the disclosed embodiments.

FIG. 35 is a flowchart illustrating an exemplary method 3500 of detecting a visual trigger and transmitting an indicator relating to the visual trigger consistent with disclosed embodiments.

At step 3505, one or more images may be obtained. The images may be captured by wearable apparatus 110. In some embodiments, the images may be obtained by a processing device from an image sensor. In other embodiments, the images may be obtained from data streams transmitted by wearable apparatus 110 to a remote computing device 120 and/or server 250. The one or more data streams may contain image-based information, position information, timing information, and/or motion information, and be sent in packets or frames. The data streams may be continuously received over time or received at predetermined intervals.

In some embodiments, the images may be of the environment of a user of wearable apparatus 110. For example, the images may capture actions of other persons, hand gestures of the user, and/or objects and features of the user's environment. As described above, images may be captured during a meeting presentation, a doctor visit, during a sporting event, while assembling an object, etc.

At step 3510, the one or images may be analyzed to detect at least one visual trigger. In some examples, the visual trigger is determined from two or more users from which the images are received. In some embodiments, server 250 may analyze the images. In other embodiments, computing device 120 or wearable apparatus 110 may analyze the images. For example, the images may be analyzed by executing instructions stored in analysis module 3442. In some embodiments, the images may be analyzed to determine a visual trigger associated with a collaborative action to be taken (as described above). In some embodiments, position information, timing information, and/or motion information may be analyzed in addition to image-based information in order to determine a visual trigger. For example, image-based information may be analyzed using machine vision, image recognition, OCR, etc. algorithms, as described above, to determine features and contexts within images or sets of images, such as a hand gesture or recognize another person. In some examples, timing and motion information may be used to determine a hand gesture. Thus, a visual trigger may be determined relating to the motion of a user's hand. In other examples, objects, logos, data types being input into a GUI, interactions with people or object, etc. may be determined.

At step 3515, an indicator related to the determined visual trigger may be transmitted. The indicator may represent the visual trigger and cause functions or actions to be performed by the receiving device. For example, the visual trigger (through the indicator) may be recognized as a command to perform a collaborative action or distribute information. As described above, a device receiving the indicator of the visual trigger may distribute task lists, timing information related to task duration, interactive surveys, etc., to other devices used by other individuals.

Privacy Mode for a Wearable Device

In some embodiments, a wearable apparatus may enter a privacy mode in certain situations and send substitute images (e.g., a cartoon version of an image) or censored images (e.g., blurred) when a private situation is detected. In some embodiments, the wearable apparatus may store in memory indicators of a plurality of private contextual situations and those indicators may be transmitted to a paired device so that images from that time period are censored, not shared, or both. In cases where the wearable apparatus may be configured to remain on throughout the day, this feature may protect user privacy.

Figure 36A:
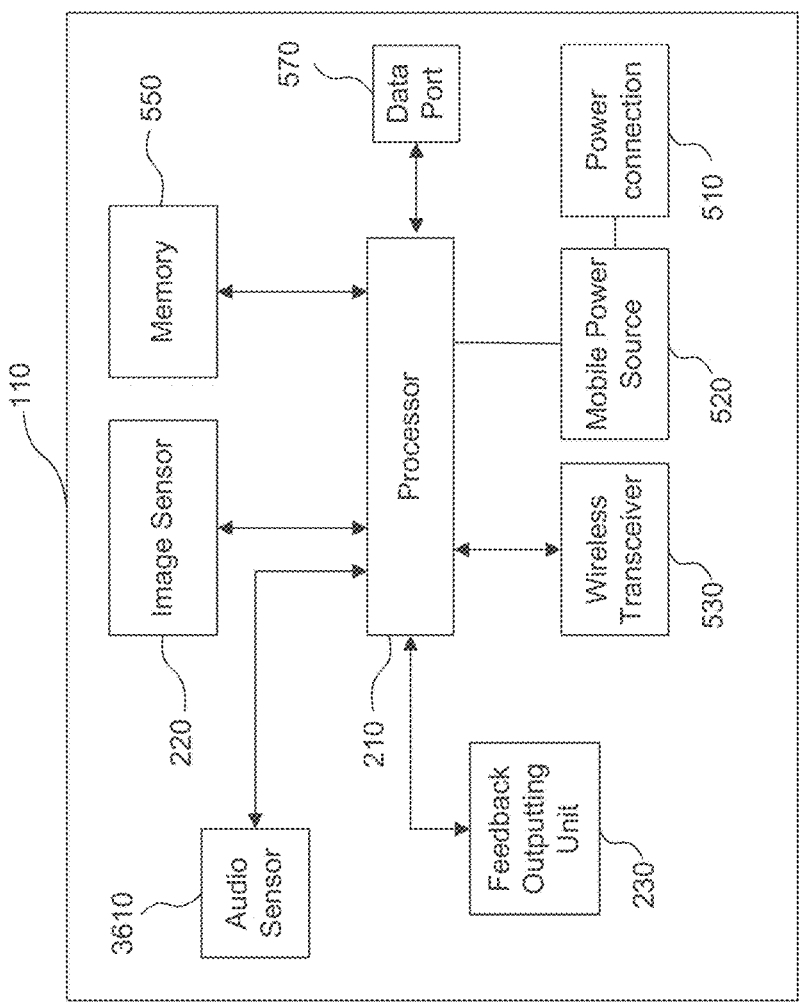
FIG. 36A is a block diagram illustrating an example of the components of a wearable apparatus according to a fourth embodiment.

FIG. 36A is a block diagram illustrating components of wearable apparatus 110 according to an example embodiment. FIG. 36A is similar to FIG. 5A and includes all the features of FIG. 5A, with the only difference being the addition of an audio sensor 3610 depicted in wearable apparatus 110. Adding audio sensor 3610 in FIG. 36A is only included for ease of description and reference. It does not imply that the system shown in FIG. 5A does not include such an audio sensor or that audio sensor 3610 is a necessary component in the system shown in FIG. 5A. As described above in connection with FIG. 5A, other sensors including a microphone (e.g., an example of audio sensor 3610) may be included in wearable apparatus 110. On the other hand, some embodiments may omit audio sensor 3610.

Figure 36B:
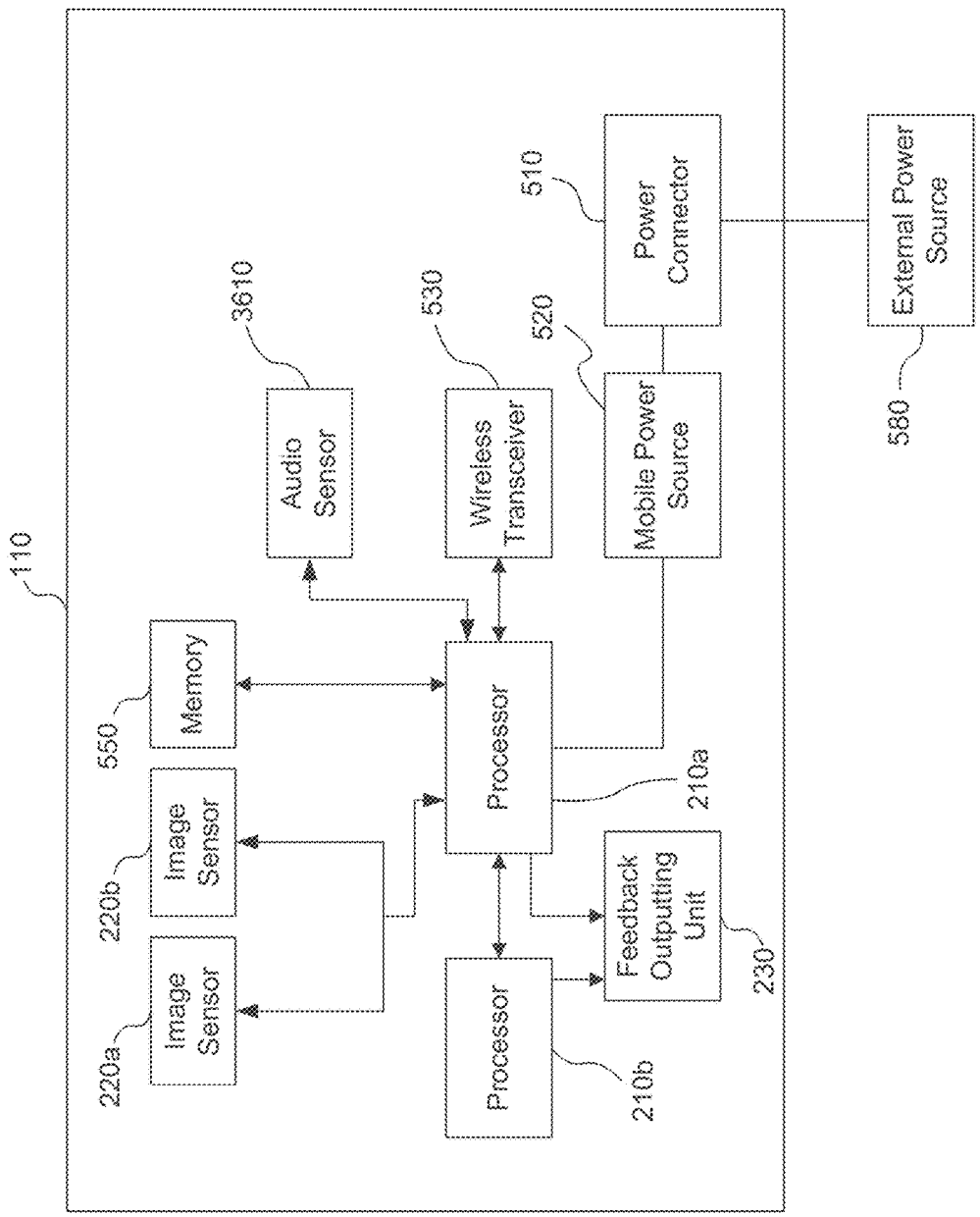
FIG. 36B is a block diagram illustrating an example of the components of a wearable apparatus according to a fifth embodiment.

FIG. 36B is a block diagram illustrating components of wearable apparatus 110 according to an example embodiment. FIG. 36B is similar to FIG. 5B and includes all the features of FIG. 5B, with the only difference being the addition of audio sensor 3610 in the figure. Again, adding audio sensor 3610 in FIG. 36B is only included for ease of description and reference. It does not imply that the system shown in FIG. 5B does not include such an audio sensor or that audio sensor 3610 is a necessary component in the system shown in FIG. 36B.

Figure 36C:
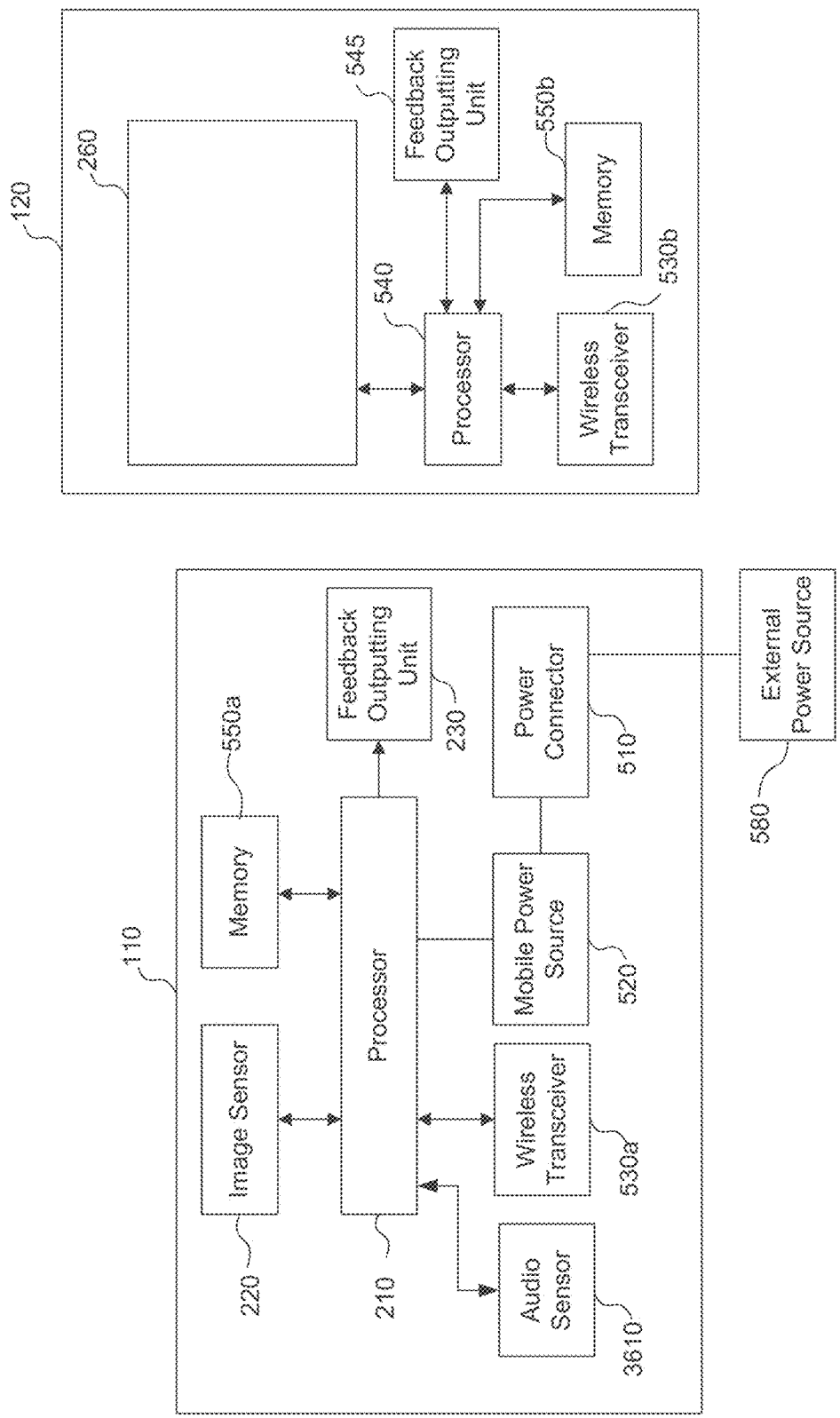
FIG. 36C is a block diagram illustrating an example of the components of a wearable apparatus according to a sixth embodiment.

FIG. 36C is a block diagram illustrating components of wearable apparatus 110 according to an example embodiment. FIG. 36C is similar to FIG. 5C and includes all the features of FIG. 5C, with the only difference being the addition of audio sensor 3610 in the figure. Again, adding audio sensor 3610 in FIG. 36C is only included for ease of description and reference. It does not imply that the system shown in FIG. 5C does not include such an audio sensor or that audio sensor 3610 is a necessary component in the system shown in FIG. 36C.

For any of the embodiments depicted in FIGS. 36A-36C, system 200 may be configured to automatically change settings and configuration of wearable apparatus 110 based on analysis of information collected by wearable apparatus 110. As described above, wearable apparatus 110 may be worn by user 100 in various ways. Wearable apparatus 110 may collect data in the environment of user 100, such as capturing images, recording sound, etc. The collected data, which may or may not be preprocessed by wearable apparatus 110, may be transmitted to computing device 120, which may be paired with wearable apparatus 110 through a wired or wireless communication link. Computing device 120 may analyze the received data, alone or in combination with server 250 through network 240, may store predefined privacy mode triggers and associated privacy mode settings in memory 550/550a/550b, may determine information associated with the analyzed data indicating the presence of at least one of the predefined privacy mode triggers, and/or may automatically cause one or more adjustments to the wearable imaging apparatus based on the privacy mode settings associated with the at least one recognized predefined privacy mode trigger.

Referring to FIG. 36C, wearable apparatus 110 may establish wireless communication (also referred to as wireless pairing) with computing device 120 (also referred to as a paired device or an external device). As described above, computing device 120 may include one or more smartphones, one or more tablets, one or more smartwatches, one or more personal computers, one or more wearable devices, a combination thereof, and so forth. In some embodiments, wearable apparatus 110 and computing device 120 may be paired through a short range communication link such as Bluetooth, WiFi, near-field communication (NFC), etc. In some embodiments, wearable apparatus 110 may be connected to network 240 and communicate with computing device 120 and/or server 250 through network 240. For example, wireless pairing may be established via communication between wireless transceiver 530a in wearable apparatus 110 and wireless transceiver 530b in computing device 120. Wireless transceiver 530a may act as a transmitter to send image and/or sound data captured by image sensor 220 and/or audio sensor 3610 to wireless transceiver 530b, which may act as a receiver, for processing and analysis by computing device 120, alone or in combination with server 250. In some embodiments, wireless transceiver 530a may transmit information associated with the captured image/sound data to computing device 120. In some embodiments, after a content item is selected by computing device 120, the selected content item may be transmitted by wireless transceiver 530b, which may act as a transmitter, to wireless transceiver 530a, which may act as a receiver. The content item may then be output to user 100 through feedback outputting unit 230.

In some embodiments, wearable apparatus 110 may be configured to collect data (e.g., image and/or audio data) and transmit the collected data to computing device 120 and/or server 250 without preprocessing the data. For example, processor 210 may control image sensor 220 to capture a plurality of images and/or control audio sensor 3610 to record sound. Then, processor 210 may control wireless transceiver 530a to transmit the captured images/sound data, and/or information associated with the images/sound, to computing device 120 and/or server 250 for analysis without performing preprocessing or analysis using the computational power of processor 210. In some embodiments, processor 210 may perform limited preprocessing on the collected data, such as identifying a predefined privacy mode trigger in the images or in the sound data, performing optical character recognition (OCR), compressing the image/sound data, sampling the image/sound data, identifying user behavior related images/sound, etc. The preprocessed data may then be transmitted to computing device 120 and/or server 250 for further analysis. In some embodiments, processor 210 may perform the entirety of the privacy mode trigger detection and privacy mode settings adjustment processes (as will be discussed in further detail below).

In some embodiments, computing device 120 may be configured to perform some or all of the privacy mode trigger detection and privacy mode settings adjustment processes. For example, wearable apparatus 110 may transmit image/sound data, either unprocessed or preprocessed, to computing device 120. After receiving the data, processor 540 may analyze the data to identify, for example, one or more images or sounds from the environment of user 100. Processor 540 may then determine, based on the analysis, information associated with the one or more images or sounds. The information may include a scene, a person, an object, a trigger, etc. that is included in the image(s) or sound(s). The information may also include the time and/or location of capturing the image(s) or sound(s). The information may also include historical data relating to the scene, person, object, trigger, etc. depicted in the image(s) or sound(s). Other suitable information relating to the image(s) or sound(s) may also be determined.

As described above, one or more privacy mode trigger detection and privacy mode settings adjustment processes may also be performed by server 250 and/or wearable apparatus 110. Tasks such as image/sound data analysis, information determination, and content selection, may be divided among wearable apparatus 110, computing device 120, and server 250 in any suitable manner. In some embodiments, two or more devices (110, 120, and/or 250) may also collaboratively perform any one task or process. For example, wearable apparatus 110 may preprocess the captured image/sound data, select a plurality of images/sounds from the environment of user 100, and transmit the plurality of images/sounds to computing device 120. Computing device 120 may analyze the plurality of images/sounds to identify one or more images/sounds relevant to one or more privacy mode trigger detection and privacy mode settings adjustment processes, and transmit the identified one or more images to server 250. Server 250 may perform one or more tasks related to one or more privacy mode trigger detection and privacy mode settings adjustment processes, and transmit information and/or feedback to computing device 120 and/or wearable apparatus 110.

There are various ways of distributing and dividing tasks or subtasks among wearable apparatus 110, computing device 120, and server 250. Regardless of which task or subtask is performed by which device, any suitable allocation of computation resources among the devices for performing the above described tasks and/or processes are within the purview of the present application.

Figure 37:
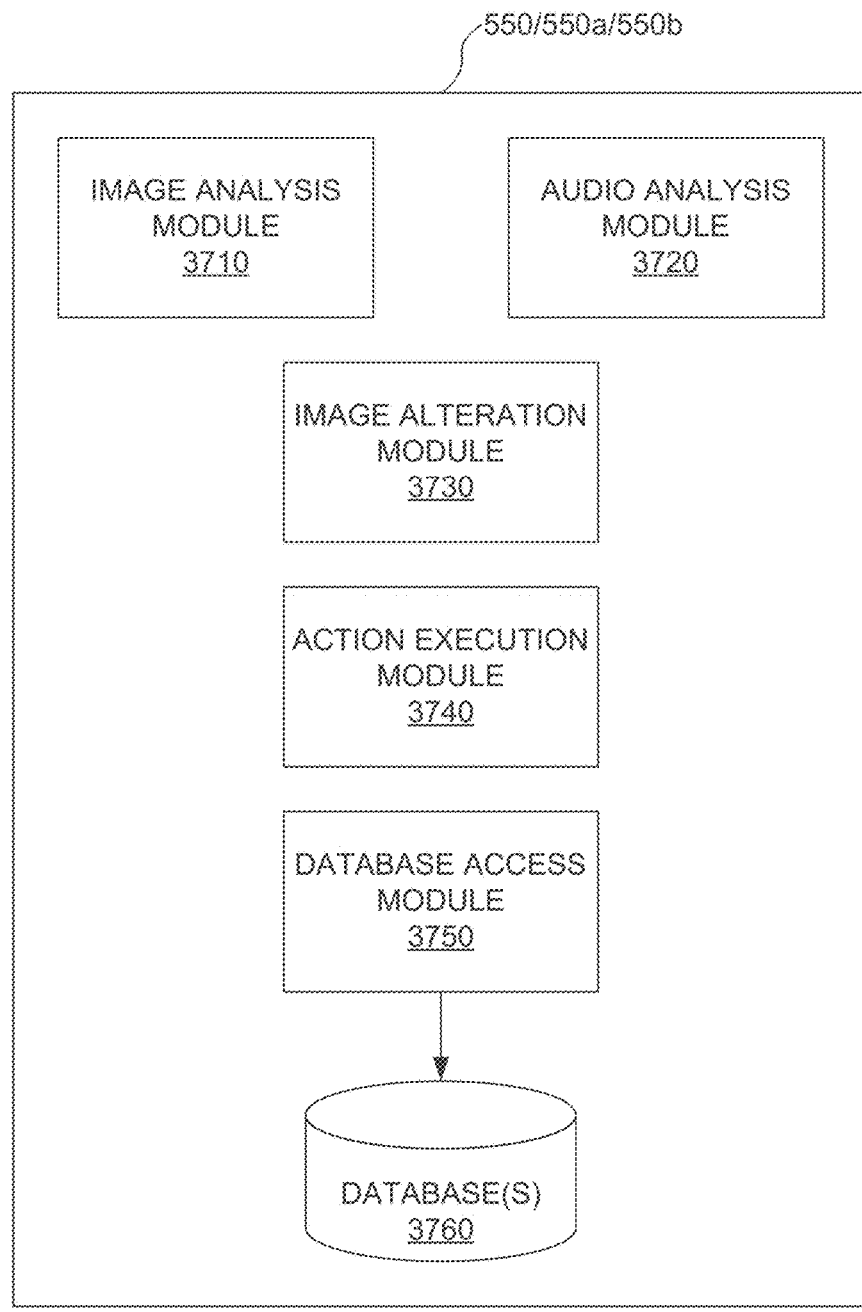
FIG. 37 is a block diagram of an exemplary memory of a wearable apparatus storing software modules and at least one database.

FIG. 37 illustrates exemplary software modules contained in one or more memory units, such as memory 550, memory 550a, and/or memory 550b. As shown in FIG. 37, the exemplary software modules include an image analysis module 3710, an audio analysis module 3720, an image alteration module 3730, an action execution module 3740, a database access module 3750, and one or more databases 3760. As described above, computational tasks involved in system 200 relevant to one or more privacy mode trigger detection and privacy mode settings adjustment processes may be allocated among wearable apparatus 110, computing device 120, and server 250. Therefore, software modules shown in FIG. 37, which are functionally similar to the computational tasks, are not necessarily stored in a single memory unit. Rather, the software modules can be allocated, similar to the computational tasks, among the various devices having computational power in system 200. For example, memory 550a may contain modules 3710 and/or 3720, while memory 550b may contain modules 3730, 3740, and 3750, as well as database(s) 3760. In another embodiment, all modules shown in FIG. 37 may be contained in memory 550b. In yet another embodiment, all modules shown in FIG. 37 may be contained in memory 550 (as shown in FIGS. 5A and 5B and/or 36A and 36B). In some embodiments, multiple memory units, for example memories 550a and 550b, may both contain certain modules, such as modules 3710 and 3720, and the computational tasks of image/sound analysis may be dynamically allocated or shifted between wearable apparatus 110 and computing device 120, depending on their respective work load. Therefore, the memory unit shown in FIG. 37 is collectively referred to as 550/550a/550b, indicating that the software modules shown in FIG. 37 may or may not be contained in a single memory unit.

Similar to modules 601, 602, and 603 shown in FIG. 6, the software modules shown in FIG. 37 may contain software instructions for execution by at least one processing device, e.g., processor 210 and/or processor 540. Image analysis module 3710, audio analysis module 3720, image alteration module 3730, action execution module 3740, and database access module 3750 may cooperate to perform one or more privacy mode trigger detection and privacy mode settings adjustment processes.

In some embodiments, image analysis module 3710 may contain software instructions for analyzing one or more images and/or for performing optical character recognition (OCR) of at least one image captured by image sensor 220. For example, referring to FIG. 36C, processor 210 may execute the image analysis module 3710 stored in memory 550a to perform analysis of one or more images captured by image sensor 220, and transmit a result of the analysis to computing device 120 via wireless transceiver 530a. Processor 540 of computing device 120 may be programmed to receive the result via wireless transceiver 530b.

As discussed above, image analysis module 3710 upon execution by processor 210/540, may enable processor 210/540 to process the captured image data and identify elements of images and/or textual information within the captured image data. In certain aspects, textual information consistent with the disclosed embodiments may include, but is not limited to, printed text (e.g., text disposed on a page of a newspaper, magazine, book), handwritten text, coded text, text displayed to a user through a display unit of a corresponding device (e.g., an electronic book, a television a web page, or an screen of a mobile application), text disposed on a flat or curved surface of an object within a field-of-view of apparatus 110 (e.g., a billboard sign, a street sign, text displayed on product packaging), text projected onto a corresponding screen (e.g., during presentation of a movie at a theater), and any additional or alternate text disposed within images captured by image sensor 220. Image analysis module 3710 may provide functionality for apparatus 110 to analyze sets of real-time image data captured by image sensor 220. Processor 210/540 may execute image analysis module 3710, for example, to determine the presence of a visual trigger in one or more sets of image data, to determine the presence of specific events and/or actions in one or more sets of image data, to determine the presence of objects in one or more sets of image data, to determine the positions of objects in one or more sets of image data over time, and to determine the relative motion of those objects.

Furthermore, in some embodiments, for example, analyzing one or more images may involve edge identification, in which an image is analyzed to detect pixels at which discontinuities (e.g., sudden changes in image brightness) occur and edges (e.g., edges of a device, a body part of the user, and/or an object associated with the user) are identified to coincide with the detected pixels. Alternatively or additionally, in some embodiments analyzing one or more images may involve identifying in and/or extracting from an image pixels representative of one or more objects, actions, events, and/or visual triggers in the environment, such as an object, a body part of the user, and/or an object associated with the user. Pixels may be determined to be representative of an object, an action, an event, and/or a visual trigger based on, for example, other images of the object maintained, e.g., in a database and/or predetermined data describing the object, action, event, and/or visual trigger maintained, e.g., in a database (e.g., other images of the device, of the body part of the user, and/or of the device associated with the user). Alternatively or additionally, pixels may be determined to be representative of an object, an action, an event, and/or a visual trigger based on, for example, a trained neural network configured to detect predetermined objects, actions, events, and/or visual triggers (e.g., predetermined devices, body parts of the user, and/or devices associated with the user). Other types of analysis are possible as well, including, but not limited to, gradient matching, greyscale matching, scale-invariant feature transform (SIFT) matching, and/or interpretation trees.

In some embodiments, audio analysis module 3720 may contain software instructions for analyzing sound recorded by audio sensor 3610. For example, audio sensor 3610 may record sound continuously and store the recorded sound data in memory 550/550a/550b. Memory 550/550a/550b may store the sound data in a buffer, which may have a size sufficient for storing a predetermined length of sound, such as 5 seconds, 10 seconds, 30 seconds, 60 seconds, etc. Sound data stored in memory 550/550a/550b may be transmitted to computing device 120, for example after a privacy mode trigger is recognized in at least one of the captured images. For example, processor 210/540 may receive and analyze the images captured by image sensor 220 to recognize a privacy mode trigger, such as a hand gesture, a person, an object, a location, a scene, etc. After the privacy mode trigger is recognized, processor 210 may transmit the sound data stored in memory 550/550a/550b to computing device 120. Processor 210 may also transmit sound data recorded after the recognition of the trigger to computing device 120, for example, for a designated time period (e.g., 5 seconds, 10 seconds, 30 seconds, 60 seconds, etc.). After receiving the sound data, processor 540 may execute software instructions of audio analysis module 3720, for example, to extract information from the sound data recorded before and/or after the recognition of the trigger.

In some embodiments, other components of system 200 may perform tasks or functions based on either or both analysis results of modules 3710 and 3720. For example, actions may be executed by action execution module 3740 based on image(s) and/or OCR result without sound information. In another example, action execution may be based on sound information alone, such as identifying a person's name, an object, a place, a date, a time point, or other information from the sound. In another example, action execution may be based on both images and sound. As described above, a privacy mode trigger can be identified from an OCR result of one or more images captured by image sensor 220. Based on the trigger, sound data may be analyzed by audio analysis module 3720.

Image alteration module 3730 may provide functionality for wearable apparatus 110 to alter image data captured by image sensor 220 in response to detection of a privacy mode trigger by wearable apparatus 110. Image alteration module 3730 may be configured to alter the image data in response to a command from action execution module 3740, database access module 3750, or both. In other embodiments, image alteration module 3730 may be configured to alter the image data independent of modules 3740-3750. Alterations performable by image alteration module 3730 include, but are not limited to, placing limitations on image data that may be transmitted to a mobile device (such as computing system 120); altering the image data to enable capturing but not storing of the images; prohibiting transmission of captured image data; lowering the resolution of captured image data; distorting the captured image data; blurring the captured image data; enabling transmission of image data to another device after alterations such as those discussed above have been executed; enabling transmission of caricature or cartoon representations of captured image data; altering the captured image data in a manner prohibiting that image data from being posted on social media; applying an image filter to image data captured by image sensor 220; and applying a convolution model filter to image data captured by image sensor 220.

Image alteration module 3730 may be configured to process and alter images using one or more processing schemes based on the privacy mode trigger and the associated privacy mode settings, which will be discussed in further detail below. In some embodiments, processor 210/540 may be programmed to identify multiple portions of a single image and perform processing actions on each portion independently. For example, based on the detected presence in the captured image data of one or more predefined privacy mode triggers, image alteration module 3730 may identify a first and a second portion of at least one image of the plurality of images, and may process the first portion using a first processing scheme, and process the second portion using a second processing scheme. Each of the first, second, or more processing schemes may incorporate one or more of the alterations discussed above, or other alterations.

Action execution module 3740 may provide functionality for wearable apparatus 110 to execute various functions in response to stimuli, be they privacy mode triggers detected by apparatus 110, appearance of objects or sounds within the vicinity of apparatus 110, or other events occurring while apparatus 110 is in operation. Action execution module 3740 may, for example, coordinate the configuration and execution of one or more alternative actions that may be available to wearable apparatus 110 upon positive identification of an object, an event, an action, a trigger, a sound, and/or a particular situation. These alternative actions may include, but not be limited to, suspending image capture by image sensor 220; suspending storage of images captured by image sensor 220; limiting information transmitted to a paired device (such as computing system 120); prohibiting all transmission of images captured by image sensor 220; enabling transmission of images that have passed through image alteration module 3730; suspending capture of audio information from audio sensor 3610; suspending transmission of audio information captured from audio sensor 3610; prohibiting posting of images captured by image sensor 220 on social media; causing transmission to a paired device (such as computing system 120) of information indicative of the identity of an individual detected in one or more images captured by image sensor 220, without transmitting those images to the paired device, to thereby enable the paired device to execute a function relating to the individual without receiving the one or more images; displaying information relating to an individual detected in one or more images captured by image sensor 220; and blocking at least part of an application program interface ("API") functionality.

Database access module 3750 may provide functionality for wearable apparatus 110 to compare objects, actions, events, visual triggers, and/or sounds detected in the user environment to objects, actions, events, visual triggers, sounds, and/or categories of same in a database, such as database(s) 3760, to be described in detail below. In some embodiments, database access module 3750 may derive information from real time image data received from image sensor 220 or audio sensor 3610. In other embodiments, other software elements or processors may derive the information and provide it to database access module 3750. Processor 210/540 may execute database access module 3750 to access one or more of the described databases, and compare the information derived from the received real time image/sound data with information in the databases. If the derived information corresponds to information found in one or more of the databases, database access module 3750 may provide an indication to action execution module 3740 to that effect as discussed in further detail below in association with FIG. 39.

Database(s) 3760 may comprise one or more databases that store information and are accessed and/or managed through memory 550/550a/550b. By way of example, database(s) 3760 may include document management systems, Microsoft™ SQL databases, SharePoint™ databases, Oracle™ databases, Sybase™ databases, files, data structures, container data structures, and/or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database(s) 3760 may contain software code or macros that facilitate rapid searching and comparison by database access module 3750. In some embodiments, database(s) 3760 may be configured to store one or more predetermined privacy mode triggers, or relevant information thereto. The stored information may comprise image data, sound data, textual data, or a combination of these forms. Additionally or alternatively, database(s) 3760 may be configured to store privacy mode settings for wearable apparatus 110 associated with the one or more predetermined privacy mode triggers. The stored information relating to privacy mode settings may comprise image data, sound data, textual data, or a combination of these forms. The information may be preserved in a form that is readily readable, accessible, and/or executable by one or more of database access module 3750 and action execution module 3740.

Image analysis module 3710, audio analysis module 3720, image alteration module 3730, action execution module 3740, database access module 3750, and/or database(s) 3760 may be implemented in software, hardware, firmware, a mix of any of those, or the like. For example, if the modules are implemented in software, they may be stored in memory 550/550a/550b, as shown in FIG. 37. Other components of apparatus 110 may be configured to perform processes to implement and facilitate operations of the modules. Thus, image analysis module 3710, audio analysis module 3720, image alteration module 3730, action execution module 3740, database access module 3750, and/or database(s) 3760 may include software, hardware, or firmware instructions (or a combination thereof) executable by one or more processors (e.g., processor 210/540), alone or in various combinations with each other. For example, the modules may be configured to interact with each other and/or other modules of wearable apparatus 110 to perform functions consistent with disclosed embodiments. In some embodiments, any of the disclosed modules (e.g., image analysis module 3710, audio analysis module 3720, image alteration module 3730, action execution module 3740, database access module 3750, and/or database(s) 3760) may each include dedicated sensors (e.g., IR, image sensors, etc.) and/or dedicated application processing devices to perform the functionality associated with each module.

As used herein, real-time image data may refer to image data captured in real-time or near real-time. For example, image analysis module 3710 may monitor the field of view of wearable apparatus 110 to detect inputs while one or more of image alteration module 3730 and action execution module 3740 may determine whether to initiate one or more actions. Accordingly, image analysis module 3710, image alteration module 3730, and action execution module 3740 may operate in parallel or in any combination to process image data received from image sensor 220. That is, wearable apparatus 110 may capture and analyze image data via image sensor 220 in parallel, or may institute a queue-like implementation whereby image data is captured and then analyzed in a continuous fashion (i.e., a first image is captured and analyzed while a subsequent image is captured and then subsequently analyzed).

Consistent with disclosed embodiments, wearable apparatus 110 may have a privacy mode, with associated automatically variable privacy settings. When the privacy mode is enacted, such as by detection of a privacy mode trigger, wearable apparatus 110 may, depending on the associated privacy settings, execute one or more actions such as stopping or suspending capturing images of the environment of user 100, stopping or suspending capturing sounds from the environment of user 100, stopping or suspending storing captured images, stopping or suspending storing captured sounds, or other actions. The devices and methods discussed under this heading may be combined with any of the devices and/or methods discussed above and below.

In some embodiments, the privacy mode may be associated with one or more private contextual situations. The private contextual situation may be a situation where the privacy of a person or a plurality of persons is of concern, including that of user 100. These situations may make it inappropriate for wearable apparatus 110 to capture images or sounds including or associated with the person or persons. In these embodiments, one or more privacy mode triggers may be associated with a particular private contextual situation. The privacy mode triggers may be of a visual, audio, or textual nature. In these embodiments, each privacy mode trigger may be associated with one or more privacy mode settings that may be automatically adjusted by wearable apparatus 110 and associated components to protect the privacy of the person or persons. Adjustment of the privacy mode settings may, as non-limiting examples, alter captured images, suspend storage or capture of images or sounds, etc.

Visual privacy mode triggers associated with particular private contextual situations may be predefined, and may include, but not be limited to, entry into a bathroom, exit from a bathroom, entry into a private zone, exit from a private zone, a child, nudity, a sign prohibiting recording, a tag associated with a limitation on recording, a predefined hand gesture, a restroom sign, a toilet, and/or a face of an individual. As an example, a predefined hand gesture comprising a visual privacy mode trigger may include a hand gesture from an individual within a field of view of wearable apparatus 110 and image sensor 120 to stop capturing image of the person. In some embodiments, being near or in the restroom or toilet may be a private contextual situation. In some embodiments, nudity of a person or a particular part of the human body being within the field of view of wearable apparatus 110 and image sensor 220 may be a private contextual situation.

Audio privacy mode triggers associated with particular private contextual situations may be predefined, and may include, but not be limited to, sounds associated with a bathroom or a toilet, an indicator of a confidential conversation, an indicator of a desire of an individual not to be recorded, an indicator of an individual warning that the scene or other information should not be recorded, etc.

The visual and audio privacy mode triggers may be stored in database(s) 3760, as described above. Associated privacy mode settings may also be stored in database(s) 3760, and may be stored with or otherwise associated with one or more particular privacy mode triggers. For example, folders or other organizational techniques may be used to group all privacy mode triggers and privacy mode settings for a particular private contextual situation.

In some embodiments, once wearable apparatus 110, image sensor 220, and/or audio sensor 3610 detect that a private contextual situation exists, the privacy mode settings may be automatically varied by the disclosed components and modules consistent with disclosed embodiments. In some embodiments, disclosed components and modules, consistent with disclosed embodiments, may revert the privacy mode settings to their prior state and may resume normal operation once the private contextual situation is determined to no longer exist.

Figure 38A:
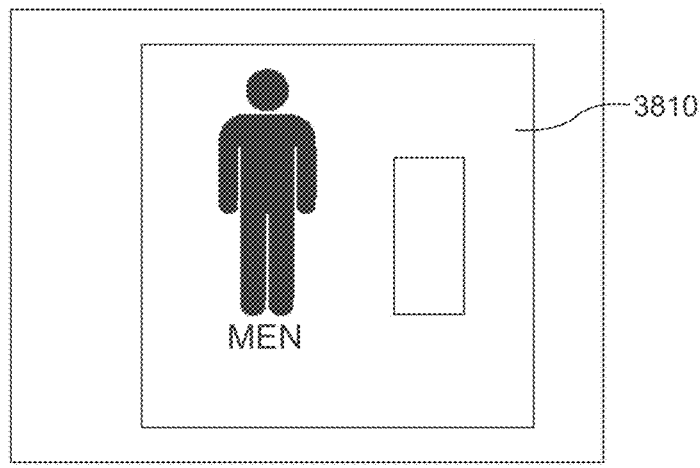
FIGS. 38A, 38B, and 38C are example illustrations of image data captured by an image sensor associated with a wearable apparatus, consistent with disclosed embodiments.
Figure 38B:
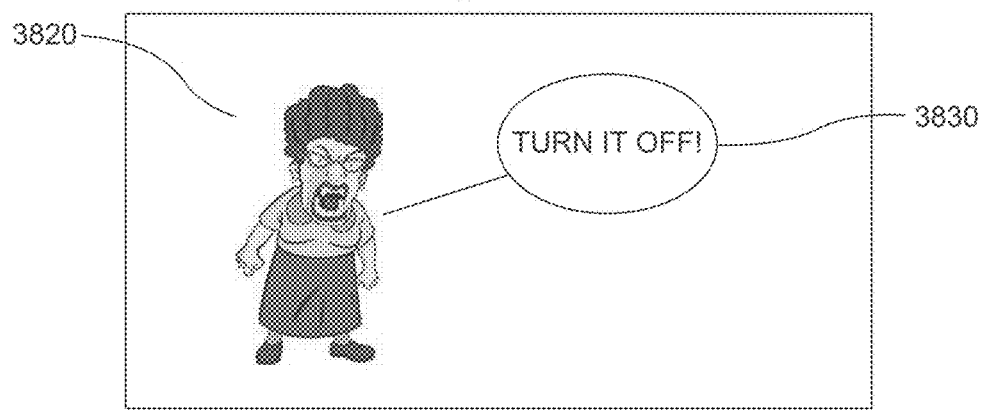
Figure 38C:
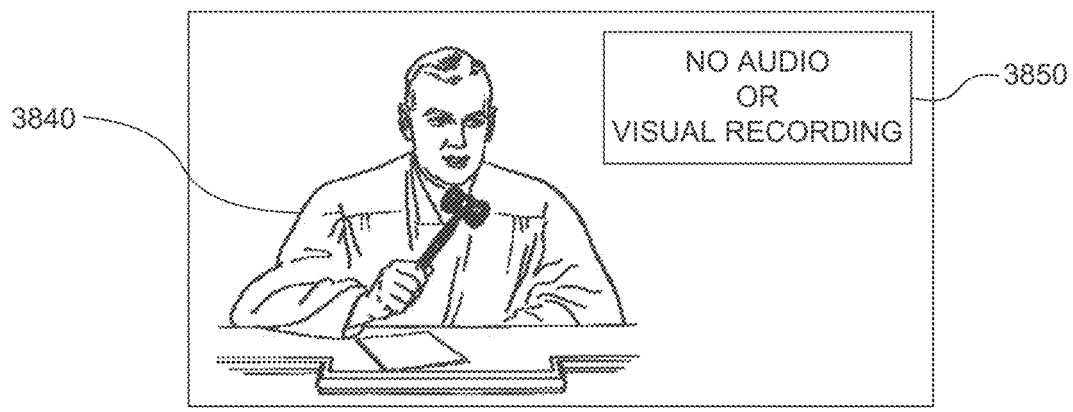

FIGS. 38A-C show example environments that user 100 and wearable apparatus 110 may encounter, consistent with disclosed embodiments. FIGS. 38A-C are depicted as example fields of view that may be perceived by user 100 through an wearable apparatus 110 equipped with an image sensor 220. In some embodiments, the wearable apparatus 110 may be associated with a pair of glasses 130 as discussed above. In other embodiments, wearable apparatus 110 may be attached to clothing worn by user 100, or may otherwise be associated with user 100's body. In some embodiments, wearable apparatus 110 may be associated or affixed to a remote structure, including but not limited to a stick, a pole, a drone, a vehicle, a robot, or another such unit.

FIG. 38A depicts an example environment involving a bathroom, which may be associated with a private contextual situation. The environment of user 100 may, for example include a restroom, signified in FIG. 38A by restroom door 3810. In other embodiments, there may be a sign or other visual indicator, or a toilet. In still other embodiments, there may be an audio indicator, such as a flushing toilet, operation of a sink, a hand dryer, etc. After identifying restroom door 3810 from an image captured by wearable apparatus 110 and image sensor 220, or otherwise identifying associated sounds via audio sensor 3610, processor 210/540 may compare the image of restroom door 3810 with the visual triggers stored in database(s) 3760, and/or the detected sounds with the audio triggers stored in database(s) 3760, as will be described in further detail below in association with process 3900. Based on operations and feedback associated with one or more software modules stored in memory 550/550a/550b, processor 210/540 may determine that image sensor 220 and/or audio sensor 3610 is capturing an image or sound of a toilet or restroom, which indicates that there is a private contextual situation within the field of view of user 100 and wearable apparatus 110. Wearable apparatus 110 may stop, suspend, or otherwise alter image and sound data capture of the environment including the restroom. When user 100 walks away from the restroom such that the images no longer indicate the presence of the private contextual situation (such as restroom door 3810), and/or the sounds no longer indicate the situation, wearable apparatus 110 may resume normal capture and/or storage of the images and sounds of the environment of user 100.

FIG. 38B depicts an example environment involving an individual 3820, which may be associated with a private contextual situation. The environment of user 100 may include individual 3820. In some embodiments, individual 3820 may perceive the presence of user 100, and may further perceive that user 100 is in possession of and/or is operating wearable apparatus 110. In some embodiments, individual 3820 may provide an audible warning to user 100 to stop operation of wearable apparatus 110, such as audible warning 3830 ("TURN IT OFF!"). In some embodiments, audible warning 3830 may not be present. In some embodiments, individual 3820 may not perceive the presence of user 100 and/or may not perceive that user 100 is in possession of and/or is operating wearable apparatus 110. After identifying individual 3820 from an image captured by wearable apparatus 110 and image sensor 220, and optionally identifying associated sounds such as audible warning 3830 via audio sensor 3610, processor 210/540 may compare the image of individual 3820 with the visual triggers stored in database(s) 3760, and/or the detected sounds such as audible warning 3830 with the audio triggers stored in database(s) 3760, as will be described in further detail below in association with process 3900. Based on operations and feedback associated with one or more software modules stored in memory 550/550a/550b, processor 210/540 may determine that image sensor 220 and/or audio sensor 3610 is capturing an image or sound indicating a private contextual situation within the field of view of user 100 and wearable apparatus 110 that may be associated with individual 3820, or with another individual, or with the scene generally. Wearable apparatus 110 may stop, suspend, or otherwise alter image and sound data capture of the environment. When user 100 walks away from the scene (and/or from individual 3820) such that the images no longer indicate the presence of the private contextual situation and/or the sounds no longer indicate the situation, wearable apparatus 110 may resume normal capture and/or storage of the images and sounds of the environment of user 100.

FIG. 38C depicts an example environment involving an environment typically associated with a private contextual situation; here, a courtroom. The environment of user 100 may include visual indicators of a courtroom, such as judge 3840. In some embodiments, judge 3840 may perceive the presence of user 100, and may further perceive that user 100 is in possession of and/or is operating wearable apparatus 110. In some embodiments, judge 3840 may provide an audible warning to user 100 to stop operation of wearable apparatus 110. In some embodiments, no audible warning may be present. In some embodiments, judge 3840 may not perceive the presence of user 100 and/or may not perceive that user 100 is in possession of and/or is operating wearable apparatus 110. In some embodiments, further visual or audio indicia present within the environment of user 100 may indicate a private contextual situation, such as sign 3850 ("NO AUDIO OR VISUAL RECORDING"). After identifying objects such as judge 3840 and sign 3850 from an image captured by wearable apparatus 110 and image sensor 220, and optionally identifying associated sounds such as an audible warning from judge 3840 via audio sensor 3610, processor 210/540 may compare the image(s) with the visual triggers stored in database(s) 3760, and/or the detected sound(s) with the audio triggers stored in database(s) 3760, as will be described in further detail below in association with process 3900. Based on operations and feedback associated with one or more software modules stored in memory 550/550a/550b, processor 210/540 may determine that image sensor 220 and/or audio sensor 3610 is capturing an image or sound indicating a private contextual situation within the field of view of user 100 and wearable apparatus 110 that may be associated with the courtroom (or similar environment/situation). Wearable apparatus 110 may stop, suspend, or otherwise alter image and sound data capture of the environment. When user 100 walks away from the scene (i.e., leaves the courtroom, or court adjourns) such that the images no longer indicate the presence of the private contextual situation and/or the sounds no longer indicate the situation, wearable apparatus 110 may resume normal capture and/or storage of the images and sounds of the environment of user 100.

Figure 39:
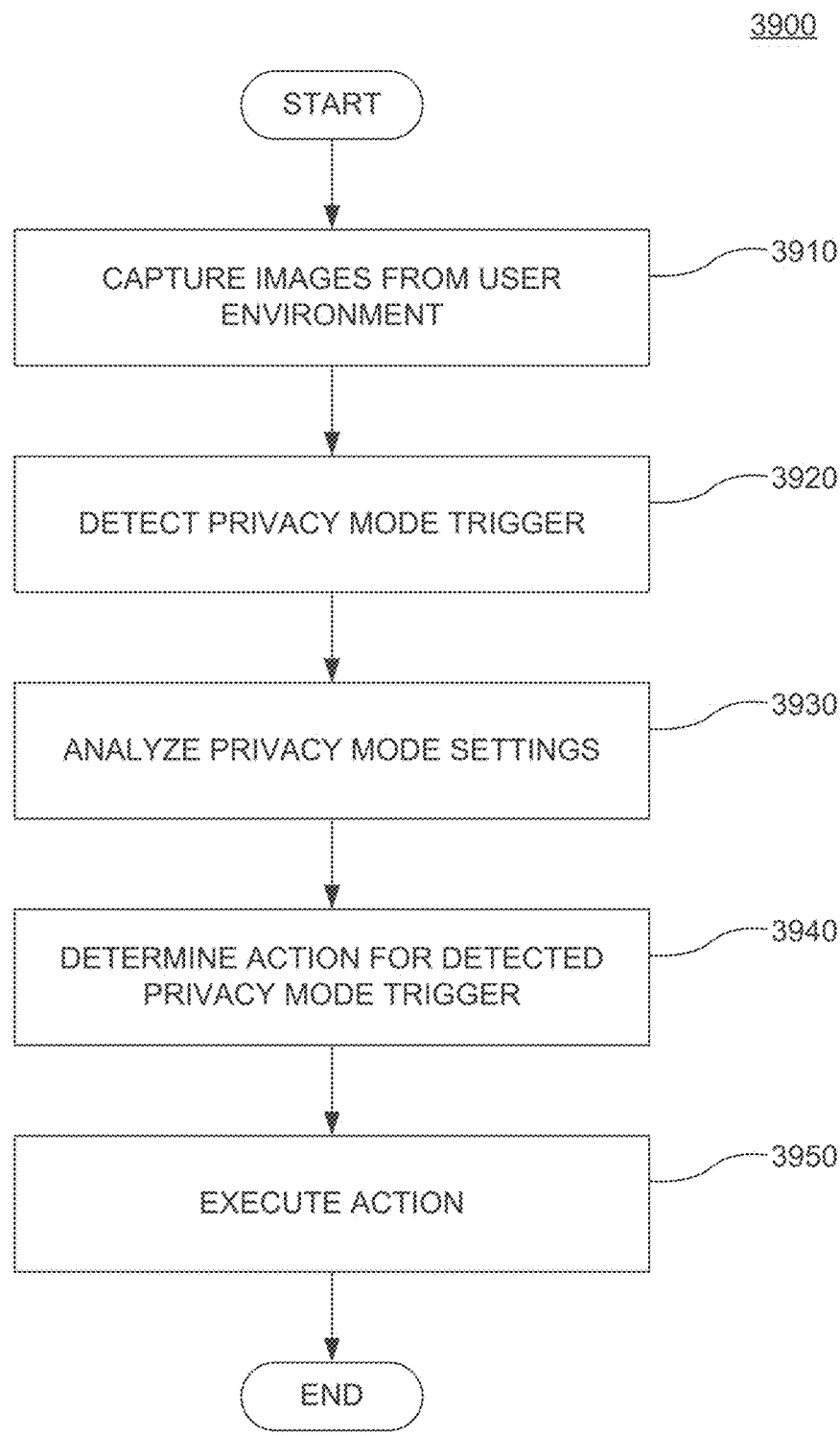
FIG. 39 is an example of a process for automatically varying settings associated with a privacy mode for an image sensor associated with a wearable apparatus, consistent with disclosed embodiments.

FIG. 39 is a flowchart illustrating an example of a process 3900 for automatically varying settings associated with a privacy mode for an image sensor associated with a wearable apparatus, consistent with disclosed embodiments. Process 3900, as well as any or all of the individual steps therein, may be performed by various aspects of wearable apparatus 110, such as processor 210/540, image sensor 220, audio sensor 3610, image analysis module 3710, audio analysis module 3720, image alteration module 3730, action execution module 3740, database access module 3750, and database(s) 3760, or any subcomponents therein. In some embodiments, one or more steps of process 3900 may be performed by a remote computing system, such as computing system 120 or server 250. For exemplary purposes, FIG. 39 and process 3900 are described as being performed by processor 210, executing software instructions stored within memory 550.

Processor 210 may execute software instructions via image analysis module 3710 that enable wearable apparatus 110 to capture real-time image data from the environment of a user 100 using a camera associated with an image sensor, such as image sensor 220 (Step 3910). In some embodiments, the captured first set of real-time image data may be received as a single streaming video file. In other embodiments, the real-time image data may be received as a series of still images. When the captured image data is received, processor 210 may store the data in memory 550. In some embodiments, the image data may be processed in real-time and not stored. In some embodiments, wearable apparatus 110 may additionally or alternatively via processor 210 execute software instructions via audio analysis module 3720 that enable wearable apparatus 110 to capture real-time audio data from the environment of a user 100 using an audio sensor 3610, for example, a microphone. When the captured audio data is received, processor 210 may store the data in memory 550. In some embodiments, the audio data may be processed in real-time and not stored.

Processor 210 may execute software instructions via one or more of image analysis module 3710 and/or audio analysis module 3720 that enable wearable apparatus 110 to detect that user 100 has perceived the presence of a privacy mode trigger (Step 3920). As discussed above, the term "privacy mode trigger" includes any information in the image data or audio data that may be associated with a private contextual situation. Privacy mode triggers may be visual and/or audio in nature. Examples of visual privacy mode triggers that may be detected by wearable apparatus 110 through image sensor 220 and image analysis module 3710 may include, but not be limited to, a presence in the one or more of the plurality of images captured in step 3910 of features associated with a bathroom; entry into a bathroom; exit from a bathroom; entry into a private zone; exit from a private zone; a child; nudity; a sign prohibiting recording; a tag associated with a limitation on recording; or an appearance in the one or more of the plurality of images a representation of a recognized individual. Examples of audio privacy mode triggers that may be detected by wearable apparatus 110 through audio sensor 3610 and audio analysis module 3720 may include, but not be limited to, an indicator of a confidential conversation; an indicator of a desire of an individual not to be recorded; or the presence of the voice of a recognized individual. In some embodiments, step 3920 may be performed by a remote computing system, such as computing system 120 or server 250.

In some embodiments, wearable apparatus 110 may include a transmitter, such as wireless transceiver 530, and processor 210 may be configured to transmit image and/or audio data (either stored data or in real time) to a remote system such as computing system 120 or server 250 for purposes of analyzing the image and/or audio data to determine whether a privacy mode trigger is present in the data. In other embodiments, processor 210 may be configured not to transmit the data, and may instead execute software instructions stored on memory 550, such as image analysis module 3710, audio analysis module 3720, image alteration module 3730, action execution module 3740, database access module 3750, and database(s) 3760.

These modules and/or databases may further be executed to analyze information related to the privacy mode trigger, such as associated privacy mode settings (Step 3930). For example, database access module 3750 may receive information from one or more of image analysis module 3710 and/or audio analysis module 3720 relating to a detected privacy mode trigger and/or private contextual situation. Database access module 3750 may be configured to search database(s) 3760 for one or more entries associated with one or more privacy mode settings for the predefined, recognized privacy mode trigger. In some embodiments, if the detected privacy mode trigger is not one of the predefined privacy mode triggers with information stored in database(s) 3760, user 100 may be prompted by wearable apparatus 110 or computing system 120 through display 260 to configure privacy mode settings associated with the new privacy mode trigger.

Database access module 3750 may determine one or more actions associated with the privacy mode settings for the detected privacy mode trigger that, when executed by processor 210, may automatically cause one or more adjustments to wearable apparatus 110 based on those settings (Step 3940). In some embodiments, step 3940 may be performed by a remote computing system, such as computing system 120 or server 250. The action and/or adjustment associated with a particular privacy mode trigger may be defined by software instructions or other information associated with the privacy mode settings found within database(s) 3760, and may be tailored in a manner to be unique to a particular privacy mode trigger and private contextual situation.

For example, if a privacy mode trigger is detected by image analysis module 3710 in image data captured via image sensor 220, the action/adjustment may include one or more of causing a suspension of image capture by image sensor 220 or causing a suspension of storage of images captured by image sensor 220. In embodiments such as that depicted in FIGS. 36A-36C where wearable apparatus 110 includes a transmitter, such as wireless transceiver 530, the action/adjustment may include a limitation placed on a type of information transmitted to a paired device, for example, computing system 120. In some embodiments, the action/adjustment may include enabling capturing of images by image sensor 220, but not storing them, such as in memory 550 or database(s) 3760. In other embodiments, the action/adjustment may include prohibiting transmission of captured images. In still other embodiments, the action/adjustment may include transmission of caricature or cartoon representations of captured images from image sensor 220, or transmission of low resolution, distorted, and/or blurred versions of captured images. In other embodiments, the action/adjustment may include applying an image filter to images captured via image sensor 220, including but not limited to applying a convolution model filter. In some embodiments, the action/adjustment may include prohibiting the posting of captured images on social media. In other embodiments, the action/adjustment may include blockage of at least part of an application program interface ("API") functionality; for example, if a secret product or idea is being discussed, the device may prohibit misappropriation of the idea or visual/audio representations thereof through third party software programs.

In some embodiments, the privacy mode trigger may include an appearance in the one or more of the plurality of images captured from image sensor 220 of a representation of a recognized individual, as determined by database access module 3750 and database(s) 3760. In these embodiments, a determined action/adjustment associated with a privacy mode setting for these triggers may include causing transmission (such as via wireless transceiver 530) of information indicative of the identity of the individual (such as individual 3820 or judge 3840) to a paired device, such as computing system 120. In these embodiments, processor 210 may ensure that the one or more of the plurality of images themselves are not transmitted to the paired device. In these embodiments, the system and incorporated components enable the paired device to execute one or more functions relating to the detected individual without receiving the one or more images. This configuration protects the privacy of the individual and of user 100. In these embodiments, the executable function may include, but not be limited to, displaying information relating to the individual, such as on display 260.

In other embodiments, if a privacy mode trigger is detected by audio analysis module 3720 in audio data captured via audio sensor 3610, the action/adjustment may include one or more of suspending capture of audio information from audio sensor 3610 (e.g., a microphone), or suspending transmission of audio information from audio sensor 3610.

Via one or more of image alteration module 3730 and/or action execution module 3740, processor 210 may be configured to execute the determined action relating to the privacy mode settings so as to automatically cause one or more adjustments to wearable apparatus 110 (Step 3950). In some embodiments, Step 3950 may be performed by a remote computing system, such as computing system 120 or server 250. The actions may be any of the actions described above or below, as defined by the informational content of the privacy mode settings associated with the detected privacy mode trigger. In some embodiments, feedback relating to the action/adjustment may be generated via feedback outputting unit 230 and displayed to user 100 via a paired device, such as via display 260 of computing system 120.

In some embodiments, processor 210, via image alteration module 3730, may be further programmed to identify one or more portions of at least one image from a plurality of images captured by image sensor 220. In these embodiments, the presence of a particular privacy mode trigger may necessitate different adjustments or actions; similarly, if multiple privacy mode triggers are present, multiple actions/adjustments may be necessary. Based on the presence of the privacy mode trigger(s), image alteration module 3730 may identify at least a first portion and a second portion of the image, and may process the first portion using a first processing scheme, and process the second portion using a second processing scheme. The first and second processing schemes may comprise software instructions that include or are associated with the privacy mode settings stored in database(s) 3760 for a given privacy mode trigger and private contextual situation.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A server-based system for interacting with a plurality of wearable apparatuses each being associated with a different user, the system comprising:
   a data interface; and
   at least one processing device programmed to:
      receive, via the data interface and for each of the plurality of wearable apparatuses, a data stream including image-based information associated with images captured by a camera present on a particular wearable apparatus from among the plurality of wearable apparatuses;
      analyze the image-based information of the data streams received from each of the plurality of wearable apparatuses to determine at least one trait common to two or more of the different users of the plurality of wearable apparatuses, wherein the at least one trait includes interaction by the two or more of the different users with a commercial product;
      determine a frequency at which the two or more of the different users interact with the commercial product; and store in a database information relating to the determined at least one trait, the information including the determined frequency.

2. The system of claim 1, wherein the at least one processing device is further configured to output to a graphical display information based on the stored information relating to the determined at least one trait.

3. The system of claim 1, wherein the at least one processing device is further configured to respond to a received query with information based on the stored information relating to the determined at least one trait.

4. The system of claim 1, wherein at least one of the data streams includes position information identifying locations where the images were captured by the cameras present on the wearable apparatuses.

5. The system of claim 1, wherein at least one of the data streams includes timing information identifying times at which the images were captured by the cameras present on the wearable apparatuses.

6. The system of claim 1, wherein at least one of the data streams includes motion information related to motion of the respective wearable apparatus.

7. The system of claim 1, wherein the at least one processing device is further configured to recognize a location of a particular wearable apparatus based on analysis of the data stream received from the particular wearable apparatus.

8. The system of claim 1, wherein the at least one trait includes interaction by the two or more of the different users with a person, and the at least one processing device is further programmed to determine a frequency at which the two or more of the different users interact with the person.

9. The system of claim 1, wherein the at least one trait includes a visit by the two or more of the different users to a particular website.

10. The system of claim 9, wherein the at least one processing device is further programmed to determine a frequency by which the wearers visit the particular website.

11. The system of claim 9, wherein the at least one processing device is further programmed to determine how much time each of the two or more of the different users spends on the particular website.

12. The system of claim 1, wherein the at least one trait is related to a hand gesture of the two or more of the different users.

13. The system of claim 1, wherein storage in the database of information relating to the determined at least one trait is based on demographic information associated with the two or more of the different users.

14. A method for interacting with a plurality of wearable apparatuses each being associated with a different user, the method comprising:

receiving, for each of the plurality of wearable apparatuses, a data stream including image-based information associated with images captured by a camera present on a particular wearable apparatus from among the plurality of wearable apparatuses;

analyzing the image-based information of the data streams received from each of the plurality of wearable apparatuses to determine at least one trait common to two or more of the different users of the plurality of wearable apparatuses, wherein the at least one trait includes interaction by the two or more of the different users with a commercial product;

determining a frequency at which the two or more different users interact with the commercial product; and storing in a database information relating to the determined at least one trait, the information including the determined frequency.

15. The method of claim 14, further comprising outputting to a graphical display information based on the stored information relating to the determined at least one trait.

16. The method of claim 14, wherein at least one of the data streams includes position information identifying locations where the images were captured by the cameras present on the wearable apparatuses.

17. The method of claim 14, wherein at least one of the data streams includes motion information related to motion of the respective wearable apparatus.

18. The method of claim 14, further comprising recognizing a location of a particular wearable apparatus based on analysis of the data stream received from the particular wearable apparatus.

19. A non-transitory computer readable medium storing data and computer implementable instructions for carrying out the method of claim 14.

* * * * *